US012708066B2

(12) United States Patent
Dueñas Penski et al.

(10) Patent No.: US 12,708,066 B2
(45) Date of Patent: Aug. 18, 2026

(54) LAWN MOWERS AND ASSOCIATED FEATURES AND METHODS

(71) Applicant: Techtronic Cordless GP, Anderson, SC (US)

(72) Inventors: Samuel A. Dueñas Penski, Greenville, SC (US); Gregory S. Torrisi, Easley, SC (US)

(73) Assignee: TECHTRONIC CORDLESS GP, Anderson, SC (US)

(*) Notice: Subject to any disclaimer, the term of this patent is extended or adjusted under 35 U.S.C. 154(b) by 378 days.

(21) Appl. No.: 18/367,550

(22) Filed: Sep. 13, 2023

(65) Prior Publication Data

US 2024/0237574 A1 Jul. 18, 2024

Related U.S. Application Data

(60) Provisional application No. 63/438,915, filed on Jan. 13, 2023.

(51) Int. Cl.

| | |
|---|---|
| ***A01D 34/66*** | (2006.01) |
| ***A01D 34/64*** | (2006.01) |
| ***A01D 34/74*** | (2006.01) |
| *A01D 101/00* | (2006.01) |

(52) U.S. Cl.

CPC ........... *A01D 34/662* (2013.01); *A01D 34/74* (2013.01); *A01D 2034/645* (2013.01); *A01D 2101/00* (2013.01)

(58) Field of Classification Search

CPC .... A01D 34/662; A01D 34/74; A01D 34/661; A01D 2034/634; A01D 2101/00; B23Q 2003/15527; B25B 1/14

USPC ..................... 56/71, 15.8; 269/230, 228, 159

See application file for complete search history.

(56) References Cited

U.S. PATENT DOCUMENTS

| | | | | | |
|---|---|---|---|---|---|
| 337,924 | A * | 3/1886 | Chase | A43D 21/125 269/228 |
| 2,405,288 | A * | 8/1946 | Butt | B25B 1/14 269/227 |
| 3,028,577 | A * | 4/1962 | Strauss | H01R 11/22 81/379 |
| 3,323,294 | A * | 6/1967 | Knepper | A01D 34/06 292/62 |
| 3,483,684 | A * | 12/1969 | Price | A01D 34/64 56/13.6 |
| 3,831,580 | A * | 8/1974 | McLean | F24C 15/022 292/64 |

(Continued)

FOREIGN PATENT DOCUMENTS

| | | | | |
|---|---|---|---|---|
| EP | 2145520 A1 * | 1/2010 | | A01D 34/74 |
| EP | 2868184 A1 * | 5/2015 | | A01D 34/64 |

(Continued)

OTHER PUBLICATIONS

European Search Report Corresponding to Application No. 241517382 on Jun. 14, 2024.

*Primary Examiner* — Joseph M Rocca
*Assistant Examiner* — Sunny D Webb
(74) *Attorney, Agent, or Firm* — Dority & Manning, P.A.

(57) ABSTRACT

A lawnmower can include a frame; a mower deck; and a connection interface that selectively couples the mower deck to the frame, wherein the connection interface is selectively lockable in an open state to permit installation of the mower deck to the frame, and wherein the connection interface is spring biased to a closed state to lock the mower deck and the frame together.

20 Claims, 23 Drawing Sheets

(56) References Cited

U.S. PATENT DOCUMENTS 4,181,333 A * 1/1980 Stelma .................... E05C 19/14 292/DIG. 20
4,441,306 A * 4/1984 Kuhn ..................... A01D 34/74 56/15.9
4,896,489 A * 1/1990 Wykhuis .............. A01D 34/662 172/810
5,025,617 A * 6/1991 Kuhn ................... A01B 59/044 56/DIG. 9
5,381,648 A * 1/1995 Seegert .................. A01D 34/64 56/15.9
5,609,371 A * 3/1997 Mader ....................... E05C 5/00 292/164
5,667,261 A * 9/1997 Weinerman ............. E05C 19/14 292/113
5,816,035 A * 10/1998 Schick ................... A01D 34/74 56/15.8
5,904,348 A * 5/1999 Sevy ......................... B25B 5/12 269/236
5,956,932 A * 9/1999 Schmidt ................. A01D 34/64 56/15.8
6,041,584 A * 3/2000 Hohnl .................... A01D 34/74 280/43
6,293,077 B1 * 9/2001 Plas ........................ F15B 13/01 56/17.1
7,578,117 B2 * 8/2009 Shaffer .................. A01D 34/74 56/17.1
7,596,936 B2 * 10/2009 Schick ................... A01D 34/74 56/15.9
11,118,383 B2 * 9/2021 Grisendi ................. E05C 19/12
2002/0194826 A1 * 12/2002 Schick ................. A01D 34/662 56/15.9
2005/0016143 A1 * 1/2005 Thatcher ................ A01D 34/74 56/15.6
2005/0077736 A1 * 4/2005 Hagan ..................... E05C 19/14 292/247
2009/0182470 A1 * 7/2009 Garvey ................ A01D 34/662 701/50

FOREIGN PATENT DOCUMENTS

EP 4000370 A1 5/2022
WO WO2020053670 A1 3/2020

* cited by examiner 172
170
162
148

148
162

C
174
176
148
D
D
178
180

214
210
UP
DOWN
ON
AUX
216
212

G
130
118
140

218
130
102

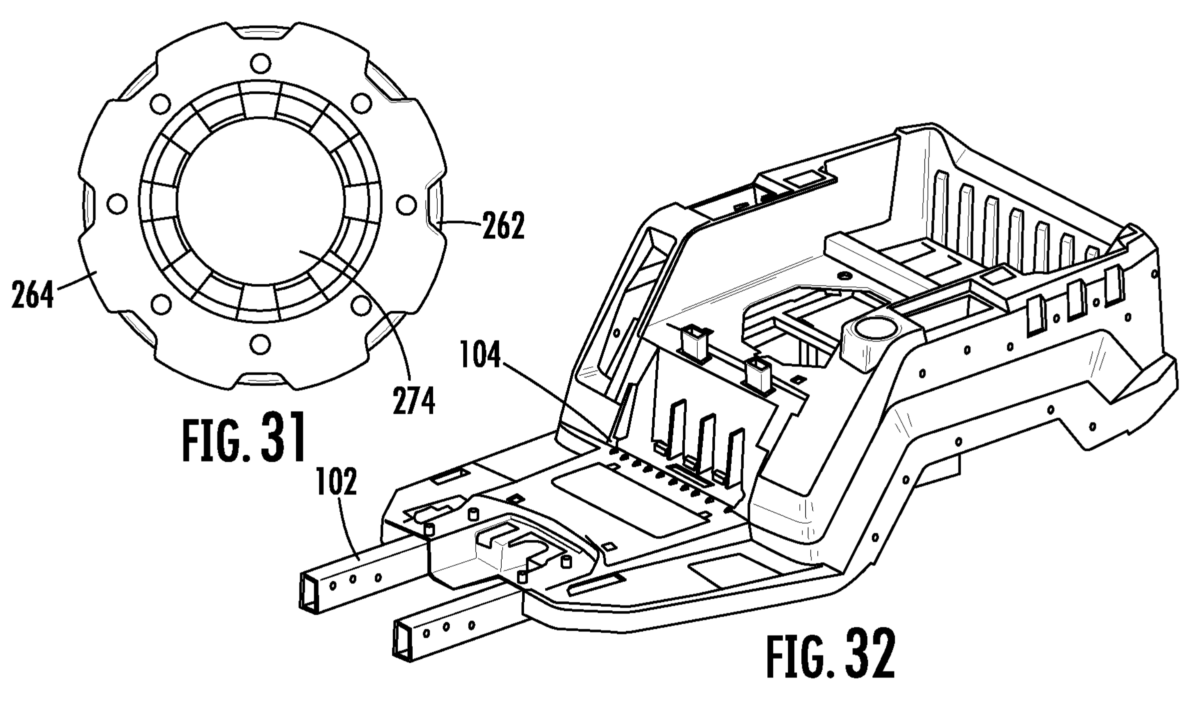
FIG. 31
FIG. 32
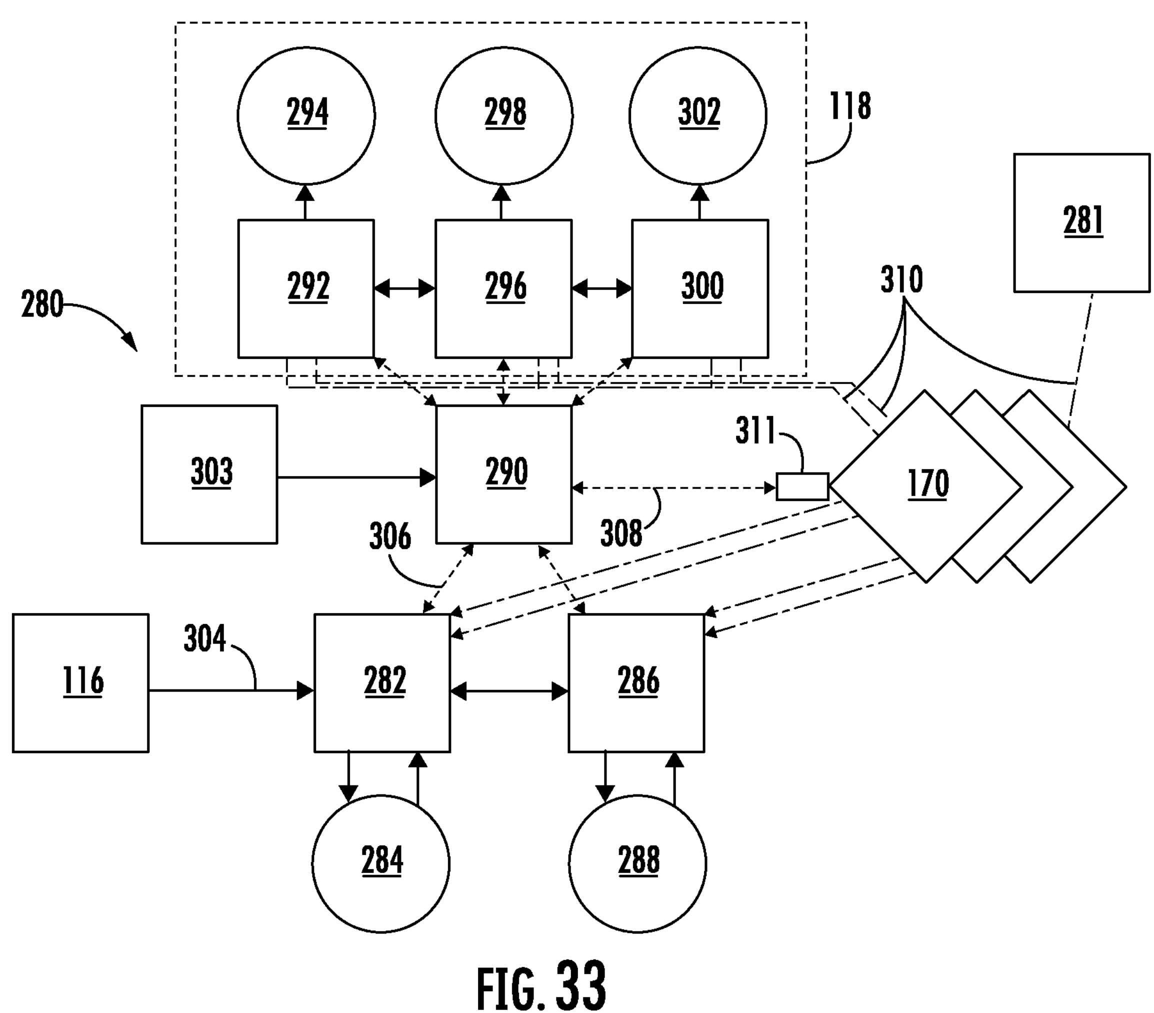
FIG. 33

398
402
396
386
400
390
394
388
336
392

404
402
396
398
386
390
400
406
408
410
394
388
340
336
392

354
336
346
M

LAWN MOWERS AND ASSOCIATED FEATURES AND METHODS

CROSS-REFERENCE TO RELATED APPLICATION

The present application claims priority to U.S. Patent Application Ser. No. 63/438,915 filed on Jan. 13, 2023, the disclosure of which is incorporated by reference herein in its entirety.

FIELD

The present disclosure relates generally to lawn mowers, and more particularly to features associated with lawn mowers which improve operational efficiency and ease of use.

BACKGROUND

Traditionally, lawn maintenance was performed by hand tools. These hand tools developed into mowing machines which required manual input to move and power. Over time, gas powered vehicles made lawn maintenance easier and more efficient.

However, gas powered vehicles have several downsides. For example, gas engines are loud and emit pollution. Gas powered engines are also difficult to tune and maintain. Additionally, gas powered engines require onsite storage of combustible fuels which increase operational costs and hazards.

Accordingly, improved lawn mowers are desired in the art. In particular, non-gas powered lawn mowers which provide ease and efficiency of use would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a lawn mower is provided. The lawn mower includes a mower deck housing a cutting implement; a blade motor configured to selectively drive the cutting implement; a height adjustment implement moveable between two or more positions each associated with a different height of the cutting implement; and a quick deck lift user interface moveable between a mowing position and a deck lift position, wherein the quick deck lift user interface defaults to the mowing position, wherein moving the quick deck lift user interface to the deck lift position causes the cutting implement to move to a maximum height, and wherein releasing the quick deck lift user interface causes the cutting implement to return to a height set by the position of the height adjustment implement.

In accordance with another embodiment, a method of adjusting a height of a mower deck of a lawn mower is provided. The method includes moving a height adjustment implement between a plurality of positions to set a mowing height; upon encountering an obstacle that could be bypassed by a raised mower deck, actuating a quick deck lift user interface to raise the mower deck to a maximum height; maintaining the quick deck lift user interface in an actuated state until the obstacle is cleared by the mower deck; and releasing the quick deck lift user interface to cause the mower deck to return to the set mowing height.

In accordance with another embodiment, a method of raising a mower deck of a lawn mower is provided. The method includes upon encountering an obstacle that could be bypassed by a raised mower deck, depressing a button to lift the mower deck to a maximum height; and holding the button in a depressed state until the obstacle is cleared by the mower deck to retain the mower deck at the maximum height.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which:

FIG. 31 is a top view of a rotatable dial of a height adjustment implement of the lawn mower in accordance with embodiments of the present disclosure;

FIG. 32 is a front perspective view of a faring on the frame of the lawn mower in accordance with embodiments of the present disclosure;

FIG. 33 is a schematic view of a control system of the lawn mower in accordance with embodiments of the present disclosure;

DETAILED DESCRIPTION

Figures 1, 2:
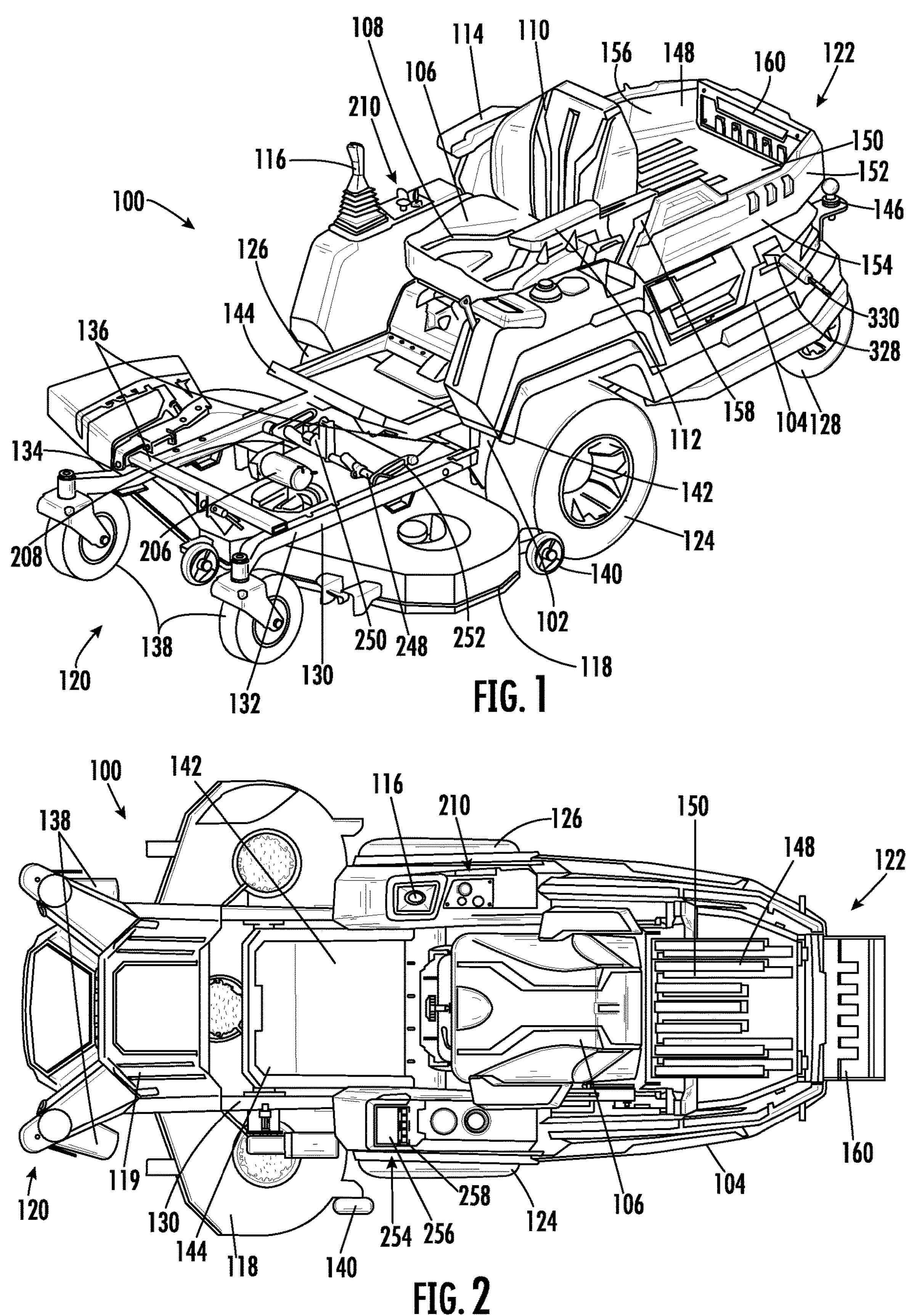
FIG. 1 is a front perspective view of a lawn mower in accordance with embodiments of the present disclosure.
FIG. 2 is a top view of the lawn mower in accordance with embodiments of the present disclosure.

Reference now will be made in detail to embodiments of the present invention, one or more examples of which are illustrated in the drawings. The word "exemplary" and its associated derivates are used herein to mean "serving as an example, instance, or illustration." Any implementation described herein as "exemplary" is not necessarily to be construed as preferred or advantageous over other implementations. Moreover, each example is provided by way of explanation, rather than limitation, of the technology. It will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises" "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "of" refers to an inclusive- or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, lawn mowers described in accordance with one or more embodiments herein can exhibit increased operational performance, ease of use, and increased operational safety. Lawn mowers described herein may exhibit easy maintenance and service, easy hauling and dumping of various materials, easy operator mounting and dismounting, more cost-effective design during both assembly and maintenance, safer operation, simple control design, and greater capacity for working with accessory tools, among other benefits which are described in greater detail below. Lawn mowers described herein may operate using electrical power provided by one or more onboard power storing elements (e.g., batteries), an onboard generator, or the like.

Lawn mowers described in accordance with one or more embodiments herein may include one or more features to facilitate quick raising of a mower deck of the lawn mower upon encountering obstacles or features that may not otherwise be traversed or bypassed by the lawn mower. For example, during routine mowing operations it is common to encounter obstacles such as rocks, roots, branches, ruts, ridges, and large or sharp surface undulation which are not readily or safely traversable with the mower deck in an in-use position. With the mower deck in the in-use position, one or more cutting implements of the mower deck may contact the obstacle, creating a safety hazard for the operable, nearby people, and the lawn mower itself. For example, rocks may be picked up by the cutting implements and discharged laterally as high speed projectiles, roots may be struck by the cutting implements causing damage to onboard motors and linkages, lawn may be scalped by the cutting implements, or the like. Each of these situations presents an unnecessary risk and danger.

In accordance with an embodiment, the lawn mower can include a quick deck lift user interface which facilitates movement of the mower deck from any current in-use position to a raised (e.g., maximum) height to allow clearance of the obstacle. To quickly lift the mower deck, the operator can engage the quick deck lift user interface to raise the mower deck. In certain instances, engagement of the quick deck lift user interface can raise the mower deck to a maximum height. In other instances, engagement of the quick deck lift user interface can raise the mower deck to an elevated, but not a maximum height. By way of non-limiting example, engagement of the quick deck lift user interface can include depressing a button associated with the quick deck lift user interface. The button can be disposed within easy access of a riding operator such that the operator can readily depress the button. The operator can maintain the quick deck lift user interface in the engaged position while traversing the obstacle by maintaining the button in the depressed position. After sufficiently clearing the obstacle (but not necessarily after completely clearing the obstacle) the operator can release the quick deck lift user interface to return the mower deck to the previous in-use height. The button may be biased to the non-depressed state such that release of the button automatically restores the button to the non-depressed state. A memory device, such as a mechanical potentiometer, can store the previous in-use height for reference. In this regard, the operator is not required to take any further actions (like resetting the mower deck height) after the quick deck lift user interface is disengaged (i.e., returned to the non-depressed state) to restore the previous mowing cutting height. These and other features of the lawn mowers presented herein are described in greater detail below and in view of the accompanying drawings.

Referring now to the drawings, FIG. 1 illustrates a front perspective view of a lawn mower 100 in accordance with an exemplary embodiment of the present disclosure. FIG. 2 illustrates a top view of the lawn mower 100 in accordance with an exemplary embodiment of the present disclosure. The lawn mower 100 includes a frame 102, a faring 104 coupled to the frame 102 and configured at least in part to at least partially protect one or more components of the lawn mower 100 from environmental elements, and a seat 106. The seat 106 can be coupled to the frame 102 and configured to support a riding operator. The seat 106 can include a bottom cushion 108, a seat back 110, a left armrest 112, and a right armrest 114. The seat 106 may be adjustable relative to the frame 102 to support operators of different sizes. For example, the seat 106 may be translatable in forward and backward directions. The seat back 110 may pivot relative to the bottom cushion 108. Additionally, at least one of the left and right armrests 112 or 114 may be pivotable between an in-use position (as illustrated) and a raised position, i.e., parallel with the seat back 110. In an embodiment, the left and right armrests 112 and 114 may have similar constructions and arrangements as compared to one another. However, in the depicted embodiment, the left and right armrests 112 and 114 are asymmetrical with each other. That is, the left armrest 112 is in a forward position and the right armrest 114 is in a rearward position. In certain instances, at least one of the left or right armrests 112 or 114 may be moveable, e.g., translatable along a rail or guide, between the forward and rearward positions. In this regard, the left and right armrests 112 and 114 may be adjusted based on the particular configuration desired by each riding operator. Use of a rearwardly positioned right armrest 114 may allow the operator to more easily utilize a control implement of the lawn mower 100, such as a joystick 116, positioned on the right side of the lawn mower 100. It should be understood that the depicted embodiment is provided for exemplary purposes only and that modifications may be made to the lawn mower 100 without deviating from the scope of the disclosure contained herein. For instance, in one or more embodiments, the joystick 116 may be disposed on a left side of the lawn mower 100, with the left armrest 112 disposed rearwardly to accommodate use of the joystick 116. Moreover, in yet other embodiments, the joystick 116 may be swappable between the left and right sides to accommodate different handed operators.

The joystick 116 may allow the operator to control one or more aspects of the lawn mower 100. For example, the joystick 116 may allow the operator to control steering of the lawn mower 100, speed of the lawn mower 100, or both. The joystick 116 may be moveable in left, right, forward, and rearward directions to steer the lawn mower 100 while controlling the speed thereof. In certain instances, the joystick 116 may further be rotatable, e.g., about a vertical axis. Rotation about the vertical axis may assist in controlling steering, speed, or another aspect of mower operation.

As the lawn mower 100 traverses an underlying ground surface, a cutting implement 260 (FIG. 29) may be used to cut grass and other materials associated with the underlying ground surface. The cutting implement may be housed in a mower deck 118. In the depicted embodiment, the mower deck 118 is disposed at a front end 120 of the lawn mower 100. The seat 106 may be disposed rearward of the mower deck 118. However, in certain instances, portions of the operator, e.g., the operator's feet, may extend over the mower deck 118. In other embodiments, the mower deck 118 can be disposed at a rear end 122 of the lawn mower 100 or at a central location thereof.

The lawn mower 100 can be supported by a plurality of wheels, such as, for example, a left drive wheel 124, a right drive wheel 126, and a rear pivot wheel 128. In an embodiment, the left and right drive wheels 124 and 126 can each be rotatably driven by one or more electric motors while the rear pivot wheel 128 may be unpropelled. The rear pivot wheel 128 may be pivotable about a vertical pivot axis to permit redirection of the lawn mower 100 in a zero radius turn. Lawn mowers 100 capable of zero radius turns are often referred to as zero radius turn (ZTR) mowers. The lawn mower 100 can alternatively have a different wheel arrangement including, e.g., two front wheels and two rear wheels or one front wheel and two rear wheels.

Figures 29, 30:
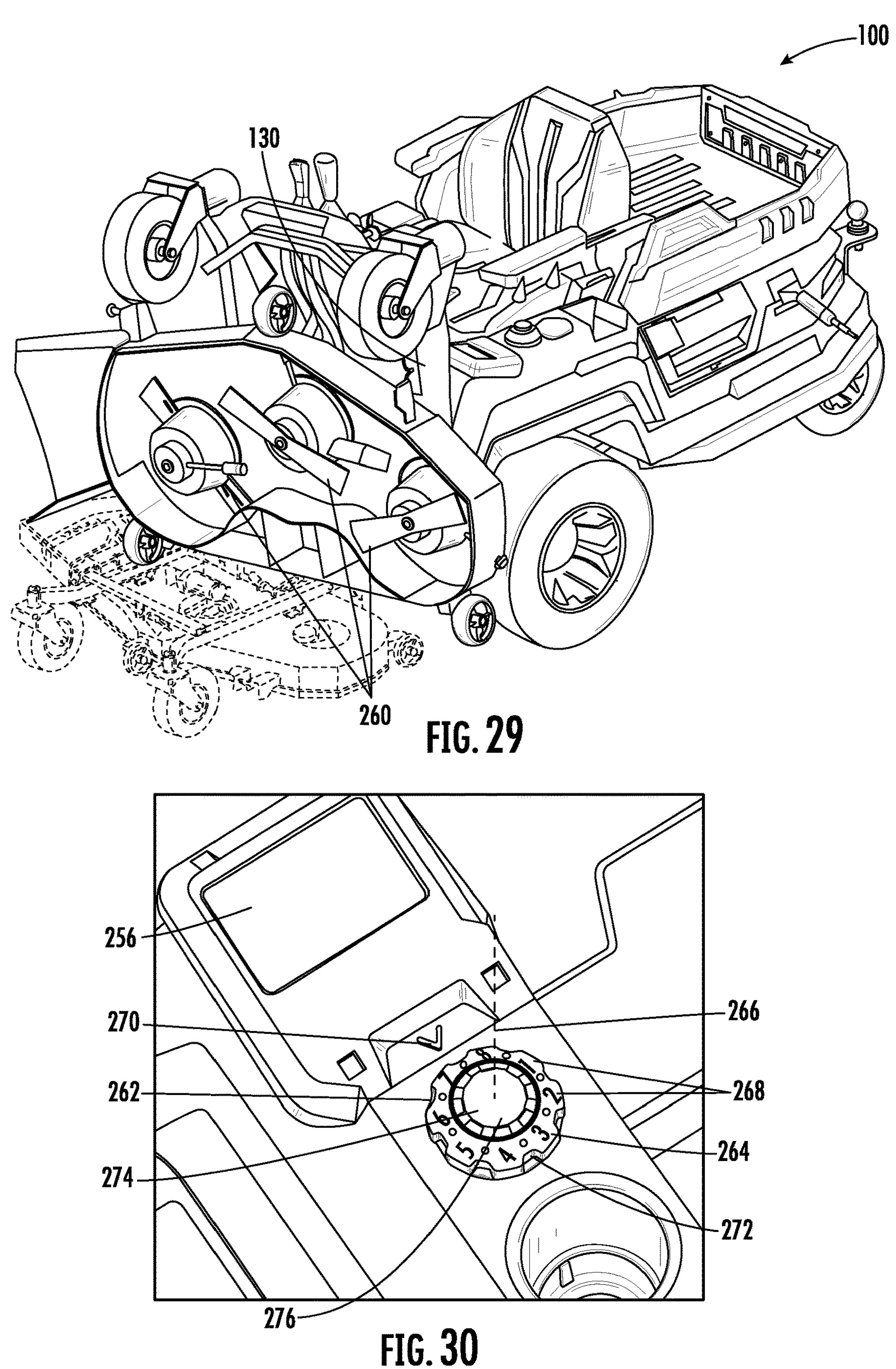
FIG. 29 is a front perspective view of the lawn mower in accordance with embodiments of the present disclosure as seen with the mower deck in an in-use position and a storage/maintenance position.
FIG. 30 is a rear perspective view of an interactive display and height adjustment implement of the lawn mower in accordance with embodiments of the present disclosure.

The mower deck 118 can be supported by a mower deck frame 130 which is coupled to the frame 102 of the lawn mower 100. By way of non-limiting example, the mower deck frame 130 can include a first frame member 132 and a second frame member 134 spanned by one or more secondary frame members 136. The first and second frame members 132 and 134 can be coupled to the frame 102. For example, the first and second frame members 132 and 134 can be pivotally coupled to the frame 102. Pivotal connection between the mower deck frame 130 and the frame 102 can allow the lawn mower 100 to transition between two or more positions, e.g., the depicted in-use position and a storage/service position (FIG. 29). In an embodiment, the mower deck frame 130 can support the mower deck 118 in the in-use position. The mower deck 118 can be suspended from the mower deck frame 130 and height adjustable relative therewith. As described in greater detail below, the mower deck 118 can be adjustably coupled to the mower deck frame 130. In this regard, the height of the mower deck 118 can be adjusted without adjusting the mower deck frame 130.

The mower deck frame 130 can include one or more wheels, such as one or more caster wheels 138, to support the mower deck 118 on the underlying ground surface. In an embodiment, the one or more caster wheels 138 are coupled to the first and second frame members 132 and 134 at the front end 120 of the lawn mower 100. In an embodiment, each of the caster wheels 138 may be rotatable about a respective vertical axis through 360 degrees of movement. In this regard, the caster wheels 138 can support the mower deck frame 130 without effecting steering control to the lawn mower 100. In another embodiment, the wheels 138 may be powered and together or independently controlled by one or more motors separate from the motor(s) driving the rear wheels (e.g., to increase traction and control).

The mower deck 118 can include one or more wheels, such as one or more gauge wheels 140. The gauge wheels 140 can support the mower deck 118 on the underlying ground surface when the mower deck 118 is at a lowest cutting height or when traversing highly undulating or bumpy terrain. At the lowest cutting height, the gauge wheels 140 can roll on the underlying ground surface to maintain the cutting implement 260 (FIG. 29) above a critical threshold from the ground. Below the critical threshold, the cutting implement 260 might strike the ground. The gauge wheels 140 can also provide support for certain mower deck operations, such as articulation of the mower deck 118 or removal of the mower deck 118, e.g., during servicing operations.

Figure 47:
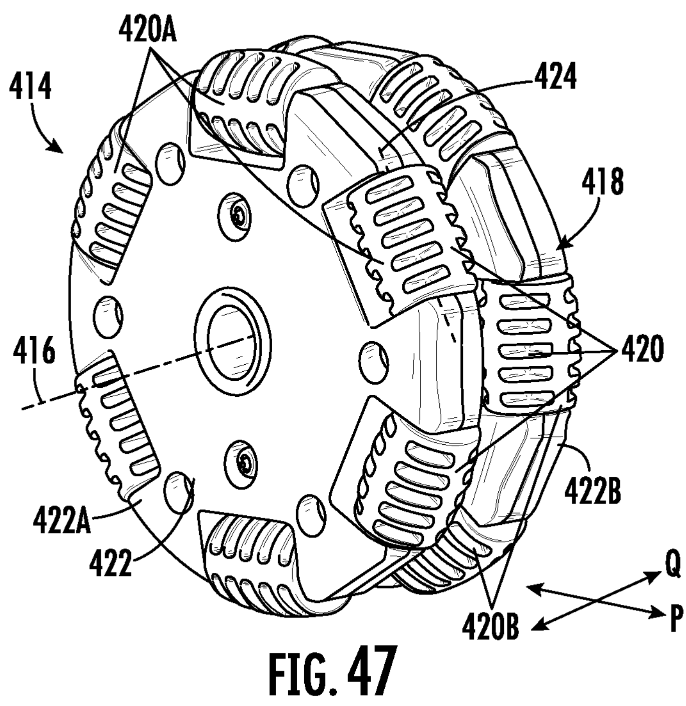
FIG. 47 is a perspective view of a multidirectional gauge wheel in accordance with embodiments of the present disclosure.
Figure 48:
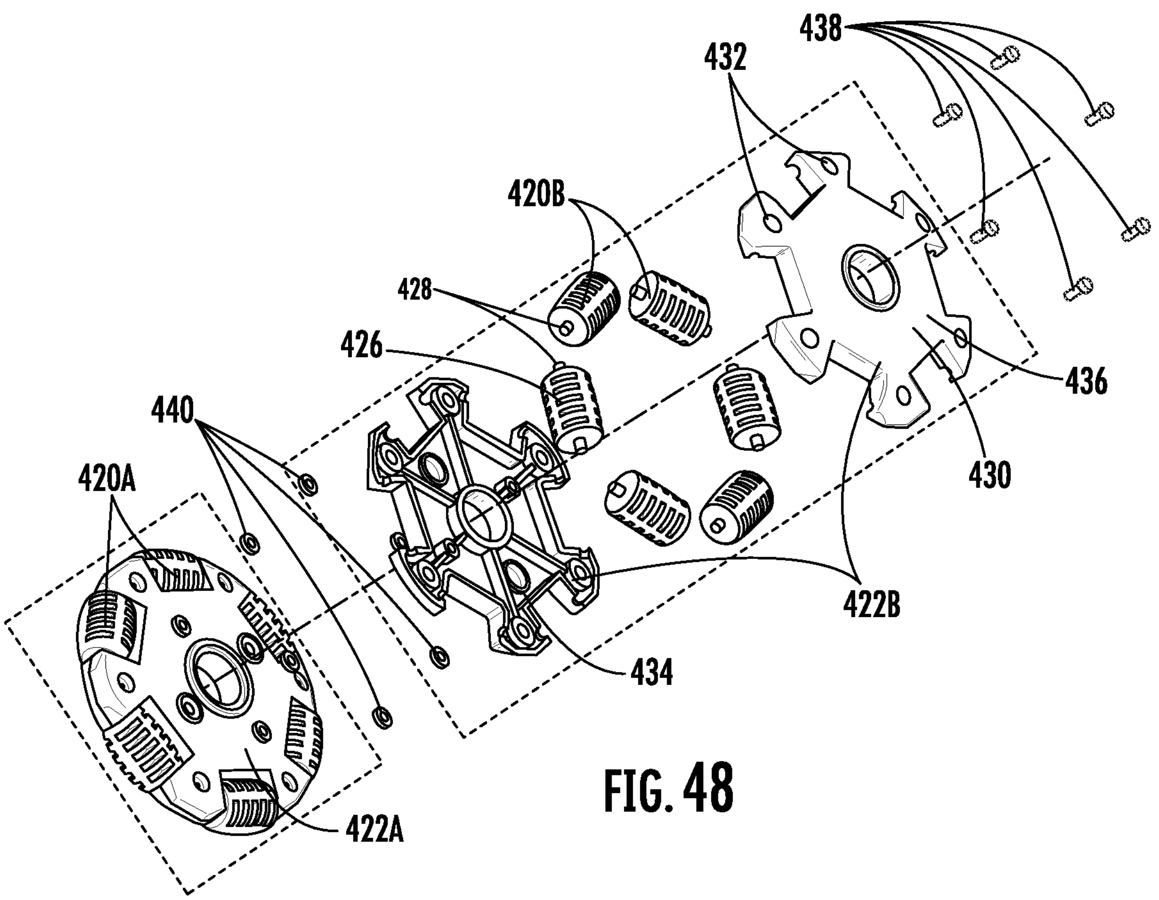
FIG. 48 is a partially exploded view of the multidirectional gauge wheel in accordance with embodiments of the present disclosure.

In an embodiment, at least one of the gauge wheels can be a multidirectional gauge wheel. For example, FIGS. 47 and 48 illustrate a gauge wheel 414 in accordance with an embodiment having multidirectional, e.g., omnidirectional, capability. Multidirectional gauge wheels allow for movement of a supported structure, e.g., the mower deck 118, in two or more different directions without reorientation of the gauge wheel like seen with traditional caster wheels. For instance, the gauge wheel 414 can move in a direction shown by arrow P, arrow Q, or a combination thereof. To move in the direction shown by arrow P, the gauge wheel 414 can rotate about its central axis 416 and roll along an outer circumference 418. To move in the direction shown by arrow Q, the gauge wheel 414 can move on one or more rollers 420 disposed at the outer circumference 418 of the gauge wheel 414.

The one or more rollers 420 can include at least two rollers 420, at least three rollers 420, at least four rollers 420, at least five rollers 420, or at least ten rollers 420. Each roller 420 can be rotatably coupled to a main body 422 of the gauge wheel 420 and configured to rotate about a rotational axis 424. The rotational axis 424 can be tangent to the outer circumference 418 at the location of the roller 420. The outer surface of at least one of the rollers 420 can be shaped to enhance grip with an underlying surface. By way of non-limiting example, the outer surface of the roller(s) 420 can have any one or more of grooves, projections, dimples, teeth, knurling, ribbing, treads, or the like. The outer surface shape of the rollers 420 can be suitable for grip when the gauge wheel 414 moves in either or both of the directions shown by arrows P or Q. For example, certain grip enhancing features of the rollers 420 can assist in providing grip during movement in the direction shown by arrow P while other grip enhancing features of the rollers 420 can assist in providing grip during movement in the direction shown by arrow Q.

In the depicted embodiment, the gauge wheel 414 includes two sets of rollers—a first set of rollers 420A and a second set of rollers 420B. Each set of rollers 420A and 420B can be supported by a portion of the main body 422. For example, the main body 422 can include a first main body portion 422A supporting the first set of rollers 420A and a second main body portion 422B supporting the second set of rollers 420B. In an embodiment, the first and second main body portions 422A and 422B can be statically fixed together and spaced apart from one another to better distribute loading forces. The first and second main body portions 422A and 422B can be parallel, generally symmetrical, or both. The sets of rollers 422A and 422B can be rotationally offset from one another such that locations of the outer circumference 418 without one of the first set of rollers 422A can include one of the second set of rollers 422B. Splitting the rollers 420 into a plurality of sets 420A and 420B and rotatably offsetting the sets relative to one another can allow for continuous contact of rollers 420 along the underlying ground surface such that at least one roller is disposed on the ground surface regardless of the angular orientation of the gauge wheel 414 with respect to the central axis 416 without weakening the gauge wheel 414. That is, regardless of angular orientation of the gauge wheel 414 relative to the underlying ground surface, one or more of the rollers 420 can provide support while the first and second main body portions 422A and 422B are spaced apart from the underlying ground surface.

FIG. 48 illustrates a partially exploded view of the gauge wheel 414 as seen in accordance with an embodiment where the first main body portion 422A and first set of rollers 420A are depicted in the assembled state and the second main body portion 422B and the second set of rollers 420B are depicted in a deconstructed, exploded state. As depicted, each roller 420B includes a body 426 with engagement points 428 for rotatably coupling the body 426 to the second main body 422B. The second main body 422B includes a central hub 430 with a plurality of complementary engagement points 432 for receiving the engagement points 428. In the depicted embodiment, the second main body 422B includes a first piece 434 and a second piece 436 which, when joined together, form the complementary engagement points 432 where the engagement points 428 are rotatably received. In an embodiment, the engagement points 428 and complementary engagement points 432 can be coupled together through a low friction interface, such as a bearing. One or more fasteners 438 can selectively couple the first and second pieces 434 and 436 of the second main body 422B together to retain the second set of rollers 420B. In an embodiment, at least one of the fasteners 438 can further interact with the first main body portion 422A, e.g., to secure the first and second main body portions 422A and 422B together. One or more spacers 440 can be disposed between the first and second main bodies 422A and 422B to maintain a fixed distance between the first and second set of rollers 420A and 420B. In other embodiments, different configurations of the gauge wheels 414 are possible. For instance, by way of non-limiting example, the rollers 420 can be snap fit or overmolded to a fixed member (e.g., a cylinder) of the main body 422. Alternatively, by way of another non-limiting example, the rollers 420 can be slid over one or more cantilevered member(s) of the main body 422.

Use of multidirectional gauge wheels 414 like those depicted in FIGS. 47 and 48 may allow for easy multidirectional movement of the supported structure, e.g., the mower deck 118 without having to rotate pivotable caster wheels. For instance, as described in greater detail below, using multidirectional gauge wheels 414, the operator may remove the mower deck 118 from the lawn mower 100 and slide the mower deck 118 in any direction relative to the lawn mower 100 for removal. This can allow the operator to move the mower deck 118 in tighter spaces without requiring multi-point turns.

In an embodiment, the mower deck 118 can be supported by a plurality of multidirectional gauge wheels, like the gauge wheels 414 depicted in FIGS. 47 and 48. In certain instances, the mower deck 118 can be further supported by one or more non-multidirectional gauge wheels like the gauge wheels 140 depicted in FIG. 1. In such instances, the multidirectional gauge wheels 414 can be disposed at a different vertical elevation as compared to the non-multidirectional gauge wheels 140. In this regard, the multidirectional gauge wheels 414 can contact the ground for maneuverability of the mower deck 118 while the non-multidirectional gauge wheels 140 can prevent scalping of the underlying ground surface.

Referring again to FIG. 2, the mower deck 118 can further include a mower deck faring 119 which covers one or more components of the mower deck 118. In certain instances, the mower deck faring 119 may provide structural support elements (not illustrated) like steps, platforms, attachment points, or the like. The structural support elements can assist the operator when entering and exiting the vehicle, support tools or auxiliary equipment like retrofittable lights or speakers, or the like. In certain instances, the mower deck faring 119 can be removed from the mower deck 118 (or opened, e.g., pivoted) to provide access to underlying components, such as underlying motors associated with the cutting implements 260.

A foot platform 142 can be coupled to the frame 102 of the lawn mower 100 and extend forward of the seat 106 to provide an area for the operator to rest their feet during use of the lawn mower 100. In some embodiments, the foot platform 142 can extend over at least a portion of the mower deck 118, e.g., a rear portion of the mower deck 118. The foot platform 142 can include an angled front surface 144 against which the operator can push against with their feet to maintain ideal seated position. The foot platform 142 can include a high grip surface to prevent the operator from slipping when entering and exiting the lawn mower 100. Exemplary high grip surfaces include textured surfaces, tacky surfaces, rubber surfaces, and the like.

In some instances, the foot platform 142 can be moveably coupled to the frame 102 of the lawn mower 100. For example, the foot platform 142 can be pivotally coupled to the frame 102 such that the foot platform 142 can be moved between an in-use position (as illustrated) and a different position. As described in greater detail below, adjusting the position of the foot platform 142 from the in-use position may allow the operator to gain access to one or more underlying components of the lawn mower 100 and allow the operator to articulate the mower deck 118 to a position for storage and/or service.

In an embodiment, the lawn mower 100 can include an accessory linkage, such as a tow hitch 146. The tow hitch 146 can receive a complementary tow feature (not illustrated) associated with one or more towable accessories, allowing the operator to move accessories within a work environment using the lawn mower 100. In an embodiment, the tow hitch 146 can be disposed at the rear end 122 of the lawn mower 100 and can include a ball hitch receiver or other suitable hitch type. In certain instances, the tow hitch 146 can be removable from the lawn mower 100. In other instances, the tow hitch 146 can be fixed to the lawn mower 100, e.g., at the frame 102.

In an embodiment, the lawn mower 100 can include a storage bed 148 configured to store and haul various materials, such as for example, soil, vegetation, mulch, garden tools, yard maintenance tools, or the like. The storage bed 148 can be disposed at the rear end 122 of the lawn mower 100, e.g., behind the seat 106. The storage bed 148 can include a support surface 150 upon which the various materials contained in the storage bed 148 can be supported. The support surface 150 can include grip enhancing features, such as ribs, projections, or textured features, to prevent movement of the various materials relative to the storage bed 148 when riding. A sidewall 152 can extend around at least a portion of the storage bed 148. For example, the sidewall 152 can extend around at least 10% of a perimeter of the storage bed 148, such as at least 20% of the perimeter of the storage bed 148, such as at least 30% of the perimeter of the storage bed 148, such as at least 40% of the perimeter of the storage bed 148, such as at least 50% of the perimeter of the storage bed 148, such as at least 60% of the perimeter of the storage bed 148, such as at least 70% of the perimeter of the storage bed. In some instances, the sidewall 152 can include one continuous side surface extending around the perimeter of the storage bed 148. In other instances, the sidewall 152 can include two or more disconnected segments. In some embodiments, all portions of the sidewall 152 can have a uniform height. In other embodiments, the sidewall 152 can include segments having different relative heights. For instance, in the depicted embodiment, the left and right sides 154 and 156 of the storage bed 148 have taller sidewalls 152 as compared to the sidewall 152 at the front side 158 of the storage bed 148. This may prevent the various materials contained in the storage bed 148 from spilling over the lateral sides of the sidewall 152 during sharp turns.

In some embodiments, the sidewall 152 of the storage bed 148 can include a gate 160 moveable between a closed position (FIG. 1) and an open position (FIG. 2). Movement of the gate 160 can occur through rotation, translation, or both. For instance, by way of non-limiting example, the gate 160 can include projecting tabs (not illustrated) that slidably move up and down within a guided track of the sidewall 152. Alternatively, the sidewall 152 can include projecting tabs (not illustrated) that fit within a guided track of the gate 160, allowing the gate to slidably move up and down relative to the sidewall 152. By way of another example, the gate 160 can be pivotally mounted to another portion of the storage bed 148, e.g., the sidewall 152. In this regard, the gate 160 can rotate between open and closed positions. In some instances, pivotal movement of the gate 160 can occur about a vertical axis. In other instances, pivotal movement of the gate 160 can occur about a horizontal axis. In an embodiment, the gate 160 can include a plurality of segments each individually moveable between open and closed positions. Each of the plurality of segments may be individually opened and closed to define different storage bed configurations.

The gate 160 depicted in FIG. 1 is disposed at a rear location of the sidewall 152. In other embodiments, the gate 160 can be disposed along the left or right side 154 or 156 of the sidewall 152. In some instances, the storage bed 148 can include two or more gates, e.g., a first gate 160 disposed along the left side 154 of the storage bed 148 and a second gate 160 disposed along the right side 156 of the storage bed 148. A third gate 160 can be disposed at the rear end of the storage bed 148.

As described above, the storage bed 148 can be used to store and haul various materials, e.g., soil, mulch and the like, around the work environment. When the lawn mower 100 arrives at a location where the various materials are required, the operator can open the gate 160 and move the storage bed 148 from the in-use position to a dump position illustrated in FIG. 4. With the gate 160 open and the storage bed 148 in the dump position, the various materials quickly exit the storage area under the force of gravity after which point the operator can return the storage bed 148 to the in-use position as depicted in FIGS. 1 and 2.

Figure 3:
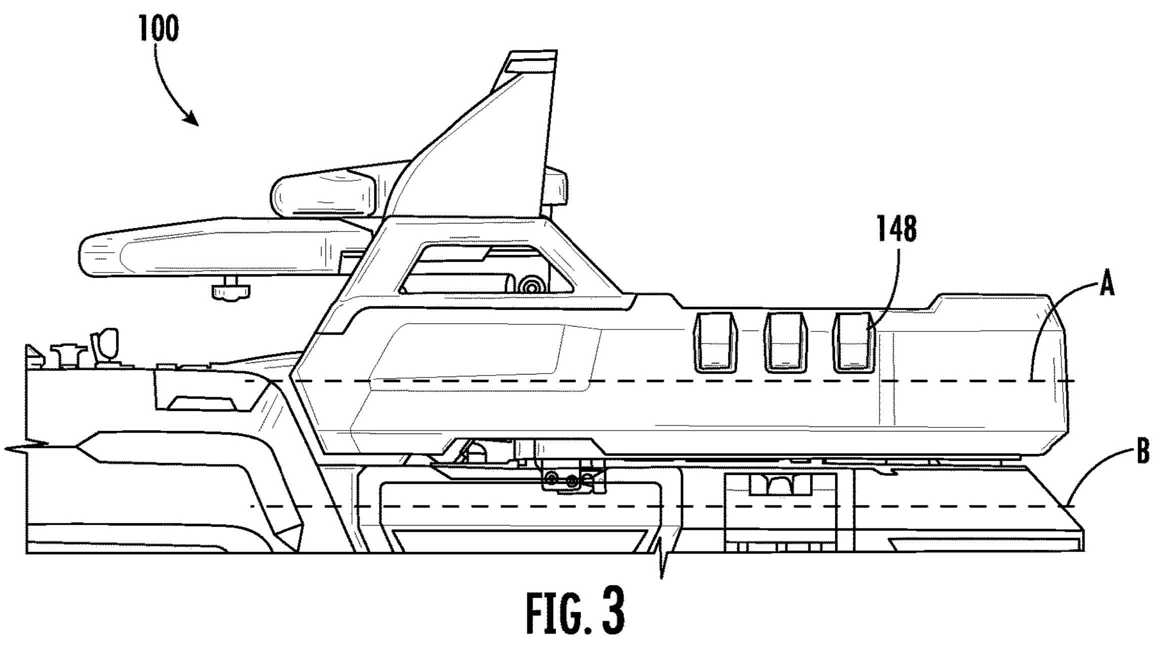
FIG. 3 is a side view of a portion of the lawn mower in accordance with embodiments of the present disclosure as seen with a storage area in an in-use position.
Figure 4:
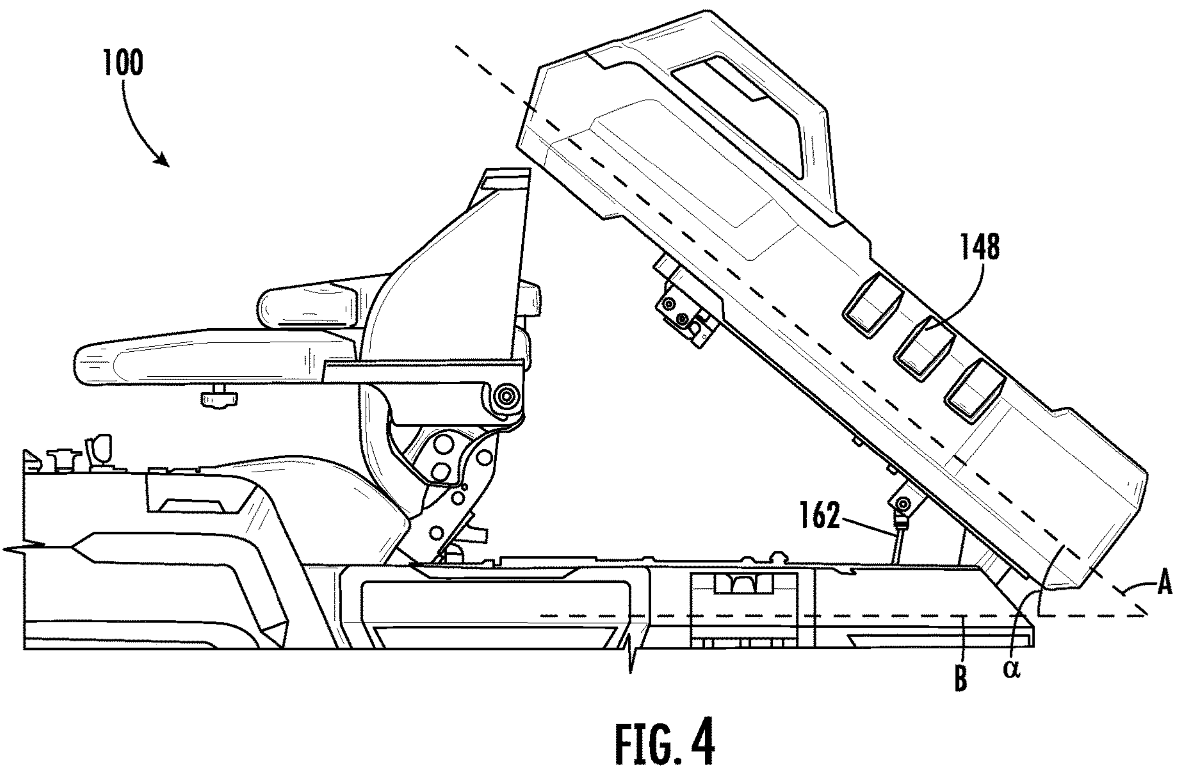
FIG. 4 is a side view of a portion of the lawn mower in accordance with embodiments of the present disclosure as seen with the storage area in a dump position.

FIG. 3 illustrates a partial side view of the lawn mower 100 depicting the storage bed 148 in the in-use position as encountered when the storage bed 148 is ready to store and haul various materials. FIG. 4 illustrates a partial side view of the lawn mower 100 depicting the storage bed 148 in the dump position as encountered, e.g., when the storage bed 148 is being emptied.

As depicted in FIGS. 3 and 4, the storage bed 148 can define a best fit line A which coincides with the support surface 150 (FIGS. 1 and 2). The best fit line A can be oriented generally parallel with a horizontal plane B when the storage bed 148 is in the in-use position (FIG. 3). When the storage bed 148 is in the dump position, the best fit line A can be angularly offset from the horizontal plane B by an angle $\alpha$. In an embodiment, a can be at least 5°, such as at least 10°, such as at least 15°, such as at least 20°, such as at least 25°, such as at least 30°, such as at least 35°, such as at least 40°, such as at least 45°. In another embodiment, a can be 900 or less than 90°, such as less than 85°, such as less than 80°, such as less than 75°, such as less than 70°, such as less than 65°, such as less than 60°.

A maximum angular offset between the best fit line A and the horizontal plane B when the storage bed 148 is in the dump position can be determined by a support element 162 shown in FIG. 4. The support element 162 can confine angular displacement of the storage bed 148 between the in-use position and dump position. That is, the support element 162 can prevent over-rotation of the storage bed 148.

Figures 5, 6, 7:
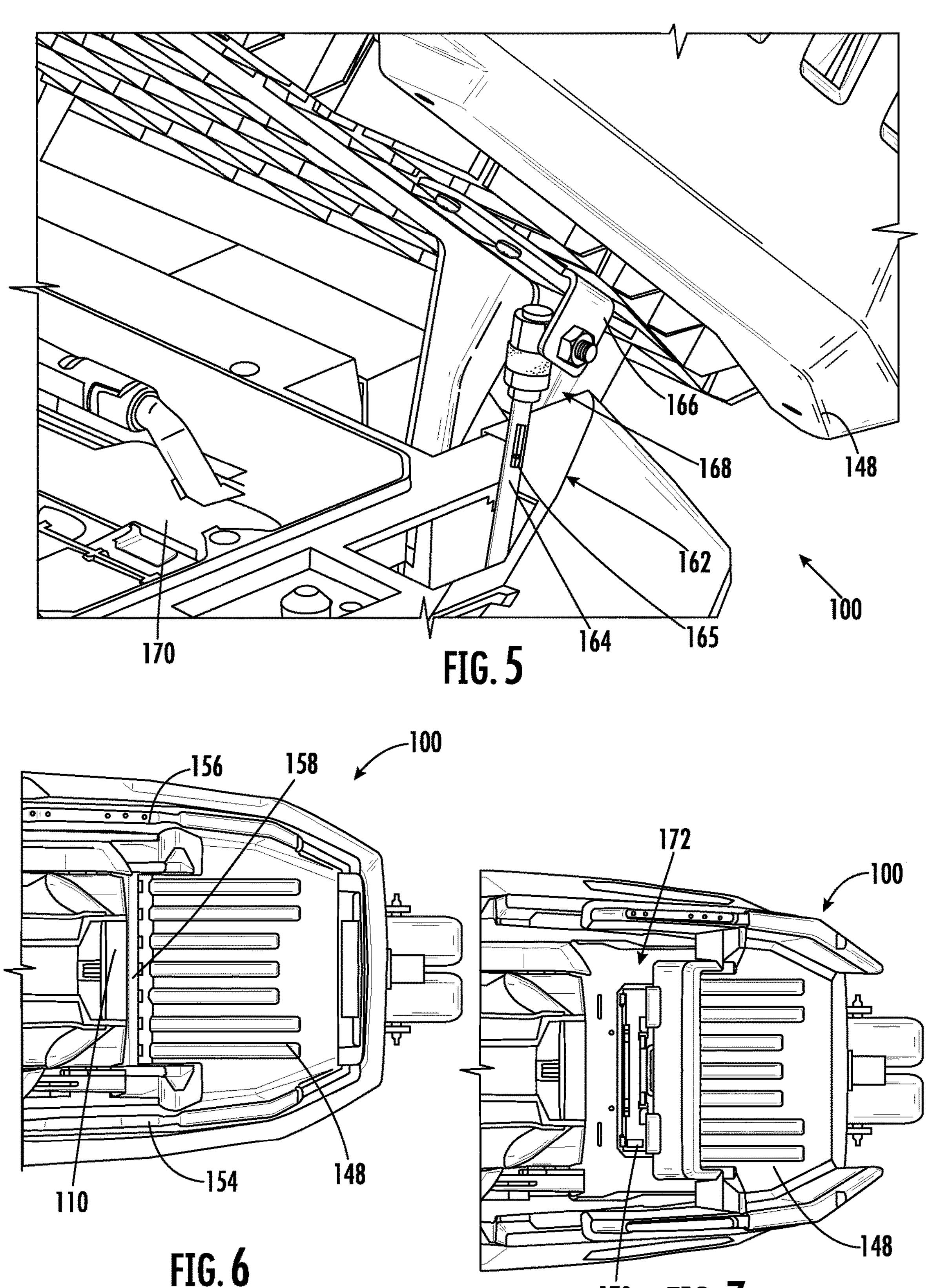
FIG. 5 is a front perspective view of a portion of the lawn mower in accordance with embodiments of the present disclosure as seen with the storage area in a dump position.
FIG. 6 is a top view of a portion of the lawn mower in accordance with embodiments of the present disclosure as seen with the storage area in the in-use position.
FIG. 7 is a top view of a portion of the lawn mower in accordance with embodiments of the present disclosure as seen with the storage area in the dump position.

FIG. 5 illustrates an enlarged view of the support element 162 connecting the storage bed 148 to the lawn mower 100. As depicted, the support element 162 can include a rod 164 moveably coupled, e.g., pivotally coupled, to the frame 102 of the lawn mower 100. The rod 164 can also be moveably coupled, e.g., pivotally coupled, to the storage bed 148, e.g., through a bracket 166. The support element 162 can define a minimum extension length and a maximum extension length between which the support element 162 can transition to permit confined angular displacement of the storage bed 148 relative to the frame 102. When the support element 162 is at the minimum extension length, the storage bed 148 is in the in-use position. When the support element 162 is at the maximum extension length, the storage bed 148 is in the dump position.

In an embodiment, the support element 162 can include a quick disconnect feature 168. By way of non-limiting example, the quick disconnect feature 168 can include a bayonet connection, a ball detent connection, a removable cotter pin connection, a threaded connection, a bolted connection, an interference fit, or the like. The quick disconnect feature 168 allows the storage bed 148 to be quickly detached from the frame 102 such that the storage bed 148 can be further opened past the dump position. The operator can quickly detach the storage bed 148 from the rod 164 using the quick disconnect feature 168. In this regard, the storage bed 148 can be opened past the angle α depicted in FIG. 4, e.g., for servicing operations or to access one or more batteries 170 of the lawn mower 100.

In an embodiment, the lawn mower 100 can include an assisted lift mechanism 165. By way of non-limiting example, the assisted lift mechanism 165 can include a gas spring, a coil spring, a motorized linear actuator, a hydraulic actuator, or the like. In an embodiment, the assisted lift mechanism 165 can form at least a portion of the support element 162, i.e., the assisted lift mechanism 165 can be part of the support element 162.

The assisted lift mechanism 165 can assist in moving the storage bed 148 from the in-use position to the dump position. The assisted lift mechanism 165 can bias the storage bed 148 to the dump position. In some instances, the biasing force provided by the assisted lift mechanism 165 can be fixed, i.e., not adjustable. In other instances, the assisted lift mechanism 165 can be adjustable. That is, the biasing force exhibited on the storage bed 148 can be customized for each load. In this regard, the operator can increase force on the storage bed 148 to dump heavy loads and decrease the force on the storage bed 148 to dump light loads.

In an embodiment, the variable biasing force can be manually set at the support element 162. For example, the operator can set a position of the rod 164, a length of the rod 164, a position of the rod 164 relative to the bracket 166, a control element (e.g., a dial, slider, or lever) of the assisted lift mechanism 165, or the like. In another embodiment, the variable biasing force may be set at an area remote from the support element 162, e.g., at a user interface near the seat 106.

In another embodiment, the variable biasing force can be at least partially determined or affected by a logic device, e.g., a controller, of the lawn mower 100. For example, a control system 280 of the lawn mower (FIG. 33) can include a storage bed controller 281 which receives information from the assisted lift mechanism 165 or a storage bed sensor (e.g., a load sensor detecting load on the storage bed 148), and determines a biasing force for the assisted lift mechanism 165. The storage bed controller 281 can then communicate the determined biasing force to the assisted lift mechanism 165. In yet another embodiment, the assisted lift mechanism 165 can have a closed loop current/voltage system which automatically adjusts current, voltage, or both in view of current measured conditions and threshold conditions.

Figures 8, 9, 10:
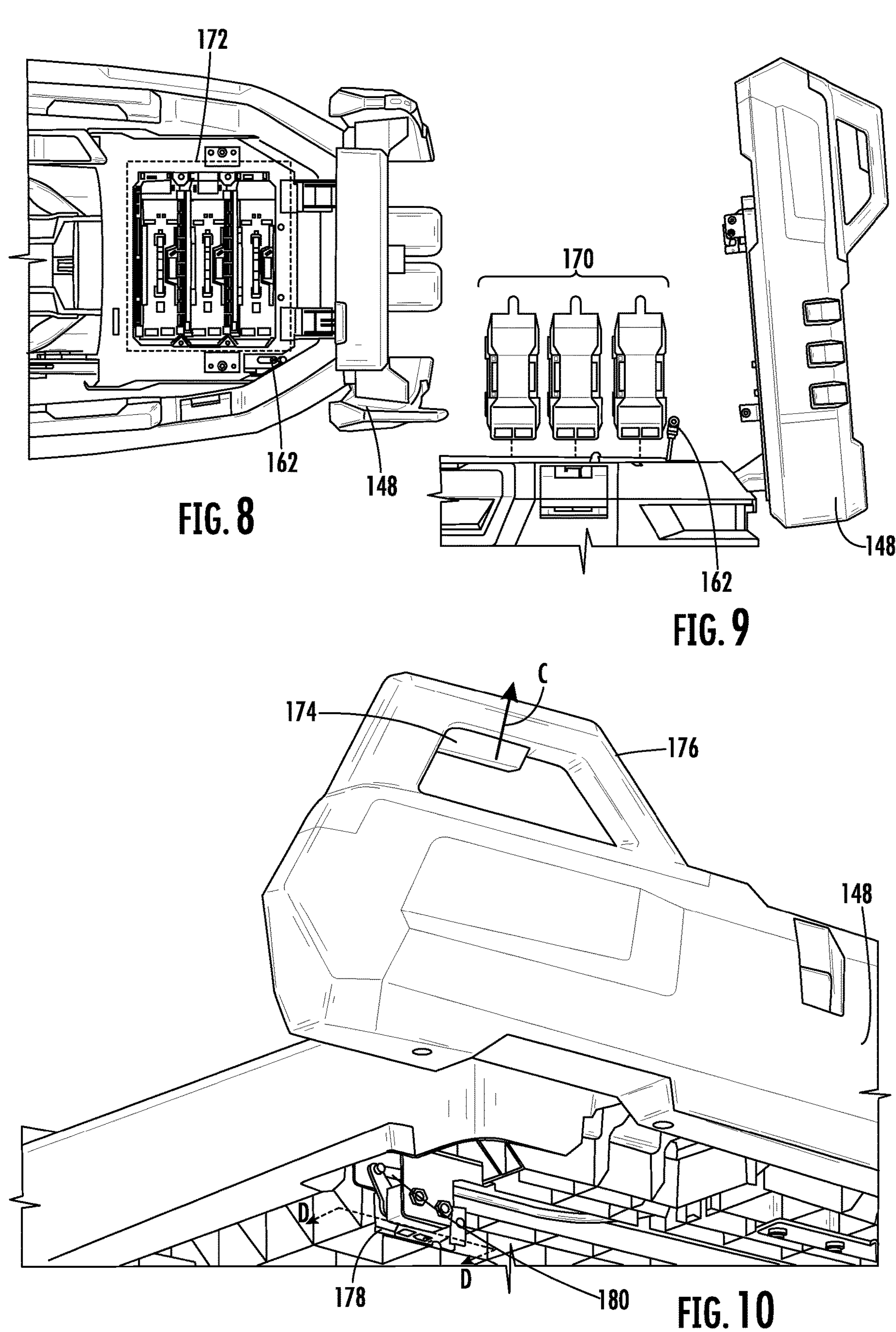
FIG. 8 is a top view of a portion of the lawn mower in accordance with embodiments of the present disclosure as seen with the storage area opened to access one or more batteries of the lawn mower.
FIG. 9 is a side view of a portion of the lawn mower in accordance with embodiments of the present disclosure as seen with the one or more batteries removed from a battery receiving area of the lawn mower.
FIG. 10 is a front perspective view of an underside of the storage area in accordance with embodiments of the present disclosure.

FIG. 6 illustrates a top view of a portion of the lawn mower 100 as seen with the storage bed 148 in the in-use position. FIG. 7 illustrates a top view of the portion of the lawn mower 100 as seen with the storage bed 148 in the dump position. As depicted, the storage bed 148 can extend over one or more of the one or more batteries 170 which are part of an electrical system to power the lawn mower 100. In the in-use position, storage bed 148 can protect the one or more batteries 170. When the storage bed 148 is moved to the dump position, the one or more batteries 170 disposed beneath the storage bed 148 may become visible from a position external to a battery receiving area 172 of the lawn mower 100. However, in some embodiments the one or more batteries 170 may not be removable from the lawn mower 100 with the storage bed 148 in the dump position as depicted in FIG. 7. Instead, as illustrated in FIGS. 8 and 9, the support element 162 can be moved to a disconnected state, e.g., at the quick disconnect feature 168 (FIG. 5), to permit further rotation of the storage bed 148 to an access position whereby an operator can gain access to the battery receiving area 172 previously disposed under the storage bed 148. With the storage bed 148 in the access position, the one or more batteries 170 can be removed from the battery receiving area 172, e.g., by translating the one or more batteries 170 in a generally vertical direction from the battery receiving area 172. In yet another embodiment, an intermediary member (not illustrated) may be disposed between the battery receiving area 172 and the storage bed 148. The intermediary member can protect the battery receiving area 172 and at least one of the one or more batteries 170 contained therein. By way of non-limiting example, the intermediary member can include a rigid plate, a roll up cover, a foldable member, one or more sliding slats, or the like. In certain instances, the intermediary member can be secured at the desired location by one or more fasteners (e.g., threaded fasteners, non-threaded fasteners, or the like) which can be selectively removed to access the battery receiving area 172. In another embodiment, the intermediary member can be removed by sliding the intermediary member along a track, by rolling up the intermediary member, by another method, or by a combination thereof. In embodiments utilizing the intermediary member, access to the one or more batteries 170 can be selectively restricted when the intermediary member is in a position above the battery receiving area 172. Venting features may be included in the intermediary member to provide cooling airflow to the battery receiving area 172.

The one or more batteries 170 depicted in FIGS. 8 and 9 may be substantially similar to one another or different from each other. Each battery of the one or more batteries 170 can include, e.g., a handle, a battery-to-mower interface port, a lock, a display, a fan, removable or swappable battery banks, safety features, fans, logic devices, and the like. Additional batteries 171 (FIG. 13) can be disposed in one or more secondary battery receiving areas 173 of the lawn mower 100. The additional battery receiving areas 173 may be disposed, e.g., on lateral sides of the lawn mower 100. The additional batteries 170 can slide laterally, or substantially laterally, into the additional battery receiving areas 173.

FIG. 10 illustrates an underside of a portion of the storage bed 148 as seen at a position other than the in-use position. As depicted, the storage bed 148 can include a release mechanism 174. The release mechanism 174 can be moveable between a locked position and an unlocked position. The operator can activate the release mechanism 174 to unlock a latch 178 which locks the storage bed 148 in the in-use position. The release mechanism 174 depicted in FIG. 10 is a depressible button disposed along a handle 176 of the storage bed 148. The operator can selectively activate the release mechanism 174 to an unlocked state, e.g., by moving the release mechanism 174 in a direction shown by arrow C. The operator can assist in raising and lowering the storage bed 148 using the handle 176. In certain instances, the assisted lift mechanism 165 may require the operator to lift the storage bed 148, e.g., at the handle 176 to raise the storage bed 148 to the dump position.

The release mechanism 174 can be coupled to the latch 178 on the faring 104 through a latch cable 180. As the operator moves the release mechanism 172 to the unlocked state, the latch 178 can be operated on by the latch cable 180 to unlock the latch 178 and allow the storage bed 148 to move to the dump position.

Figures 11, 12:
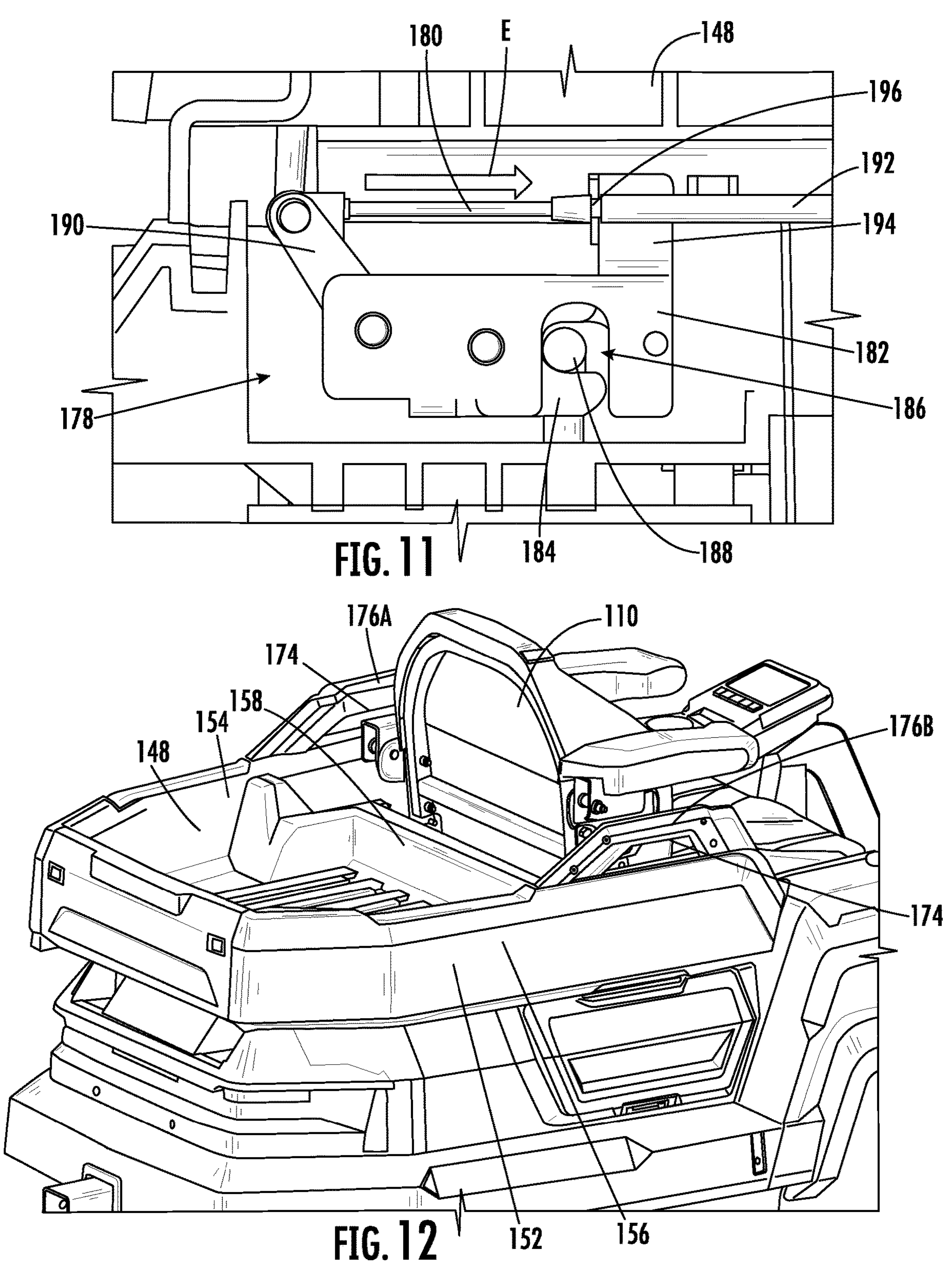
FIG. 11 is a cross-sectional side view of a portion of the storage area in accordance with embodiments of the present disclosure.
FIG. 12 is a rear perspective view of a portion of the lawn mower in accordance with embodiments of the present disclosure.

FIG. 11 illustrates a side view of the latch 178 as seen along Line D-D in FIG. 10. As illustrated, the latch 178 includes a body 182 coupled to the storage bed 148. The latch 178 further includes a gate 184 moveably coupled to the body 182 and defining a locking area 186 in which a catch 188 coupled to the frame 102 is received. The gate 184 can be a rotatable gate coupled to the latch cable 180 through an articulation member 190. When the catch 188 is disposed in the locking area 186, the storage bed 148 is locked in the in-use position. When the gate 184 is open, i.e., pulled away from the locking area 186 by the latch cable 180 and articulation member 190, the catch 188 can translate from the locking area 186, allowing the operator to move the storage bed 148 to the dump or access positions.

In an embodiment, the catch 188 can include a rigid member extending upward from the frame 102. By way of non-limiting example, the catch 188 can have an inverted L-shape with the upper portion of the catch 188 extending generally horizontally so as to intersect the locking area 186. The upper portion of the catch 188 can extend through the locking area 186 so as to be delimited by a combination of the body 182 and the gate 184 of the latch 178. Other latching mechanisms are contemplated herein without deviating from the scope of the disclosure.

As depicted, at least a portion of the latch cable 180 can be disposed within a sheath 192 which extends between the latch 178 and the release mechanism 174. The latch cable 180 can extend through the sheath 192 to protect against ingress of debris and to provide smooth latch operation. An exposed portion of the latch cable 180 allows the latch cable 180 to move in a direction shown by arrow E while pulling the articulation member 190 to move the gate 184 to the open, i.e., unlocked, position. As depicted, an arm 194 of the body 182 can include a receiving area 196 which can hold the sheath 192 to allow for controlled movement of the latch cable 180.

FIG. 12 depicts a rear perspective view of the lawn mower 100 with the storage bed 148 in the in-use position. As depicted, the storage bed 148 includes a first handle 176A and a second handle 176B disposed on left and right sides 154 and 156 of the storage bed 148. In an embodiment, the first and second handles 176A and 176B can share a generally same construction as compared to one another. For example, both the first and second handles 176A and 176B can include a release mechanism 174. The release mechanisms 174 and 174 can each be coupled to the latch 178 (FIG. 11) or a plurality of latches 178 (not illustrated) such that an operator can open and close the latch(es) 178 using either release mechanism 174.

Figure 13:
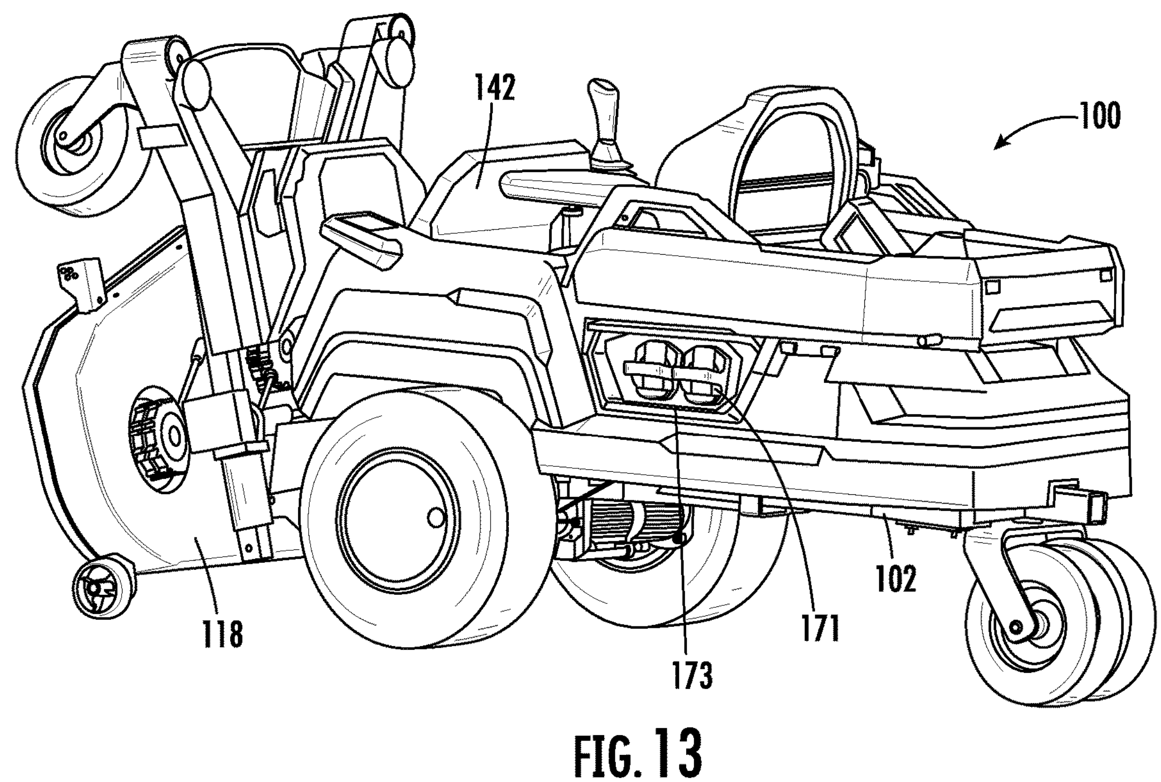
FIG. 13 is a rear perspective view of the lawn mower in accordance with embodiments of the present disclosure.

As illustrated in FIGS. 6 and 12, the left and right sides 154 and 156 of the storage bed 148 can extend forward of the front side 158 of the storage bed 148. In a more particular embodiment, the left and right sides 154 and 156 of the storage bed 148 can extend up to, next to, or past the seat back 110. The handles 176A and 176B can also extend up to, next to, or past the seat back 110 to allow the operator to grasp either one of the handles 176A or 176B from a seated position. By extending up to, next to, or past the seat back 11, the left and right sides 154 and 156 of the storage bed 148 can provide additional protection to the operator, increase rigidity, provide additional grab handles for operational safety, increase perceived rider experience, provide greater leverage when moving the storage bed 148 to the dump position, protect the additional batteries 171 or other underlying components of the lawn mower 100 such as portions of the control system 280, the seat 104, or the like Referring again to FIG. 1, when the operator is using the lawn mower 100 for mowing operations, the mower deck 118 is in an in-use position. In this position, the mower deck 118 is disposed in a generally horizontal configuration below the mower deck frame 130. Turning to FIG. 13, the mower deck 118 can be reconfigurable from the in-use position to a storage/service position. In the storage/service position, the mower deck 118 can be positioned relative to the frame 102 in a manner to allow easier access to elements of the mower deck 118 (e.g., one or more cutting implements 260), to reduce the areal footprint of the lawn mower 100, or the like. An exemplary method of moving the mower deck 118 between the in-use position and the storage/service position will now be described with reference to FIGS. 14 to 29.

Figure 14:
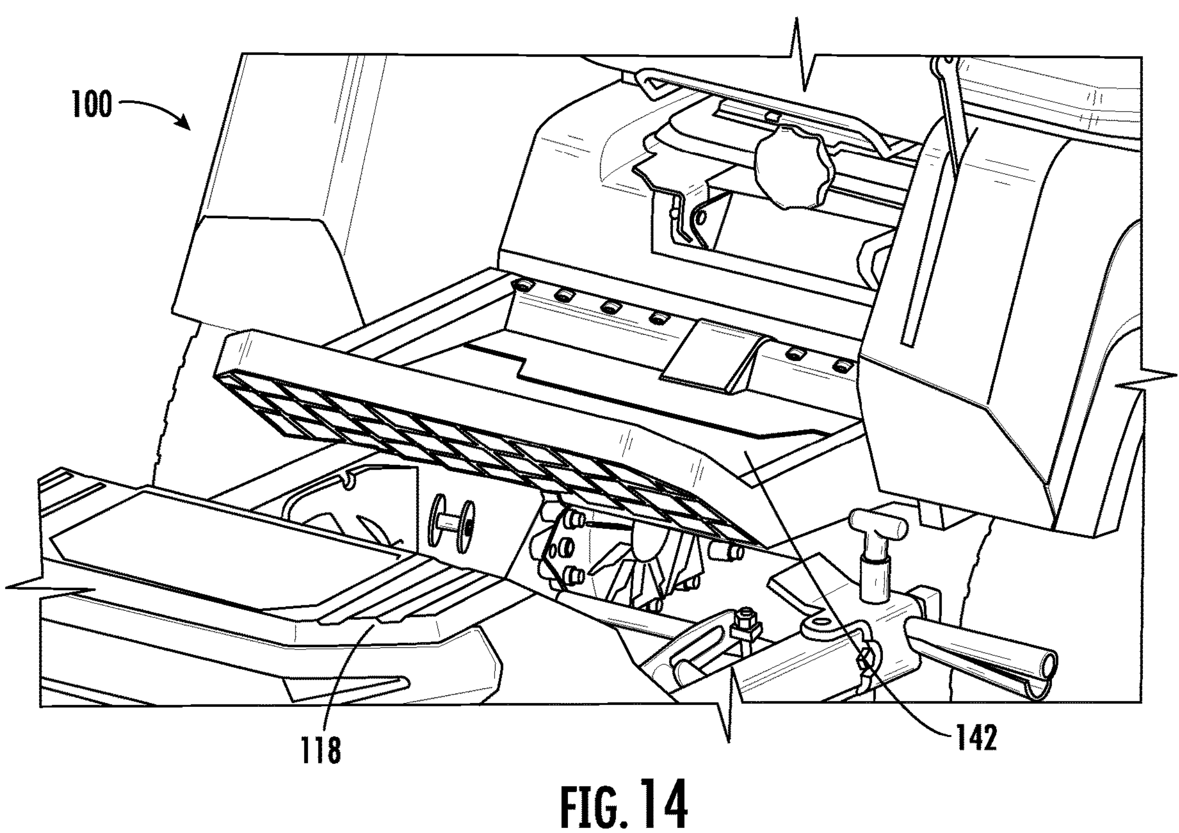
FIG. 14 is a front perspective view of a portion of the lawn mower in accordance with embodiments of the present disclosure.
Figures 15, 16:
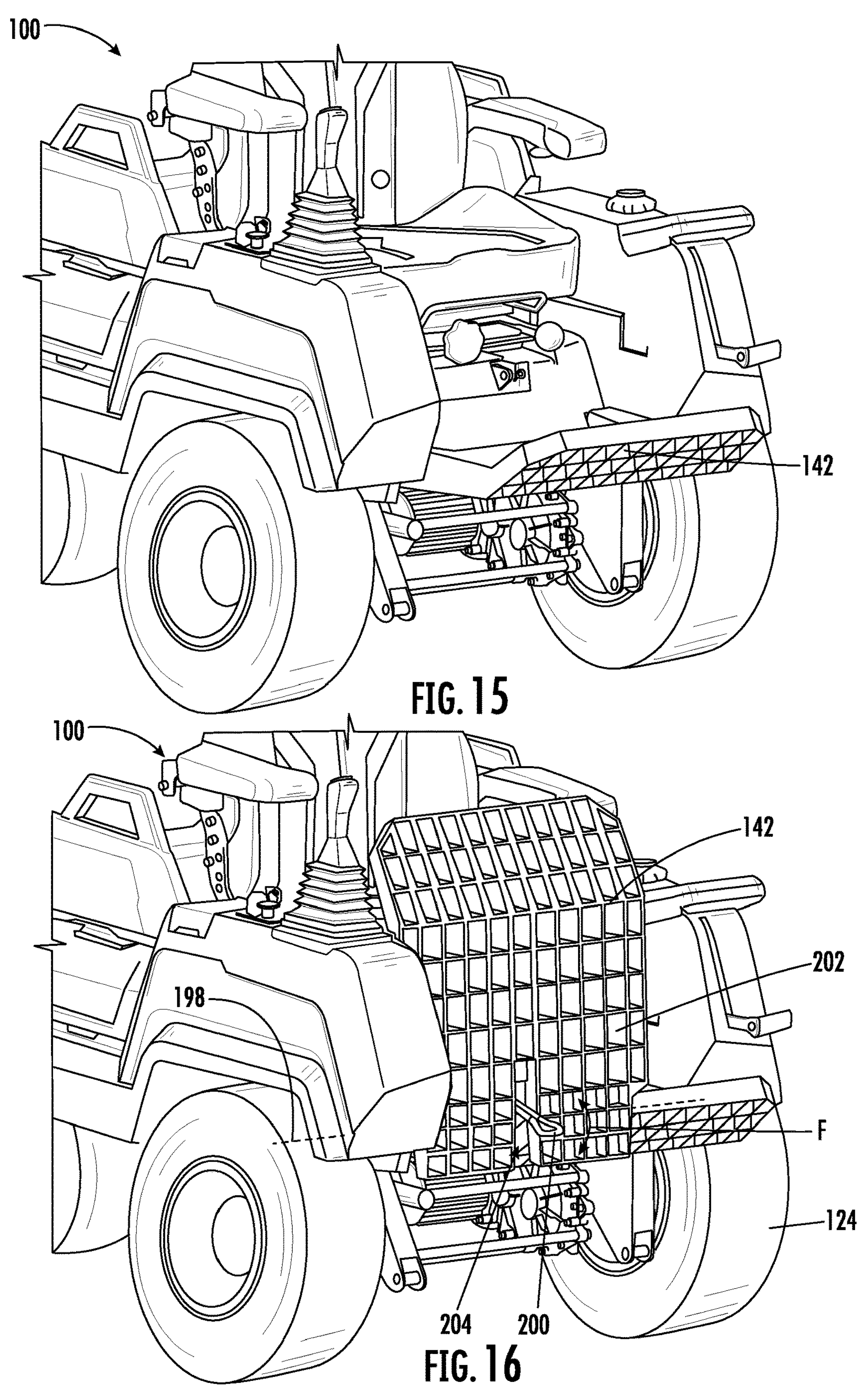
FIG. 15 is a front perspective view of a portion of the lawn mower in accordance with embodiments of the present disclosure as seen with a foot platform of the lawn mower in an in-use position.
FIG. 16 is a front perspective view of the portion of the lawn mower of FIG. 15 in accordance with embodiments of the present disclosure as seen with the foot platform in a storage position.

FIG. 14 illustrates a front view of a portion of the lawn mower 100 as seen in an exemplary embodiment with the foot platform 142 in the in-use, i.e., flipped down, position whereby an operator can utilize the foot platform 142 as support to mount and dismount the lawn mower 100 or to adjust seated posture. The mower deck 118 is also depicted in the in-use, i.e., flipped down, position whereby the lawn mower 100 can perform a mowing operation. FIG. 15 illustrates a front view of the lawn mower 100 with the mower deck removed and the foot platform 142 in the in-use position. FIG. 16 illustrates a front view of the lawn mower 100 with the foot platform 142 in a stored/service position, i.e., filled up. The operator may be inhibited from accessing the seat 106 when the foot platform 142 is in the stored/service position. This may act as a safety feature to prevent unwanted access to the lawn mower 100, e.g., by children that might try to initiate operation of the lawn mower 100 once stored.

In an embodiment, the stored/service position of the foot platform 142 can be rotatably offset from the in-use position. For example, the foot platform 142 can be pivotally coupled to the frame 102 of the lawn mower 100 about a pivot axis 198. In an embodiment, the pivot axis 198 can extend horizontally such that the foot platform 142 extends upward in the stored/service position as depicted in FIG. 16. In an embodiment, the foot platform 142 can be manually pivotable about the pivot axis 198. In another embodiment, the foot platform 142 can be assisted, e.g., by a spring, hydraulic actuator, motor, or the like, between the in-use and storage/service positions.

In an embodiment, the foot platform 142 can remain in the in-use position as a result of gravitational force and be held in the stored/service position due to the center of gravity of the foot platform 142 being past, i.e., behind, the pivot axis 198. In another embodiment, the foot platform 142 may be locked in one or both of the in-use or stored/service positions. For example, the foot platform 142 can interact with a latch which retains the foot platform 142 in the in-use or stored/service positions.

In an embodiment, a tether 200 can be coupled to the frame 102 of the lawn mower 100. As depicted in FIG. 16, the foot platform 142 can include a body 202 defining a cutout 204. The tether 200 can be coupled to the frame 102 of the lawn mower 100 and extend through the cutout 204 in the body 202 of the foot platform 142 when the foot platform 142 is in the stored/service position. By way of non-limiting example, the tether 200 can include a looped cable, a chain, a bar, a D-ring, a carabiner, or another attachment mechanism. In an embodiment, the tether 200 can be selectively extended through the cutout 204. For example, the tether 200 can be rotated in either direction shown by arrowed line F. In certain instances, rotation of the tether 200 can be performed manually. In other instances, the tether 200 can be biased or assisted to extend through the cutout 204 when the foot platform 142 is in the stored/service position.

Referring again to FIG. 1, the lawn mower 100 can further include a lifting element, such as a winch 206, operatively coupled to the mower deck 118. In an embodiment, the winch 206 can also be coupled to the mower deck frame 130. A winch cable 208 can extend from the winch 206 to selectively raise and lower the mower deck 118 relative to the mower deck frame 130. As the winch cable 208 is taken up by the winch 206, the mower deck 118 can raise relative to the underlying ground surface. Conversely, as the winch cable 208 is let out from the winch 206, the mower deck 118 can lower relative to the underlying surface. The winch 206 can be powered by the one or more batteries 170 (FIGS. 7 to 9) or additional batteries 171 and controlled by the operator, e.g., through a user interface 210.

Figures 17, 18, 19:
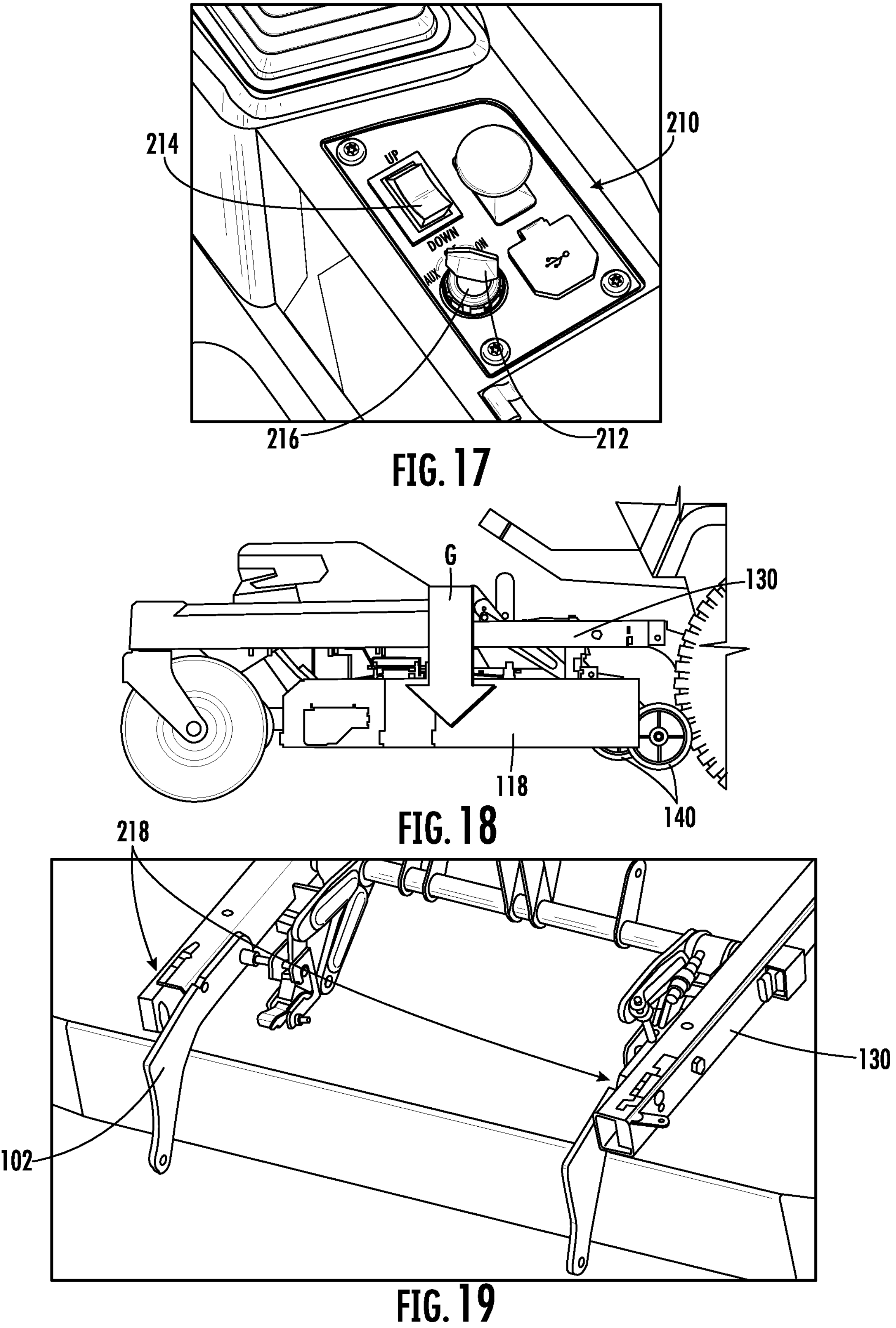
FIG. 17 is a top perspective view of a user interface of the lawn mower in accordance with embodiments of the present disclosure.
FIG. 18 is a side view of a mower deck coupled with a mower deck frame of the lawn mower in accordance with embodiments of the present disclosure.
FIG. 19 is a rear perspective view of an engagement interface between a frame of the lawn mower and a mower deck frame of the lawn mower in accordance with embodiments of the present disclosure.

FIG. 17 illustrates a perspective view of the user interface 210 as seen in accordance with an exemplary embodiment. The user interface 210 can be disposed near the seat 106 of the lawn mower 100 (FIG. 1). By way of non-limiting example, the user interface 210 can include a selector such as a key 212, and a switch 214. The key 212 can be part of a power selector of the lawn mower 100, moveable between an ON position, an OFF position, and an auxiliary (AUX) position. The key 212 may be received in a key slot 216 and rotate through user input.

In the depicted embodiment, the key 212 is in the AUX position. In the AUX position, the key 212 can cause the lawn mower 100 to operate in an auxiliary state. In the auxiliary state, the lawn mower 100 can operate at less than full operational capacity. For example, in the auxiliary state, power may not be provided to the left and right drive wheels 124 and 126 (FIG. 1) or to a cutting implement 260 of the lawn mower 100 (FIG. 29). In the auxiliary state, the lawn mower 100 may provide power to the winch 206 (FIG. 1) and, optionally, one or more other accessories of the lawn mower 100.

With the winch 206 receiving power in view of the AUX position of the key 212, the operator can lower the mower deck 118 in a direction shown by arrow G in FIG. 18, e.g., through the use of switch 214 (or another interface). By way of non-limiting example, the switch 214 can be a rocker switch moveable between two or more positions, such as between an UP position, a DOWN position, and a neutral position located therebetween. With the switch 214 in the UP position, the winch 206 can take up the winch cable 208 (FIG. 1) to raise the mower deck 118. Conversely, with the switch 214 in the DOWN position, the winch 206 can let out the winch cable 208 to lower the mower deck 118. When the switch 214 is in the neutral position, the mower deck 118 can be retained at a current height. Other winch interfaces are contemplated herein without deviating from the scope of the disclosure.

Using the switch 214, the operator can lower the mower deck 118, e.g., to a lowest height setting. At the lowest height setting, the gauge wheels 140 of the mower deck 118 can contact the underlying ground surface. With the weight of the mower deck 118 removed from the mower deck frame 130 and instead taken up by the gauge wheels 140, weighted load on the mower deck frame 130 is reduced.

FIG. 19 illustrates a rear perspective view of the mower deck frame 130 as seen in accordance with an exemplary embodiment. One or more latches 218 can selectively secure the mower deck frame 130 in the in-use position relative to the frame 102 of the lawn mower 100. When the latches 218 are locked, the mower deck frame 130 is fixed in the in-use position. When the latches 218 are unlocked, the mower deck frame 130 is moveable between the in-use position and the stored/service position.

Figures 20, 21, 22, 23:
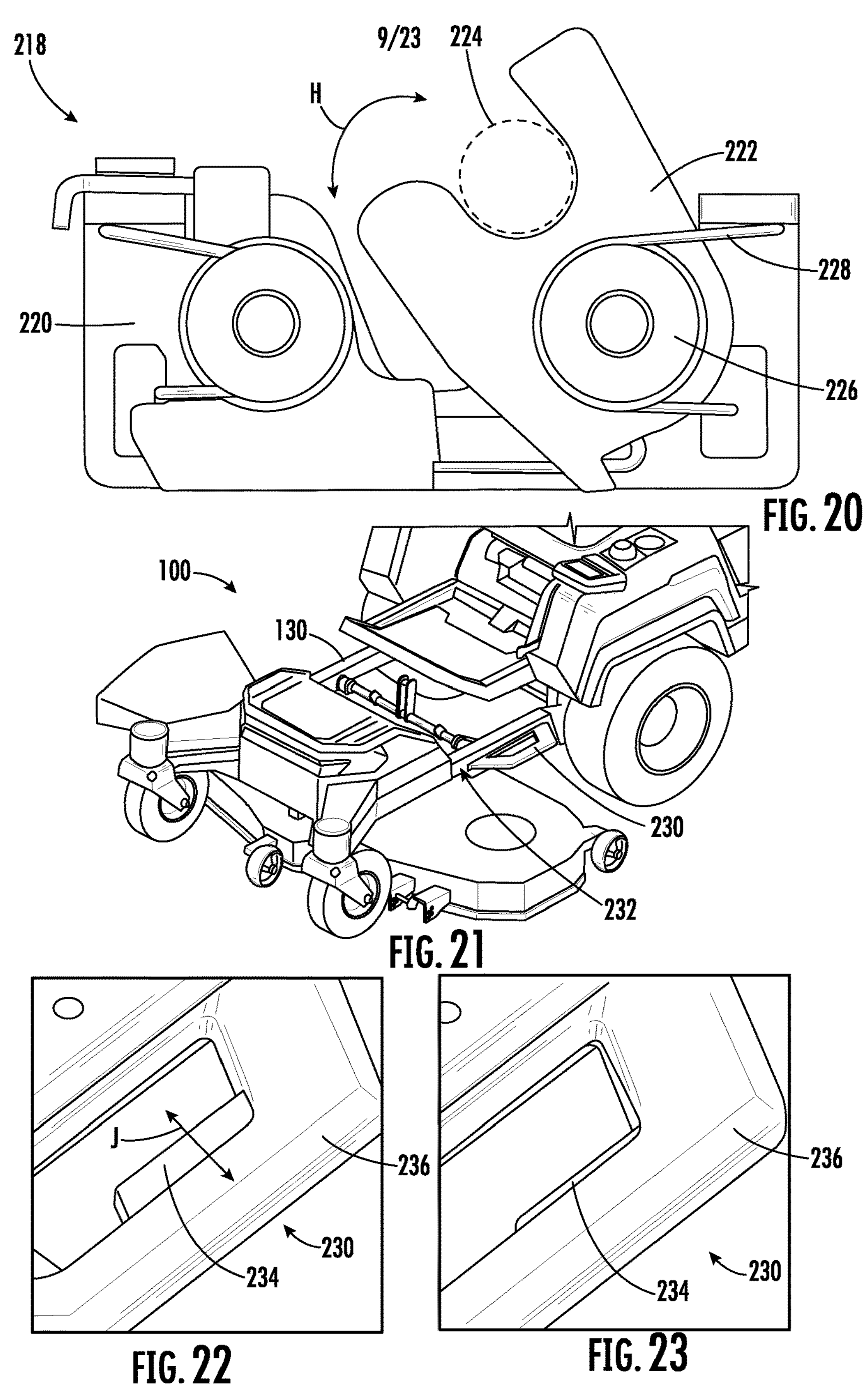
FIG. 20 is a side view of a latch for selectively securing the mower deck frame to the frame of the lawn mower in accordance with embodiments of the present disclosure.
FIG. 21 is a front perspective view of a portion of the lawn mower in accordance with embodiments of the present disclosure.
FIG. 22 is a front perspective view of a deck release latch of the lawn mower in accordance with embodiments of the present disclosure as seen with a release mechanism of the deck release latch in a locked configuration.
FIG. 23 is a front perspective view of the deck release latch of the lawn mower in accordance with embodiments of the present disclosure as seen with the release mechanism of the deck release latch in an unlocked configuration.

FIG. 20 illustrates an enlarged side view of the latch 218 in accordance with an embodiment. The latch 218 can include a body 220 coupled with the mower deck frame 130 and a gate 222 which rotates in directions H relative to the body 220. When in the locked position, the gate 222 can form a closed receiving area 224 which receives and retains a complementary member (not illustrated) of the frame 102 to restrict relative movement between the frame 102 and the mower deck frame 130. When in the unlocked position (as depicted in FIG. 20), the receiving area 224 can be open to allow the complementary member of the frame 102 to translate from the receiving area 224. In an embodiment, the gate 222 can rotate on a bushing 226 about a rotational axis. In certain instances, a spring 228 or other biasing element can bias the gate 222 to the closed position.

FIG. 21 illustrates a front perspective view of the lawn mower 100. In an embodiment, the lawn mower 100 can include a deck release latch 230. In an embodiment, the deck release latch 230 can be coupled to the mower deck frame 130 at a location readily accessible by an operator. For instance, the deck release latch 230 can be coupled to a side surface 232 of the mower deck frame 130. In certain instances, the deck release latch 230 can form a step to assist the operator in mounting and dismounting the lawn mower 100.

FIGS. 22 and 23 illustrate enlarged views of a portion of the deck release latch 230 in accordance with an exemplary embodiment as seen in Circle I in FIG. 21. As depicted, the deck release latch 230 can include a release mechanism 234 disposed in a handle 236. The release mechanism 234 can be actuatable between a locked configuration as illustrated in FIG. 22 and an unlocked configuration as illustrated in FIG.

23. In the illustrated embodiment, actuation of the release mechanism 234 is performed by translating the release mechanism 234 in the direction shown by line J. However, in other embodiments, the release mechanism 234 can be actuated through rotation, a combination of rotation and translation, or through another movement pattern.

Actuation of the release mechanism 234 can move the latch 218 between the locked and unlocked states. In the state depicted in FIG. 22, the latch 218 may be locked. In the state depicted in FIG. 23, the latch 218 may be unlocked. A biasing element, such as a spring (not illustrated) can bias the release mechanism 234, e.g., to the locked state. Thus, the release mechanism 234 can automatically move to the locked state when not engaged.

Figures 24, 25, 26:
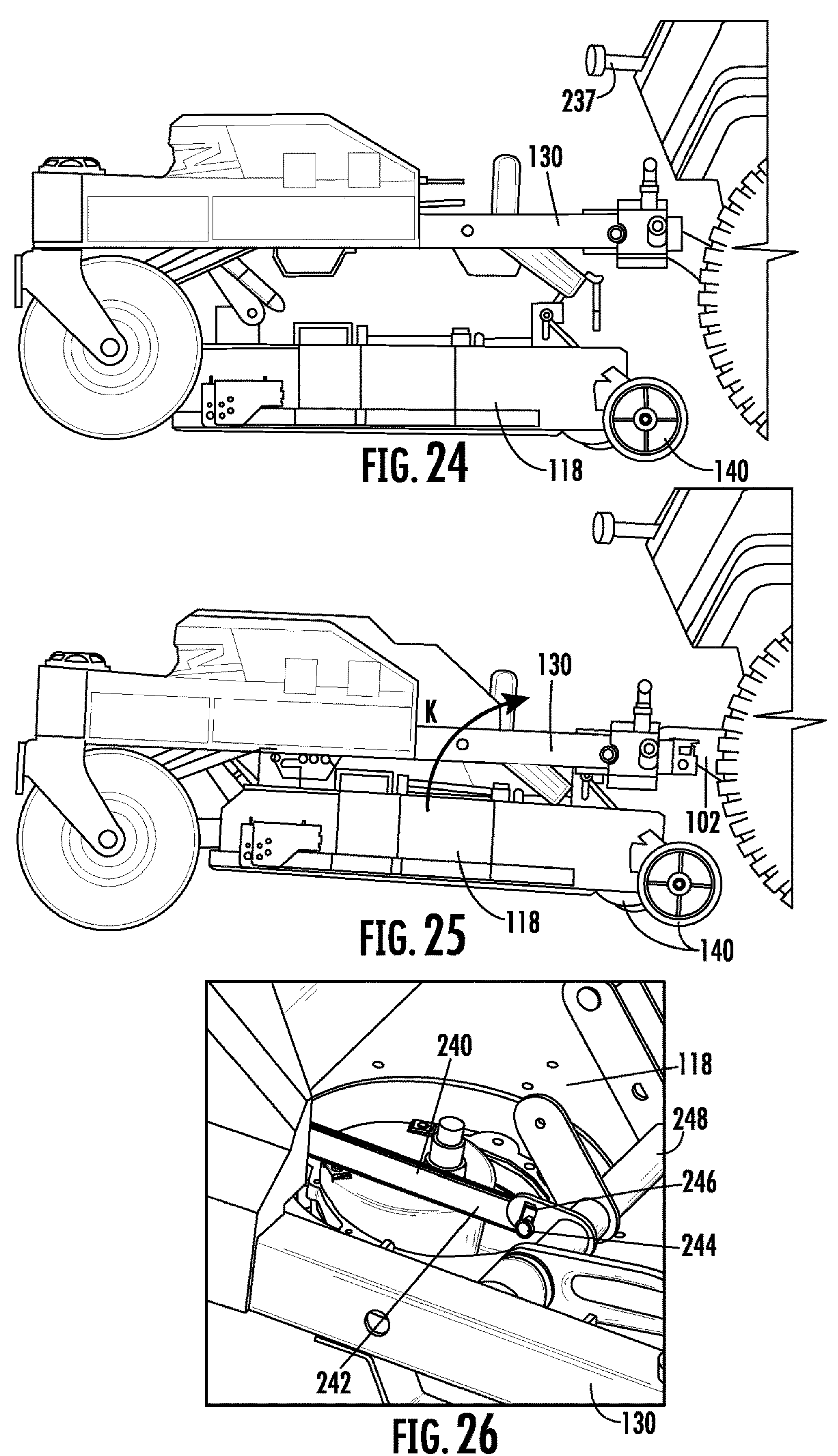
FIG. 24 is a side view of the mower deck coupled to the mower deck frame in accordance with embodiments of the present disclosure as seen with the mower deck frame lowered to a maintenance position.
FIG. 25 is a side view of the mower deck coupled to the mower deck frame in accordance with embodiments of the present disclosure as seen with the mower deck pivoted to allow for actuation of the deck release latch.
FIG. 26 is a rear perspective view of a portion of the lawn mower in accordance with embodiments of the present disclosure.

FIG. 24 illustrates a side view of the mower deck 118 and mower deck frame 130 in accordance with an embodiment as seen with the mower deck 118 in a lowered position and the release mechanism 234 in the locked state (FIG. 22). Lowering the mower deck 118 to the lowered position can be performed until the gauge wheels 140 contact the underlying ground surface. In certain instances, lowering the mower deck 118 can be performed by moving the mower deck 118 to a lowest setting or a maintenance setting, e.g., using a height adjustment implement 237. With the mower deck 118 resting at least partially on the gauge wheels 140, weight of the mower deck 118 on the mower deck frame 130 is reduced, making it easier to adjust the position of the mower deck frame 130.

FIG. 25 illustrates a side view of the mower deck 118 and mower deck frame 130 with the mower deck frame 130 unlocked from the frame 102. That is, the aforementioned latch 218 is unlocked. As described above, the mower deck frame 130 can move to the unlocked state by actuating the release mechanism 234 to the unlocked state. In the unlocked state, the mower deck frame 130 can be moveable relative to the frame 102 to allow for relative movement between the mower deck 118 and the frame 102. In an embodiment, movement between the mower deck 118 and the frame 102 can be pivotal movement, e.g., about an axis located adjacent to the latch 218. In certain instances, the gauge wheels 140, and more particularly the rear gauge wheels 140 of the mower deck 118, can maintain contact with the underlying ground surface as the mower deck 118 and mower deck frame 130 are articulated relative to the frame 102 to the stored/service position. Initial articulation from the in-use position to the stored/service position can occur by rotating the mower deck 118 and mower deck frame 130 as illustrated by Line K in FIG. 25. It should be noted that a relative distance between the mower deck 118 and the mower deck frame 130 can change as the mower deck 118 and mower deck frame 130 are articulated in the direction of Line K.

In an embodiment, it may be desirable to lock the mower deck 118 to the mower deck frame 130. This may be performed before, during, or after moving the mower deck 118 and mower deck frame 130 to the storage/maintenance position. The lawn mower 100 can include a mower deck lock 240 as illustrated in FIG. 26. The mower deck lock 240 can extend between and lock together the mower deck 118 and the mower deck frame 130 such that movement of one of the mower deck 118 and the mower deck frame 130 results in movement of both the mower deck 118 and the mower deck frame 130. In an embodiment, the mower deck lock 240 can include an elongated member 242 coupling the mower deck 118 and the mower deck frame 130 together. The elongated member 242 can include a first engagement member, such as a projection 244 extending from the elongated member 242, which can engage with a second engagement member, such as a slot 246, of the mower deck frame 130. When the projection 244 is captured by the slot 246, movement of the mower deck 118 and mower deck frame 130 is pinned together. When the projection 244 is free of the slot 246, i.e., not disposed within the slot 246, relative movement is possible between the mower deck 118 and the mower deck frame 130.

In certain instances, the operator can manually engage and disengage the mower deck lock 240. In other instances, the lawn mower 100 can include a powered mower deck lock 240 which moves between the engaged and disengaged positions with assistance from an input member (not illustrated) such as a motor, a hydraulic actuator, a linear actuator or the like. In yet other instances, the lawn mower 100 can be biased to one of the engaged or disengaged states, e.g., by a spring (not illustrated) or other type of biasing element. In certain instances, the mower deck lock 240 may only be actuatable to the locked state after a prescribed operation is completed. For example, the mower deck lock 240 may only be actuatable to the locked state after the mower deck 118 and mower deck frame 130 are pivoted to the position as shown in FIG. 25. Alternatively, the mower deck lock 240 may only be actuatable to the locked state after the latch 218 is unlocked.

Referring again to FIG. 1, the winch 206 and winch cable 208 can be coupled to the mower deck 118 through a cam 248. The cam 248 can include an attachment point 250 configured to engage the winch cable 208. A linkage 252 can couple the mower deck 118 to the cam 248. As the winch cable 208 is taken up by the winch 206, the cam 248 is rotated to cause the linkage 252 to raise the mower deck 118. Conversely, as the winch cable 208 is let off by the winch, the cam 248 can rotate in the opposite direction to cause the linkage 252 to lower the mower deck 118. The winch 206 can be powered by the onboard batteries 170 or 171 and controlled by the operator, e.g., in response to adjusting the switch 214 or the height adjustment implement 237.

Figure 27:
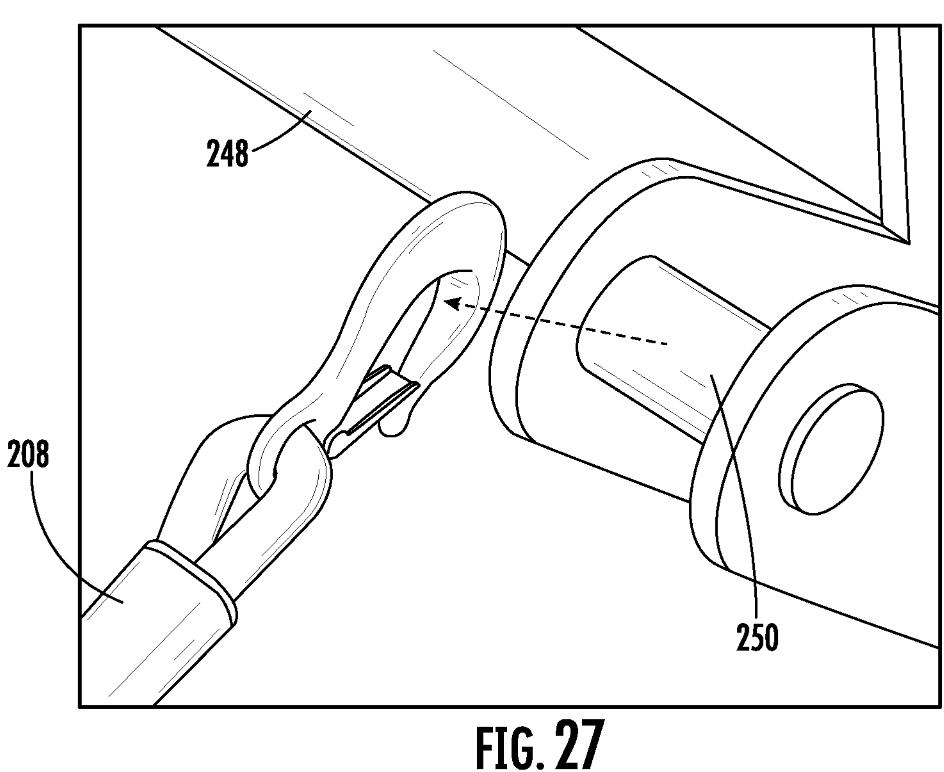
FIG. 27 is a front perspective view of an interface between a winch cable and a cam associated with the mower deck in accordance with embodiments of the present disclosure.

As illustrated in FIG. 27, when the operator wants to articulate the mower deck 118 to the stored/service position, the winch cable 208 is detached from the attachment point 250 of the cam 248. As depicted, the winch cable 208 can include an attachment interface, e.g., a J-hook, which engages with a complementary attachment interface, e.g., a bar, of the attachment point 250.

Figure 28:
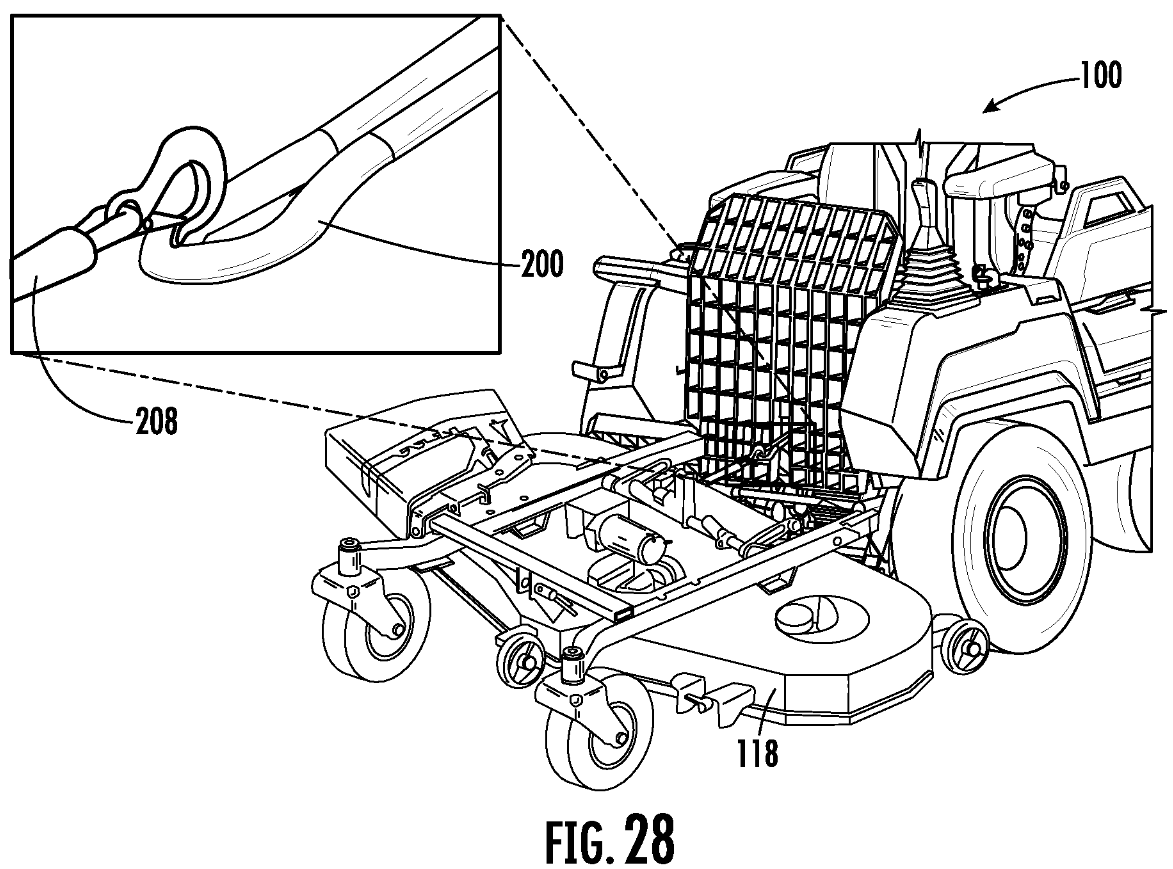
FIG. 28 is a front perspective view of an interface between the winch cable and a tether associated with the frame of the lawn mower in accordance with embodiments of the present disclosure.

In certain instances, slack may be introduced into the winch cable 208 prior to detaching the winch cable 208 from the attachment point 250. In an embodiment, slack can be introduced into the winch cable 208 at the user interface 210 (FIG. 17). For example, the operator can move the switch 214 to a position corresponding with the mower deck 118 being lowered. With the winch cable 208 detached from the cam 248, the operator can couple the winch cable 208 to the tether 200 as depicted in FIG. 28 and engage the winch 206 to take up the winch cable 208, resulting in articulation of the mower deck 118 and mower deck frame 130 as shown in FIG. 29 where the mower deck 118 in the in-use position is illustrated by dashed lines and the mower deck 118 in the stored/service position is illustrated by solid lines. One or more cutting implements 260 can be accessible with the mower deck 118 in the stored/service position.

In an embodiment, the lawn mower 100 can detect a relative position of the mower deck 118, e.g., when the mower deck 118 reaches the stored/service position. Once the mower deck 118 reaches the stored/service position, the winch 206 can automatically stop taking up the winch cable 208. The winch cable 208 can then remain attached to the tether 200 to maintain the mower deck 118 in the stored/service position. In some embodiments, the lawn mower 100 can further include a locking feature (not illustrated) to maintain the mower deck 118 in the stored/service position. In an embodiment, the one or more cutting implements 260 can be disabled when the mower deck 118 is articulated, e.g., to a predetermined angular orientation different from an in-use orientation. In certain instances, the predetermined angular orientation can correspond with any articulation of the mower deck 118. That is, the one or more cutting implements 260 can be disabled when the mower deck 118 articulates from the in-use position. In other instances, the predetermined angular orientation can correspond with the stored/service position. In this regard, the one or more cutting implements 260 are disabled when the mower deck 118 reaches the stored/service position. In yet other instances, the predetermined angular orientation can correspond with an angular position between the in-use position and the stored/service position. For example, the one or more cutting implements 260 may be disabled after articulation of the mower deck 118 by at least 5°, such as articulation of at least 10°, such as articulation of at least 25°. In this regard, normal movement of the mower deck 118 which might occur, e.g., when the lawn mower 100 traverses rugged ground, does not disable the one or more cutting implements 260. It should be understood that other functionality or controls may inhibit disablement of the one or more cutting implements 260 in situations where the lawn mower 100 moves during mowing operations, e.g., when traversing rugged ground.

Referring again to FIG. 2, in an embodiment the lawn mower 100 can include an interactive display 254 including a display 256 and one or more user inputs 258. By way of example, the display 256 can include a touch screen, an LCD screen, an LED screen, an OLED screen, or the like. In the exemplary embodiment illustrated in FIG. 2, the interactive display 254 is disposed on a first side of the seat 106 while the joystick 116 and user interface 210 are disposed on a second side of the seat 106 opposite the first side. In this regard, the operator can simultaneously maneuver the lawn mower 100 using the joystick 116 while controlling one or more aspects of the lawn mower 100 through the interactive display 254. It should be understood that other layouts and configurations are possible without deviating from the scope of the disclosure.

In certain instances, the display 256 can provide instructions to the operator to assist in use of the lawn mower 100. For instance, the display 256 can present information to assist the operator in the steps of articulating the mower deck 118, e.g., in a manner as described above. By way of non-limiting example, the display 256 can present graphics or text which provide step-by-step instructions for mower deck articulation. The instructions can be presented serially, e.g., with each step presented as a separate instruction. In some embodiments, the operator can manually scroll through instructions on the display 256, for example, using the one or more user inputs 258. In other embodiments, the lawn mower 100 can sense the completion of one or more steps, such as all steps, in the mower articulation process described above with respect to FIGS. 14 to 29. Sensing can be performed by one or more sensors associated with the lawn mower 100. For example, sensors may detect when the foot platform 148 is in the stored/service position or the in-use position, when the latch(es) 218 is unlocked or locked, when the winch 206 lets out or takes in the winch cable 208, when the mower deck 118 reaches a desired articulation point, any combination thereof, or the like. In certain embodiments, the lawn mower 100 can automatically advance through the steps of the instructions based on detected completion of the previous step.

FIG. 30 illustrates a rear perspective view of the display 256 in accordance with another embodiment. As depicted, the display 256 excludes the one or more user inputs 258 depicted in FIG. 2.

During mowing, the operator may desire to adjust a cutting height of the one or more cutting implements 260. In an embodiment, the lawn mower 100 includes a height adjustment implement 262 moveable between two or more positions each associated with a different height of the one or more cutting implements 260 relative to the underlying ground surface. In the exemplary depicted embodiment, the height adjustment implement 262 includes a rotatable dial 264. The rotatable dial 264 can rotate about an axis 266. In certain instances, the axis 266 can be vertically oriented. In other embodiments, the axis 266 can be angularly offset from a vertical orientation by less than 45°, such as less than 30°, such as less than 15°. In an embodiment, the rotatable dial 264 can rotate 360° about the axis 266.

The rotatable dial 264 can include one or more indicia 268. Each indicia 268 can correspond to different relative heights of the mower deck 118, i.e., different relative heights of the one or more cutting implements 260. The indicia 268 may provide relative demarcation between different heights of the mower deck 118 (e.g., 1, 2, 3, 4, etc.) or provide a value associated with the actual height of the mower deck 118 (e.g., 1", 2", 3", 4", etc.) with each value representing an estimated distance between the one or more cutting implements 260 and the underlying ground surface. As the rotatable dial 264 moves, the height of the mower deck 118 changes. A set mark 270 can show the operator which indicia 268 is associated with the current height of the mower deck 118. More specifically, the indicia 268 disposed adjacent to the set mark 270 can correspond with the current height of the mower deck 118.

In certain instances, the rotatable dial 264 can be infinitely adjustable. That is, the rotatable dial 264 can be stopped at any rotational position within a rotational range of the rotatable dial 264. The height of the mower deck 118 can correspondingly be set to any height between a minimum height and a maximum height, as measured relative to the underlying ground surface, as set by the rotatable dial 264. In other instances, the rotatable dial 264 can be adjustable between a fixed number of preset rotational positions, e.g., 6 positions, 8 positions, 10 positions, etc. In an embodiment, the rotatable dial 264 can provide feedback to the operator to confirm proper alignment at one or more of the fixed number of rotational positions. For example, the rotatable dial 264 can provide tactile, audible, or other discernable feedback to the operator when the rotatable dial 264 is at each of the rotational positions. In some instances, the rotatable dial 264 can snap to the rotational positions. That is, the rotatable dial 264 can exhibit reduced rotational resistance into the preset rotational positions and increased rotational resistance when moving out of the preset rotational positions. Grip enhancing features 272 such as knurling, notches, ribbing, or the like can be disposed on the rotatable dial 264 to assist the operator in gripping the rotatable dial 264 during rotational movements.

In an embodiment, the lawn mower 100 can further include a quick deck lift user interface 274 moveable between a mowing position and a deck lift position. The quick deck lift user interface 274 can include, for example, a depressible button 276. The depressible button 276 can be disposed within a void 278 of the rotatable dial 264, such as a centrally located void. The depressible button 276 can be biased to the mowing position, e.g., by a spring or other biasing element. The operator can selectively depress the depressible button 276 to quickly move the mower deck 118 from a current height to a maximum height. The mower deck 118 can remain at the maximum height until the operator releases the depressible button 276, after which point the mower deck 118 can return to the previous cut height. The previous cut height can be stored by the lawn mower 100 to allow the mower deck 118 to return to the previous cut height. In an embodiment, the previous cut height can be stored mechanically at the height adjustment implement 262, e.g., by a potentiometer (not illustrated) which detects movement of the rotatable dial 264.

Use of the quick deck lift interface 274 can allow the operator to quickly raise the mower deck 118 upon encountering obstacles such as rocks, roots, branches, ruts, ridges, large or sharp surface undulation, or the like. For example, when steering the lawn mower 100 towards such obstacles, the operator can depress the depressible button 276. The time required to raise the mower deck to the maximum height associated with use of the depressible button 276 can be less than 5 seconds, such as less than 4 seconds, such as less than 3 seconds, such as less than 2 seconds, such as less than 1 second. Thus, the operator, when looking ahead at a desired path, can plan and adjust the mower deck 118 accordingly to mitigate damage to the lawn mower 100 itself and the underlying ground surface. By holding the depressible button 276 in the depressed state, the mower deck 118 can remain at the maximum height until the obstacle is cleared. Once the obstacle is cleared, the operator can release the depressible button 276, causing the mower deck 118 to return to the previous operating height for mowing resumption. In an embodiment, the lawn mower 100 can include a lock (not illustrated) which retains the depressible button 276 in the depressed position. The lock may be user controlled or automatic (e.g., a timer which retains the depressible button 276 in the depressed state for a period of time such as 2 seconds, 5 seconds, 10 seconds, or the like).

In certain instances, the one or more cutting implements 260 can remain on during actuation of the quick deck lift interface 274. For example, the one or more cutting implements 260 can continue to rotate at normal speeds with the mower deck 118 in the raised position. Alternatively, the one or more cutting implements 260 can rotate at reduced speeds when the mower deck 118 is in the raised position. Upon lowering the mower deck 118, the previous operating speed of the one or more cutting implements 260 can resume. In yet other embodiments, the one or more cutting implements 260 can cease rotation when the mower deck 118 is raised to the maximum height. In an embodiment, the operator can select between a plurality of options relating to the speed of the one or more cutting implements 260 when the mower deck 118 is raised. This selection may be performed, e.g., at the interactive display 254, the user interface 210, or at another user engageable area of the lawn mower 100.

In an embodiment, the maximum height of the mower deck 118 as seen with the quick deck lift user interface 274 engaged can be different than the maximum height of the mower deck 118 as seen with the rotatable dial 264 at a maximum operating height. That is, actuation of the quick deck lift user interface 274 can raise the mower deck 118 to a height, as measured from the underlying ground surface, greater than a maximum height achievable using only the rotatable dial 264. In another embodiment, the maximum height of the mower deck 118 as seen with the quick deck lift user interface 274 engaged can be the same as the maximum height of the mower deck 118 as seen with the rotatable dial 264 at a maximum operating height. That is, the mower deck 118 can be moved to the maximum height by use of either the rotatable dial 264 or the quick deck lift user interface 274. However, only use of the quick deck lift user interface 274 allows for automatic return of the mower deck 118 to the previous cutting height when released. Use of the rotatable dial 264 to raise the mower deck 118 can subsequently require further use of the rotatable dial 264 to lower the mower deck 118 to the previous cutting height.

In an embodiment, movement of the mower deck 118 between any two or more locations between and including the minimum and maximum heights of the mower deck 118 can be performed in a same manner, e.g., performed by a common hardware. That is, both the height adjustment implement 262 and quick deck lift user interface 274 can raise and lower the mower deck 118 using the same equipment and features of the lawn mower 100. The logic used by the equipment to raise and lower the mower deck 118, e.g., height change speed and height change position, can be different.

FIG. 31 illustrates an alternate embodiment of the height adjustment implement 262 where the quick deck lift user interface 274 is integrated into the rotatable dial 264. In the depicted embodiment, the height adjustment implement 262 and quick deck lift user interface 274 are formed from a single piece construction which allows for relative height adjustment of the mower deck 118 through rotation of the single piece and quick deck lifting through depression of the single piece. The height adjustment implement 262 depicted in FIG. 31 may otherwise act similarly to the embodiment depicted in FIG. 30.

FIG. 32 illustrates a front perspective view of the faring 104 of the lawn mower 100 as seen with one or more components removed from the faring 104 in accordance with an exemplary embodiment. In the depicted embodiment, the faring 104 is formed from a single, monolithic component. The faring 104 can be formed using a molding technique such as injection molding, rotomolding, pressing, stamping, or the like. The faring 104 can be coupled with the frame 102 at one or more locations. Once attached to the frame 102, the faring 104 can act as a structural component of the lawn mower 100, forming part of a chassis for the lawn mower 100. The faring 104 can define functional aspects of the lawn mower 100, such as cupholders, a storage bed, an attachment point for other components of the lawn mower 100 such as the steering assembly (e.g., joystick 116), the battery receiving area 172, and the like while also serving as a cosmetic outer structure which is visually desirable. Components of the lawn mower 100 can be anchored to the faring 104, extend through the faring 104, or be covered by the faring 104. Use of a single, monolithically constructed faring 104 can reduce the number of parts required to assemble the lawn mower 100 which in turn can reduce assembly costs. Additionally, the single, monolithic construction can allow for easier removal of the faring 104 to access underlying components such as electronic controllers, electric motors, wiring, cables, and the like.

In an embodiment, the faring 104 can be formed from a first material different from a second material of the frame 102. By way of example, the faring 104 can be formed from a polymer, such as a reinforced polymer. Exemplary polymers include low-density polyethylene, high-density polyethylene, polypropylene, polystyrene, polytetrafluoroethylene, polyvinyl chloride, polychlorotrifluoroethylene, phenol-formaldehyde resin, para-aramid fiber, para-aramid, polyethylene terephthalate, polychloroprene, polyamide, meta-aramid polymer, polyacrylonitrile, copolyamid, polytetrafluoroethylene, polyimide, aromatic polyester, nylon, acrylonitrile butadiene styrene, polyaryletherketone, polyacrylate, polyarylate, polybutene, polyetheretherketone, poly(ether imide), poly(ethylene terephthalate), perfluoro alkoxyl alkane, polypropylene, and poly(phenylene ether), poly(phenylene sulfide). In some embodiments, the faring 104 can include a homogenous composition. For example, the faring 104 can include a single material, or a mixture of materials, which is homogeneously distributed around the faring 104. In other embodiments, the faring 104 can include a heterogenous composition with certain two or more areal locations of the faring 104 having different compositions as compared to one another. For instance, by way of non-limiting example, the faring 104 can have a reinforced construction at locations where the faring 104 interfaces with the frame 102. Exemplary reinforcing materials can include graphite, boron nitride, molybdenum disulfide, tungsten disulfide, polytetrafluoroethylene, carbon nitride, tungsten carbide, or diamond-like carbon, a metal (such as aluminum, zinc, copper, magnesium, tin, platinum, titanium, tungsten, iron, bronze, steel, spring steel, stainless steel), a metal alloy (including the listed metals), an anodized metal (including the listed metals), a fiber (such as carbon fiber, a glass fiber), or any combination thereof.

FIG. 33 is a schematic view of an exemplary control system 280 of the lawn mower 100. The control system 280 can control operational aspects of the lawn mower 100, e.g., in response to user inputs. The control system 280 can generally include the joystick 116, the one or more batteries 170, a first drive controller 282 in communication with a first drive motor 284 (the first drive motor 284 can drive the left drive wheel 124 (FIG. 1)), a second drive controller 286 in communication with a second drive motor 288 (the second drive motor 288 can drive the right drive wheel 126 (FIG. 1)), a main controller 290 (sometimes referred to as a TIC), a first deck controller 292 in communication with a first deck motor 294, a second deck controller 296 in communication with a second deck motor 298, and a third deck controller 300 in communication with a third deck motor 302. It should be understood that in some instances, the control system 280 may not include all of the elements described above. For instance, by way of non-limiting example, in some embodiments the lawn mower 100 may only include one or two deck motor controllers in communication with one or two deck motors, respectively.

In certain instances, the control system 280 can operate in response to user inputs, e.g., at the joystick 116. For example, the control system 280 can detect movement of the joystick 116 indicative of user input and adjust a current heading or speed of the lawn mower 100 in response thereto. In other instances, the control system 280 can further operate in response to detected inputs, e.g., at one or more sensors, from feedback from one of the motors or controllers, or the like. Operational aspects of the control system 280 in response to detected inputs from automated sources like sensors and motor controllers may be referred to as closed-loop control.

Operating with closed-looped control may be referred to as (at least partial) autonomous control, whereby the control system 280 determines aspects of controlling the lawn mower 100 without user input. As described below, the lawn mower 100 can include one or more logic devices which can perform these autonomous control aspects. By way of example, the control system 280 may be coupled with a tilt sensor, such as a gyroscope 303. In the depicted embodiment, the gyroscope 303 is in communication with the main controller 290, however in other embodiments the gyroscope 303 may be in communication with a different element of the control system 280, such as the first drive controller 282. The gyroscope 303 may detect a relative angle formed between the lawn mower 100 and a gravitational direction (e.g., a vertical axis). Determination of the relative angular offset from the vertical axis may be detected, e.g., using single axis analysis where angular offset is determined using a single angular displacement between a detected angular position and the vertical axis. The control system 280 may receive signals from the gyroscope 303, including the detected angular offset, and adjust one or more aspects of operation in response thereto. For example, when traversing inclined slopes the lawn mower 100 may have a natural tendency to drift down the inclined slope. That is, the lawn mower 100 may naturally steer itself in a direction down the inclined slope. Under normal operating conditions, the operator can manually adjust the direction at the joystick 116. However, using data from the gyroscope 303, the control system 280 can autonomously (or at least partially autonomously) control the lawn mower 100 so as to maintain the lawn mower 100 in a desired heading without requiring manual operator course-corrective efforts, e.g., at the joystick 116. By way of non-limiting example, autonomous course correction can include increasing power provided to a downhill one of the first or second drive motors 284 or 286 or decreasing power provided to an uphill one of the first or second drive motors 284 or 286 to bias the lawn mower 100 in the uphill direction to counter natural gravitational force on the lawn mower 100.

By way of another example, closed-loop controls may include adjustment of power provided to one or both of the first or second drive motors 284 or 286 in response to a mowing condition by detecting load at the first, second or third deck motor 294, 298 or 302. When load increases, e.g., past a threshold value, the first and second drive motors 284 and 286 can be slowed down to reduce travel speed. Conversely, when load decreases, e.g., below a threshold value, the first and second drive motors 284 and 286 can be sped up to increase travel speed. Likewise, when the one or more batteries 170 are operating below a prescribed charge level, the control system 280 may reduce speed of the drive motors 284 and 286 or the deck motors 294, 298 or 302.

The joystick 116 can be coupled to the first controller 282 through a drive system communication protocol 304. The drive system communication protocol 304 can form an internal communication system between different elements of the control system 280. For instance, the first and second drive controllers 282 and 286 can be coupled together through the drive system communication protocol 304. Similarly, the first drive controller 282 can communicate with the first drive motor 284 through the drive system communication protocol 304 and the second drive controller 286 can communicate with the second drive motor 288 through the drive system communication protocol 304. Moreover, the first and second drive controllers 282 and 286 can communicate with one another through the drive system communication protocol 304. Similarly, the first deck controller 292, the second deck controller 296 and the third deck controller 300 can communicate with each other through the drive system communication protocol 304. Moreover, each of the first deck controller 292 and first deck motor 294, the second deck controller 296 and the second deck motor 298, and the third deck controller 300 and third deck motor 302 can communicate through the drive system communication protocol 304. In certain instances, the drive system communication protocol 304 can be an open bus system whereby each of the elements of the control system 280 communicating on the drive communication protocol 304 interact with each other over a common communication system, e.g., a local network or a busbar. In other instances, each element of the control system 280 can communicate only with immediately connected elements. For instance, the first deck controller 292 can only communicate directly with the first deck motor 294 and the second deck controller 296 as depicted in FIG. 33.

In an embodiment, the main controller 290 can communicate over a separate bus 306, e.g., an RS485 bus, with one or more of the first drive controller 282, the second drive controller 286, the first deck controller 292, the second deck controller 296, and the third deck controller 300. In the depicted embodiment, the main controller 290 communicates with all of the first drive controller 282, the second drive controller 286, the first deck controller 292, the second deck controller 296, and the third deck controller 300 over the bus 306.

In an embodiment, the one or more batteries 170 can communicate with the main controller 290 over yet another separate bus 308, e.g., a Can bus. The one or more batteries 170 can further provide power to each of the first drive controller 282, the second drive controller 286, the first deck controller 292, the second deck controller 296, and the third deck controller 300 over one or more power wires 310. Power from the power wires 310 may be provided to the first, second and third deck motors 294, 298 and 302 through the first, second, and third deck controllers 292, 296 and 300. Similarly, power from the power wires 310 may be provided to the first and second drive motors 284 and 288 through the first and second drive controllers 282 and 286.

In an embodiment, two or more elements of the control system 280 can form a hierarchical arrangement relative to one another. Hierarchical arrangements define control protocol between the two or more elements of the control system 280. For example, the first drive controller 282 can receive operator inputs from the joystick 116 and generate control signals in view thereof. The first drive controller 282 can communicate instructions to the second drive controller 286, e.g., in view of the operator inputs received at the joystick 116. The instructions communicated from the first drive controller 282 to the second drive controller 286 can be at least partially generated by the first drive controller 282. In this regard, the first drive controller 282 can assume at least partial control of the second drive controller 286 to form a hierarchical arrangement therebetween.

Hierarchical arrangement between the first and second drive controllers 282 and 286 can reduce the need for external control (mixing) boards on the lawn mower 100. Use of a primary controller, e.g., the first drive controller 282, to generate control instructions for one or more secondary controllers, e.g., the second drive controller 286, reduces the number of components required in the control system 280 by eliminating external control (mixing) boards. Traditional lawn mowers utilize external control (mixing) boards which are separate from, i.e., not directly part of, a drive controller associated with a drive wheel. The separate control (mixing) board receives operator inputs and mixes (forms) steering controls in response thereto. The external control (mixing) board of traditional lawn mowers then communicates the mixed (formed) steering controls to the separate motor controllers which then control operational aspects of the motors in response thereto. Instead, using hierarchical arrangements as described in one or more embodiments herein, hierarchical arrangement of the control system 280 can reduce part count, decrease lag time associated with communication latency, and the like.

In certain instances, the first drive controller 282 can communicate with the second drive controller 286, e.g., to send control instructions associated with an updated operating parameter to the second drive motor 288. The updated operating parameter may be informed, e.g., by an operator-initiated action at the joystick 116. In an embodiment, the second drive controller 286 can use this information to update one or more operating parameters or statuses of the second drive motor 288. The updated parameter(s) may be associated with, e.g., an updated operating speed of the second drive motor 288, an updated acceleration (or deceleration) profile or speed profile of the second drive motor 288, an updated operating threshold of the second drive motor 288 (e.g., a current threshold limit or a temperature threshold), an updated auxiliary condition of the second drive motor 288 (e.g., initiate use of a cooling fan or detritus remover), another updated condition or status of the second drive motor 288, or any combination thereof.

In certain instances, the first drive controller 282 can communicate the updated status not only to the second drive controller 286, but also to one or more of the main controller 290, the first deck controller 292, the second deck controller 296, or the third deck controller 300. In an embodiment, communication between the first drive controller 282 and any one or more of the first deck controller 292, the second deck controller 296, or the third deck controller 300 can be performed through the main controller 290. Communication between the first drive controller 282 and the second drive controller 286 can also be performed through the main controller 290.

In addition to informing control aspects of the second drive motor 288, the first drive controller 282 can also generate motor control signals and communicate the signals to the first drive motor 284. In an embodiment, control of the first drive motor 284 can be similar to control of the second drive motor 288. For example, instructions communicated to the first drive motor 284 from the first drive controller 282 may inform an updated parameter of the first drive motor 284. The updated parameter may be associated, e.g., with an updated operating speed of the first drive motor 284, an updated acceleration (or deceleration) profile or speed profile of the first drive motor 284, an updated operating threshold of the first drive motor 284 (e.g., a current threshold limit or a temperature threshold), an updated auxiliary condition of the first drive motor 284 (e.g., initiate use of a cooling fan, activate a detritus remover, etc.), another updated condition or status of the first drive motor 284, or any combination thereof.

In an embodiment, the first drive motor 284 can communicate with the first drive controller 282. Communication from the first drive motor 284 to the first drive controller 282 can include information associated with, e.g., operating current of the first drive motor 284, operating voltage of the first drive motor 284, operating temperature of the first drive motor 284, operational status updates (e.g., normal operating condition, default conditions, etc.), or the like. These communications can be used by the first drive controller 282 to inform yet further operational aspects of control. For instance, by way of non-limiting example, the first drive controller 282 can reduce a current threshold limit of the first drive motor 284 to ensure operational safety in response to a detected default condition of the first drive motor 284. By way of another example, the first drive controller 282 can raise or lower the operating current threshold in view of the load detected at the first drive motor 284. By way of yet another example, the first drive controller 282 can lower a power threshold of the first drive motor 284 in response to an overheated condition.

In an embodiment, the second drive motor 288 can communicate with the second drive controller 286. The second drive controller 286 can then communicate the information from the second drive motor 288 to the first drive controller 282. In certain instances, the first drive controller 282 can then control the second drive controller 286 (and thus the second drive motor 288) in view of the communication information. For example, the second drive motor 288 can communicate an operational status, e.g., operating temperature, to the second drive controller 286. The second drive controller 286 can communicate the operational status of the second drive motor 288 to the first drive controller 282. The first drive controller 282 can then lower the power threshold of the second drive motor 288, e.g., to prevent damage to the second drive motor 288, by communicating the lower power threshold to the second drive controller 286.

The mower deck 118 is depicted in FIG. 33 by a dashed box. The first, second, and third deck controllers and motors 292, 294, 296, 298, 300 and 302 are all depicted in the mower deck 118, however, in accordance with some embodiments, one or more of the controllers or motors may be disposed outside of the mower deck 118. For example, one or more of the first, second and third deck controllers 294, 298 or 302 can be disposed external to the mower deck 118 and part of another portion of the lawn mower 100. The following description should not be construed as limiting the mower deck 118 to the described arrangement. For example, certain aspects of the mower deck 118 described below may relate to individual elements of the mower deck 118 and not necessarily to the entire mower deck 118. Similarly, description of control between elements of the mower deck 118 is not intended to be limiting.

In an embodiment, elements of the control system 280 relating to the mower deck 118 can have a hierarchical arrangement. For example, one or more of the first, second or third deck controllers 292, 296 or 300 can inform control aspects of other one(s) of the first, second or third deck controllers 292, 296 or 300. Each one of the first, second, and third deck controllers 292, 296 and 300 can communicate with each of the first, second and third deck motors 294, 298 and 302, respectively.

By way of non-limiting example, the first deck controller 292 can at least partially control operational aspects of the second and third deck controllers 296 and 300. In this regard, the first deck controller 292 can form a primary controller for the mower deck 118. The first deck controller 292 may receive instructions to initiate mowing. In response to receiving mowing instructions, the first deck controller 292 can formulate control instructions for each of the first, second and third deck motors 294, 298 and 302. The first deck controller 292 can communicate instructions for the second deck motor 298 to the second deck controller 296 and instructions for the third deck motor 302 to the third deck controller 300. The second and third deck controllers 296 and 300 can then control the second and third deck motors 298 and 302, respectively, in view of the received instructions.

In an embodiment, the first deck motor 294 can communicate with the first deck controller 292. Communication from the first deck motor 294 to the first deck controller 292 can include, e.g., operating current draw of the first deck motor 294, operating voltage of the first deck motor 294, operating temperature of the first deck motor 294, operational status updates (e.g., normal operating condition, default conditions, etc.), or the like. The first deck controller 292 may update instructions to the first deck motor 294 in response to the received communications from the first deck motor 294. For example, the first deck controller 292 may reduce a power threshold of the first deck controller 292 if operating temperature exceeds a prescribed temperature threshold. In an embodiment, the first deck controller 292 may further instruct the second and third deck controllers 296 and 300 to reduce power threshold in view of the information communicated from the first deck motor 294.

In an embodiment, either one or both of the second deck motor 298 or the third deck motor 302 can communicate with second deck controller 296 or the third deck controller 300, respectively. Communication from the second deck motor 298 to the second deck controller 296 or from the third deck motor 302 to the third deck controller 300 can include, e.g., operating current draw, operating voltage, operating temperature, operational status updates (e.g., normal operating condition, default conditions, etc.), or the like. In response, the second or third deck controllers 296 or 300 may determine a resulting update and apply that update to the second or third deck motor 298 or 302 or relay the communication to the first deck controller 292 which can determine a resulting update and send the update to the deck controllers 296 or 300 to apply to the second or third deck motor 298 or 302.

A non-limiting example is provided to demonstrate how the first, second and third deck motors 292, 296 and 300 can interact with one another to control operation of the mower deck 118. When mowing, operators generally navigate the lawn mower 100 such that each pass overlaps to some extent with a previous adjacent pass. In this regard, the mower deck 118 overlaps a previous cut area resulting in fewer or no blades of grass which are missed between successive, adjacent passes. The extent of overlap between the passes is generally determined by the operator. Some operators (e.g., novices) require large overlaps to eliminate uncut grass while other operators can operate with minimal overlap. For large overlapping passes, one or more of the cutting implements 260 may require reduced power to operate as the lawn under that cutting implement is already cut and the resulting force on the cutting implement is less. Assuming, e.g., a third cutting implement (not illustrated) associated with the third deck motor 302 is experiencing reduced force requirements as a result of overlying a previously cut section of lawn, it may be desirable to lower power draw to the third deck motor 302 to extend operational battery life or to redistribute power elsewhere in the lawn mower 100. In this situation, the third deck motor 302 can communicate a low power draw to the third deck controller 300. The third deck controller 300 can then communicate the low power draw condition to the first deck controller 292. The first deck controller 292 can then determine a control update and communicate the update to the third deck controller 300 which can adjust operation of the third deck motor 302 in response thereto. In an embodiment, the first deck controller 292 may ascertain information from one or more of the first deck motor 294, the second deck motor 298, the second deck controller 296, or another element of the control system 280 prior to sending instructions to the third deck controller 300 to adjust operation of the third deck motor 302. The first deck controller 292 may further communicate control updates to the first deck motor 294 and the second deck controller 296 in response to the detected low power draw condition of the third deck motor 302. For instance, the first deck controller 292 may increase power to the first and second deck motors 294 and 298 while reducing power to the third deck motor 302. In this regard, the lawn mower 100 can operate at a generally continuous power draw while apportioning power on an as-needed basis.

As previously described, the control system 280 may allow for communication between multiple endpoints within the control system (e.g., between the first drive controller 282 and the first deck controller 292) and tailored adjustment of control aspects of the lawn mower 100. For instance, using the example provided above where the third deck motor 302 experiences reduced force requirements as a result of overlying previously cut lawn, the control system 280 may communicate the reduced force requirement to the first drive controller 282 which may affect travel speed in response thereto. For example, the first drive controller 282 may increase a maximum travel speed of the lawn mower 100 in response to the reduced force requirement of the third deck controller 300. By way of another example, the first drive controller 282 can adjust steering control of the lawn mower 100 in response to the reduced force requirement. As the force on the third deck controller 300 decreases further, the first drive controller 282 may adjust mixing of the control signals to the first and second drive motors 284 and 288 to cause the lawn mower 100 to move in a manner so as to reduce the overlapping dimension. In this regard, the lawn mower 100 can maintain, or attempt to maintain, overlap distances of successive mowing passes in view of power consumption detected by the mower deck 118 or individual components thereof.

In an embodiment, the one or more batteries 170 can functionally communicate with one or more element of the control system 280 to control operation of the lawn mower 100. For example, the one or more batteries 170 can communicate with the main controller 290 through a battery management system (BMS) 311. By way of non-limiting example, the one or more batteries 170 can share a maximum charge capacity of the one or more batteries 170, a current charge state or amount, a determined remaining charge, a maximum discharge rate, a desired discharge rate, or the like. The control system 280 can adjust one or more parameters of the control system 280 in view of the information provided by the one or more batteries 170. For example, the first and second drive motors 284 and 288 can operate at reduced speeds when the one or more batteries 170 are operating outside of a threshold range or condition, the mower deck 118 may not be fully operational when the one or more batteries 170 are operating outside of a threshold range or condition, or the like. In some instances, the main controller 290 can disrupt power from any element of the control system 280 in response to information provided by the one or more batteries 170.

Figure 34:
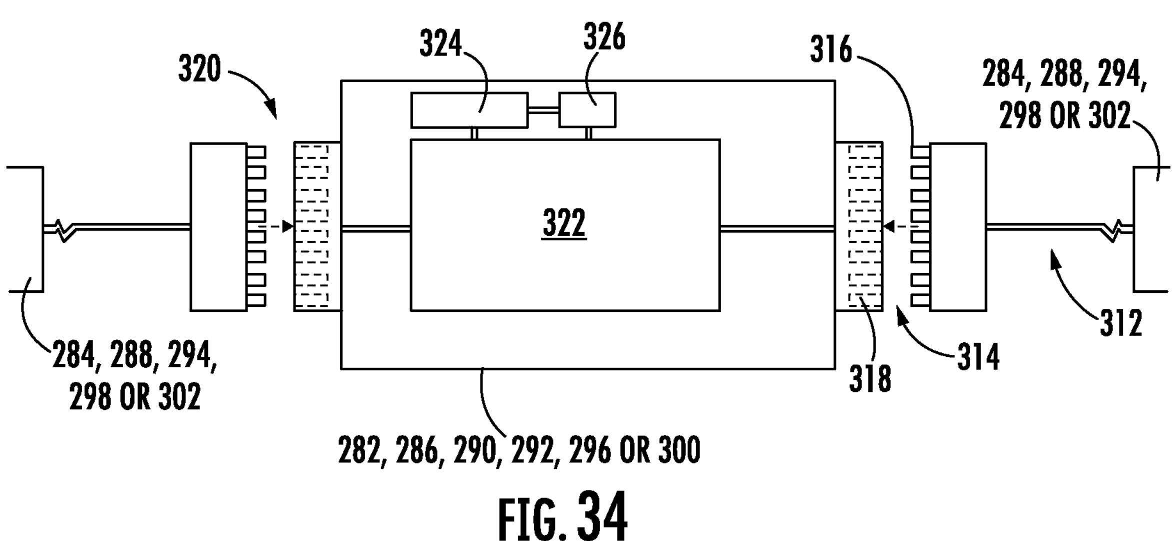
FIG. 34 is a schematic view of a controller of the control system of the lawn mower including contacts and jumper cables in accordance with embodiments of the present disclosure.

FIG. 34 illustrates a schematic view of a portion of the control system 280 in accordance with an exemplary embodiment. In particular, FIG. 34 illustrates a controller (e.g., the first drive controller 282, the second drive controller 286, the main controller 290, the first deck controller 292, the second deck controller 296 or the third deck controller 300) in communication with a first element (e.g., the first drive motor 284, the second drive motor 288, the first deck motor 294, the second deck motor 298 or the third deck motor 302) and a second element (e.g., another one of the first drive motor 284, the second drive motor 288, the first deck motor 294, the second deck motor 298 or the third deck motor 302) of the lawn mower 100. It should be understood that the depicted embodiment is exemplary only and that the described arrangement may apply to other elements or arrangements as described herein.

In an embodiment, the controller 282, 286, 290, 292, 296 or 300 can be coupled to the first element 284, 288, 294, 298 or 302 using a first jumper cable 312. The first jumper cable 312 can operatively couple the first element 284, 288, 294, 298 or 302 to the controller 282, 286, 290, 292, 296 or 300 at a first jumper interface 314. By way of non-limiting example, the first jumper interface 314 can include a pinned connection including a plurality of pins 316 receivable at corresponding contacts 318 of the controller 282, 286, 290, 292, 296 or 300. In an embodiment, the pins 316 can be part of the first jumper cable 312 while the corresponding contacts 318 can be part of the controller 282, 286, 290, 292, 296 or 300. The jumper interface 314 can be established by joining the pins 316 to the corresponding contacts 318. For example, the pins 316 can be translated towards the contacts 318 and rest thereagainst to form an electrical connection therebetween. Other attachment protocols may be used instead or in addition to the use of pins 316 and contacts 318.

A second jumper interface 320 can be formed between the controller 282, 286, 290, 292, 296 or 300 and the second element 284, 288, 294, 298 or 302. In an embodiment, the second jumper interface 320 can be similar, or the same, as the first jumper interface 314. For example, the second jumper interface 320 can include a pinned connection formed between pins and corresponding slots. In another embodiment, the second jumper interface 320 can be different than the first jumper interface 314.

In an embodiment, the controller 282, 286, 290, 292, 296 or 300 can include a circuit board 322 such as a printed circuit board (PCB) in communication with one or both of the first or second jumper interfaces 314 or 320. The circuit board 322 can communicate with a separate or integrally contained logic element 324 and a memory device 326. The logic element 324 can be configured to execute one or more computer-readable instructions, e.g., stored at the memory device 326. By way of non-limiting example, the memory device 326 can include random access memory (RAM), read only memory (ROM), CMOS, flash, or the like. In some instances, the logic element 324 can be in communication with a secondary memory, such as an external network received by accessing cloud storage. The logic element 324 can be coupled with the cloud storage through a wired or wireless interface, such as a WiFi connection, Bluetooth, or the like.

The logic element 324 can perform calculations in view of the computer-readable instructions stored, e.g., at the memory device 326, for controlling the lawn mower 100. In an embodiment, the performed calculations of the logic element 324 can be unique to each controller 282, 286, 290, 292, 296 and 300. For example, two or more of the controllers 282, 286, 290, 292, 296 and 300 can include different computer-readable instructions as compared to one another, each of which causes the logic element 324 to execute a particular control functionality. In this regard, the two or more controllers 282, 286, 290, 292, 296 and 300 can be function specific. Function-specific controllers may lack computer-readable instructions capable of performing different control aspects of the lawn mower 100. Each different control role can be satisfied using the function-specific controller associated with that role. By way of example, the first and second drive controllers 282 and 286 can be drive wheel motor specific, i.e., only usable for drive wheel motor control, while the first and second deck controllers 292 and 296 can be deck motor specific, i.e., only usable for the first and second deck motors 294 and 298.

In another embodiment, one or more of the controllers 282, 286, 290, 292, 296 and 300 can be a universal controller. The universal controllers can all share a common architecture having a common hardware, a common firmware, or both. Universal controllers may be used at multiple locations of the control system 280, although in certain embodiments, the universal controllers can only be used at one location of the control system 280 at a time. For example, a single controller can be used as any of the first or second drive controllers 282 or 286, any of the first, second or third deck controllers 292, 296 or 300, or even as the main controller 290. In this regard, a single controller type can serve multiple functions on the lawn mower 100. The controller can be swapped between the various locations of the control system 280 and perform location-specific control functionality associated with the selected location.

In an embodiment, the universal controller 282, 286, 290, 292, 296 or 300 can self-configure a function of that controller in view of the selected location in the control system 280. As used herein, the term "self-configure" is intended to refer to a condition whereby the controller at least partially sets or performs a specific functionality without an intervening configuration step performed by an operator to specifically demarcate that controller with a specific functionality. By way of non-limiting example, self-configurable controllers may automatically determine their location within the control system 280 and perform functions specifically associated with their determined location. During assembly, an installer can draw from a single controller source when selecting the controller for each controller location in the control system 280. Thus, one single type of controller can replace the need for multiple different controller types, thereby reducing manufacturing and assembly costs.

In an embodiment, the self-configurable controller 282, 286, 290, 292, 296 or 300 can self-configure upon occurrence of a condition. For example, each self-configurable controller 282, 286, 290, 292, 296 or 300 can self-configure as a result of establishing the first jumper interface 314, the second jumper interface 320, or both. Establishment of the first or second jumper interface 314 or 320 can be detected by the self-configurable controller 282, 286, 290, 292, 296 or 300.

Upon detecting the established first or second jumper interface 314 or 320, the self-configurable controller 282, 286, 290, 292, 296, 300 can select an appropriate computer-executable instruction associated with the detected location of the self-configurable controller 282, 286, 290, 292, 296 or 300 within the control system 280. In an embodiment, the location of the self-configurable controller 282, 286, 290, 292, 296 or 300 may be determined based on one or more characteristics of the attached jumper(s). For example, the first jumper cable 312 can have a different spatial arrangement at different locations within the control system 280. The different spatial arrangement can include a different number of pins 316, a different layout of pins 316, or the like. Based on the detected connection at the first jumper interface 316, e.g., how many pins 316 are present, the self-configurable controller 282, 286, 290, 292, 296 or 300 can select the appropriate functionality. Other exemplary ways of detecting the location of the self-configurable controller 282, 286, 290, 292, 296 or 300 within the control system 280 include detection of an identification signal carried by the first jumper cable 312, detection of a location tag (e.g., an RFID, WiFi, Bluetooth, magnetic signal, etc.) associated with the location, an identifying connector which is connected to the controller 282, 286, 290, 292, 296 or 300 in addition to the first and second jumper cables.

In an embodiment, the control system 280 can utilize a hierarchical arrangement where one or more of the controllers 282, 286, 290, 292, 296 or 300 at least partially controls another one of the controllers 282, 286, 290, 292, 296 or 300. In certain instances, the control hierarchy is based on location of the controllers 282, 286, 290, 292, 296 and 300 within the control system 280. For example, as previously described, the first drive controller 282 can at least partially inform a control aspect of the second drive controller 286. In this regard, the first drive controller 282 can be hierarchically arranged above the second drive controller 286 and have a relatively greater responsibility in the control system 280. This exemplary hierarchical arrangement can be maintained regardless of which physical controller body is used at which location, i.e., independent of which physical controller is connected at the location associated with the first drive controller 282 and which physical controller is connected at the location associated with the second drive controller 286. Regardless of which physical controller is positioned at each location, the hierarchical arrangement can remain relatively unchanged between locations in the control system 280.

Use of swappable controllers, i.e., controllers which can operate at various locations within the control system 280, can reduce manufacturing and assembly costs by reducing part count. Additionally, changing out controllers is made easier as the operator is only required to maintain one back-up controller type. Moreover, in the event a critical controller (like one of the drive controllers 282 or 286) becomes damaged or unusable, the operator can remove one of the first, second or third deck controllers 292, 296 or 300 and replace the damaged drive controller 282 or 286 using the former deck controller 292, 296 or 300. In this regard, the operator is not stranded in the event one of the operating elements of the control system 280 fails. In an embodiment, at least one of the controllers 282, 286, 290, 292, 296 or 300 is readily accessible to the operator, e.g., for service or replacement. By way of non-limiting example, the at least one controller 282, 286, 290, 292, 296 or 300 can be disposed within a sealed panel of the faring 104. The operator can access the at least one controller 282, 286, 290, 292, 296 or 300 within the sealed panel as necessary.

In an embodiment, the main controller 290 can act as an intermediary node between one or more of the first, second or third deck controllers 292, 296 or 300 and one or more of the first or second drive controllers 282 or 286. That is, communication from any one of the one or more of the first, second or third deck controllers 292, 296 or 300 and one or more of the first or second drive controllers 282 or 286 can pass through the main controller 290.

Referring again to FIG. 1, the lawn mower 100 can further include an electrical port 328 configured to couple with and receive power from a charging cable 330. The electrical port 328 can be electrically coupled with the one or more batteries 170 such that power provided through the charging cable 300 provides charge to the one or more batteries 170. In the depicted embodiment, the electrical port 328 is disposed below the storage bed 148 on a lateral side of the lawn mower 100. In other embodiments, the electrical port 328 can be disposed at a rear side of the lawn mower 100, near the seat 106, or at another suitable location. A cover (not illustrated) can selectively cover the electrical port 328 when the charging cable 330 is not coupled therewith. The cover can form an environmental seal against ingress of contaminants such as dirt, grass clippings, and water.

Figure 35:
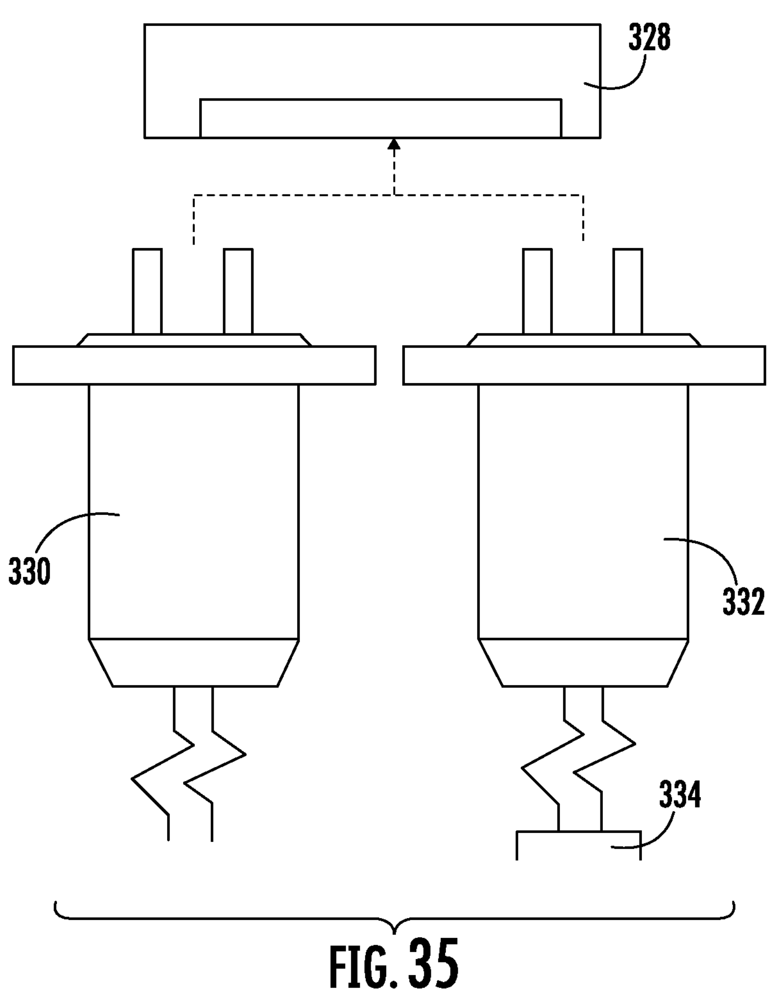
FIG. 35 is a schematic view of an electrical port of the lawn mower and cables which are removably attachable to the electrical port in accordance with embodiments of the present disclosure.

FIG. 35 illustrates a schematic view of the electrical port 328 and charging cable 330. Additionally, FIG. 35 depicts an electrical cable 332 associated with a removable accessory 334 which may be used in conjunction with the lawn mower 100. By way of non-limiting example, the removable accessory 334 can be selected from a group consisting of a log splitter, a leaf blower, a grass collector, a woodchipper, an edger, or the like. The removable accessory 334 can be towed by the lawn mower 100, e.g., by the tow hitch 146 (FIG. 1). The removable accessory 334 can receive power from the lawn mower 100 through the electrical cable 332 when the electrical cable 332 is coupled to the electrical port 328. In an embodiment, the electrical cable 332 and the charging cable 330 can both be received at the same electrical port 328. In other embodiments, the lawn mower 100 can further include a secondary electrical port (not illustrated) configured to receive the electrical cable 332. The secondary electrical port can provide power to the removable accessory 334.

In certain instances, the lawn mower 100 can at least partially control the removable accessory 334. For example, the user interface 210 (FIG. 2) can include a user implement, e.g., a button, which controls one or more aspects of the removable accessory 334 when the electrical cable 332 is electrically coupled to the electrical port 328. Control of the removable accessory 334 can include, for example, activating the removable accessory 334 (e.g., turning the removable accessory 334 to an ON state), deactivating the removable accessory 334 (e.g., turning the removable accessory 334 to an OFF state), adjusting a function of the removable accessory 334 (e.g., raising the operating speed of the removable accessory 334, reducing the operating speed of the removable accessory 334, increasing power to the removable accessory 334, decreasing power to the removable accessory 334), or the like. In some instances, the lawn mower 100 and removable accessory 334 can have a multi-directional communication protocol therebetween where signals are provided in both directions between the lawn mower 100 and the removable accessory 334.

In one or more embodiments, the lawn mower 100 can communicate with the removable accessory 334 through the electrical cable 332. In other embodiments, the lawn mower 100 can communicate with the removable accessory 334 through a different wired connection or through one or more wireless communication protocols, such as Bluetooth or WiFi. In an embodiment, communication between the lawn mower 100 and the removable accessory 334 can be unidirectional, e.g., the lawn mower 100 sends instructions or power to the removable accessory 334. In another embodiment, communication between the lawn mower 100 and the removable accessory 334 can be multi-directional, e.g., the lawn mower 100 sends instructions or power to the removable accessory 334 and the removable accessory sends feedback to the lawn mower 100. This feedback to the lawn mower 100 can include, for example, identification information associated with the removable accessory 334 (e.g., accessory type, operating requirements, capabilities, etc.), performance information (e.g., current power consumption rate, historical power consumption rate, etc.), or the like.

In an embodiment, the lawn mower 100 can self-configure itself (i.e., automatically configure) in view of which cable 330 or 332 is electrically coupled to the electrical port 328. When the charging cable 330 is electrically coupled to the charging port 328, the lawn mower 100 can be in a charging mode which allows for charging of the one or more batteries 170. When the electrical cable 332 is electrically coupled to the charging port 328, the lawn mower 100 can be in an accessory mode where power is provided to the removable accessory 334. In some instances, the lawn mower 100 is self-configurable between charging mode and accessory mode in view of which cable 330 or 332 is present at the electrical port 328. By way of non-limiting example, the cables 330 and 332 can have different connector types as compared to one another. Upon detecting the connector type associated with the charging cable 330, the lawn mower 100 can automatically enter the charging mode. Upon detecting the connector type associated with the electrical cable 332, the lawn mower 100 can automatically enter the accessory mode. In another embodiment, automatic switching between the charging mode and the accessory mode can occur in view of a transmitted signal, e.g., transmitted through the cable 330 or 332. The transmitted signal can include, for example, an RFID signal, a WiFi signal, an identification signal with information identifying the type of cable coupled to the electrical port 328, or the like.

In another embodiment, the lawn mower 100 may require manual configuration to switch between the charging mode and the accessory mode. For example, the operator can manually configure the lawn mower 100, e.g., at the user interface 210, between the charging mode and the accessory mode. In certain instances, the lawn mower 100 can notify the operator when the lawn mower 100 detects an incompatible cable coupled with the electrical port 328 or other problematic situations which require operator attention. Notification can include, for example, information or warnings depicted on a display, e.g., the display 356, information associated with switching between the cables 330 and 332, or the like.

In an embodiment, the electrical port 328 can be retrofit on an existing lawn mower 100. By way of non-limiting example, the retrofittable electrical port 328 can include a wiring harness which can be coupled to an existing wiring system of the lawn mower. The wiring harness may include control cables associated with controlling one or more functions of the lawn mower and electrical cables associated with power transfer. In some retrofits, the electrical port 328 may be separate from an existing charging port of the lawn mower. In these applications, retrofit of the electrical port 328 may provide connectivity with one or more removable accessories of the lawn mower which previously did not exist.

FIGS. 36 to 46 illustrate a connection interface 336 for coupling the mower deck 118 to the frame 130 of the lawn mower 100 (FIG. 1) in accordance with an exemplary embodiment. The connection interface 336 can permit removable attachment of the mower deck 118 to the frame 130 such that the mower deck 118 can be selectively removed from the lawn mower 100, e.g., for service or storage. In an embodiment, the connection interface 336 can include a first portion 338 coupled to the mower deck 118 and a second portion 340 (FIG. 43) coupled to the frame 130. The first and second portions 338 and 340 can be coupled together to selectively retain the mower deck 118 on the lawn mower 100. Conversely, the first and second portions 338 and 340 can be decoupled from one another to allow for selective removal of the mower deck 118 from the lawn mower 100.

In an embodiment, the first portion 338 of the connection interface 336 defines a receiving area 342 which receives a post 344 (FIG. 40) of the second portion 340. With the receiving area 342 in a locked state, the post 344 can be secured to the first portion 338 to couple the mower deck 118 with the frame 102. Conversely, with the receiving area 342 in an unlocked state, the post 344 can be selectively removed from the first portion 338 to allow for release of the mower deck 118 from the frame 102. In an embodiment, the receiving area 342 can define a first shape (e.g., an ovular shape) when viewed from a particular direction and the post 344 can define a second shape (e.g., a circular shape) when viewed from the particular direction that is different than the first shape. In another embodiment, the receiving area 342 can define a first areal size when viewed from a particular direction different from a second areal size of the post when viewed from the particular direction. The first areal size can be greater than the second areal size. In this regard, the post 344 can move relative to the receiving area 342 when retained therein, thus allowing tolerance between the mower deck 118 can the frame 130.

Figure 36:
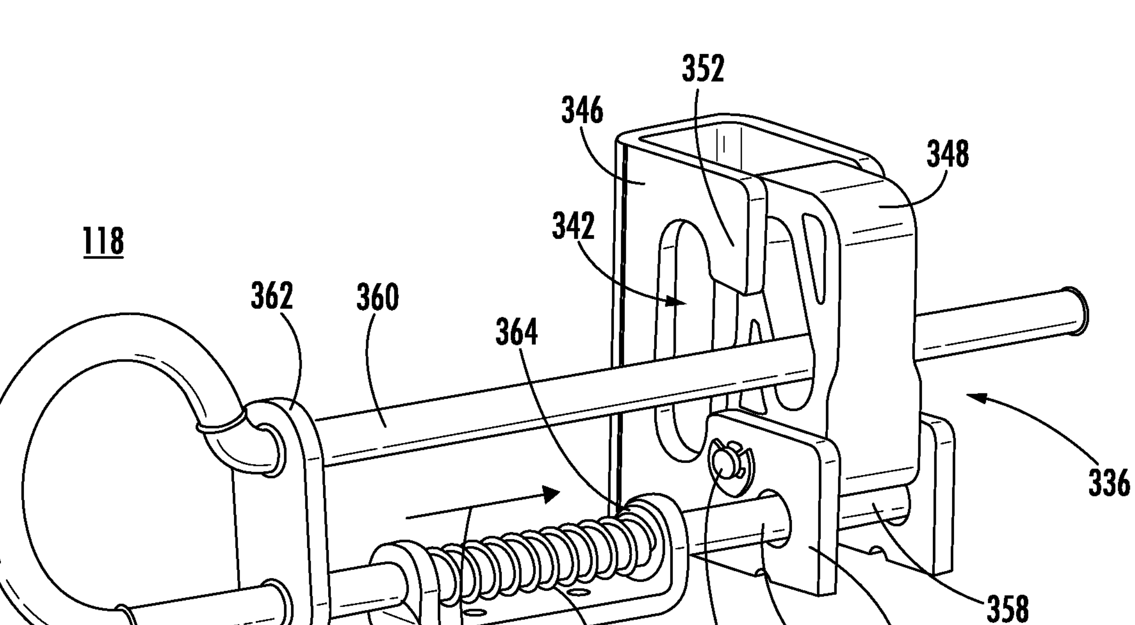
FIG. 36 is a rear perspective view of a connection interface between a mower deck and a frame of a lawn mower in accordance with embodiments of the present disclosure as seen with the connection interface in a closed, locked state.
Figure 37:
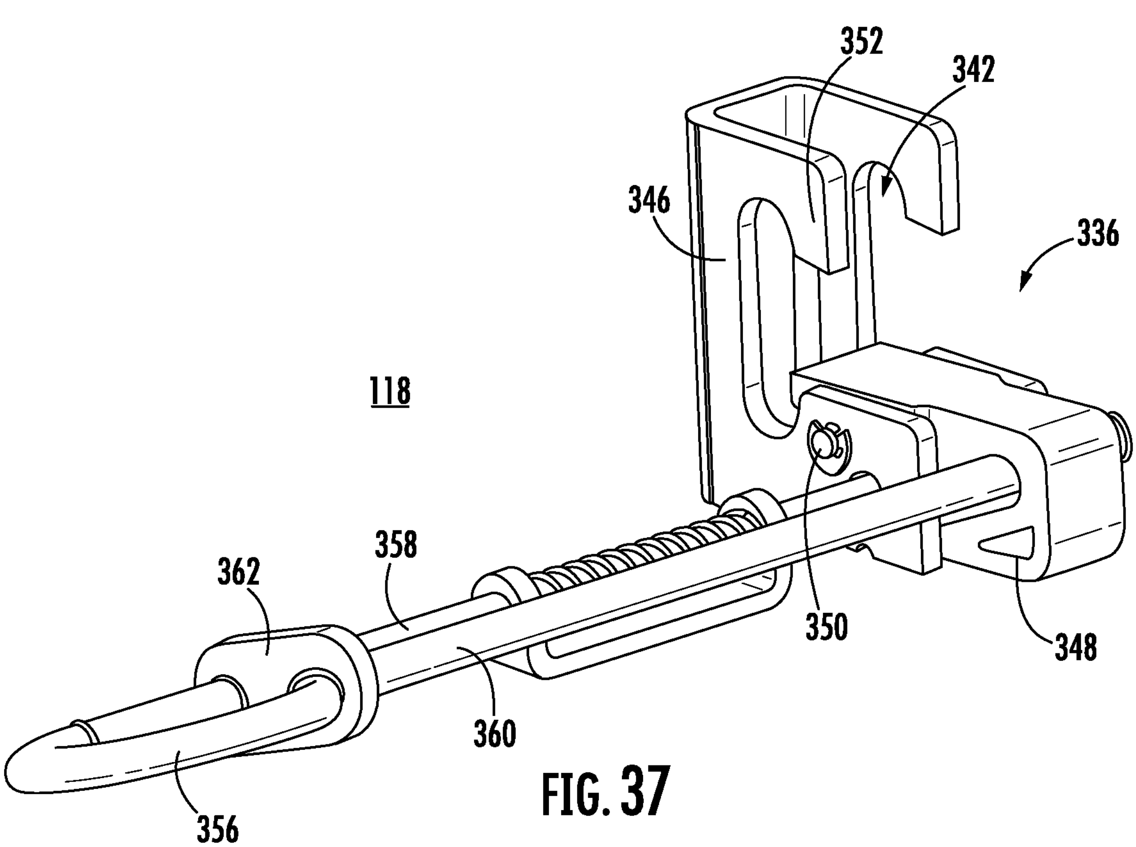
FIG. 37 is a rear perspective view of the connection interface between the mower deck and the frame of the lawn mower in accordance with embodiments of the present disclosure as seen with the connection interface in an open, unlocked state.

Referring to FIGS. 36 and 37, the first portion 338 of the connection interface 336 can include a body 346 defining the receiving area 342. The body 346 can be coupled to the mower deck 118. By way of non-limiting example, the body 346 can be coupled to the mower deck 118 by one or more threaded fasteners (e.g., bolts, screws, or the like), one or more non-threaded fasteners (e.g., rivets), a bayonet type connector, an interference fit, an adhesive, a weld, another suitable connection mechanism, or any combination thereof. A gate 348 can be coupled to the body 346 and moveable between two or more positions to lock and unlock the receiving area 342. The gate 348 may be pivotable relative to the body 346 about a pivot axis 350. FIG. 36 depicts the gate 348 in the locked state. FIG. 37 depicts the gate 348 in the unlocked state. In certain instances, the body 346 can include a lip 352 that retains the post 344 in the receiving area 342 even with the gate 348 moved to the unlocked state. In such a manner, any unwanted (e.g., accidental) movement of the post 344 within the receiving area 342 during use (particularly with the gate 348 in the open position) does not result in detachment of the mower deck 118.

An actuator 354 can be operatively coupled with one or both of the body 346 or gate 348 to selectively move the gate 348 and retain (i.e., lock) the gate 348 in one or both of the locked or unlocked states. The actuator 354 depicted in FIGS. 36 and 37 has a generally U-shaped body defining an operator access location 356 through which the operator can grasp the actuator 354, a first member (e.g., a first arm 358) extending along a pivot axis about which the actuator 354 can rotate, and a second member (e.g., a second arm 360) which interfaces with at least one of the body 346 or gate 348 to selectively retain the gate 348 in one or both of the locked or unlocked states. The depicted actuator 354 further includes a linkage 362 extending between the first and second arms 358 and 360. In certain instances, the linkage 362 can maintain a relative spatial arrangement between the first and second arms 358 and 360, assist in forming the operator access location 356, or both. In an embodiment, the linkage 362 can be fixed relative to the body of the actuator 354. In another embodiment, the linkage 362 can be moveable relative to the body of the actuator 354. For example, the linkage 362 can slide along one or both of the first or second arms 358 or 360.

The actuator 354 can further include a stop feature 364. The stop feature 364 may be coupled, e.g., to the first arm 358. The stop feature 364 can form a support surface for a spring 366. The spring 366 can generate force in a direction generally parallel with a length of the first arm 358. In the depicted embodiment, the spring 366 is coaxial with the first arm 358 and extends around the first arm 358. The spring 366 can extend between the stop feature 364 and a bracket 368 such that the spring 366 biases the stop feature 364, and thus the first arm 358 of the actuator 354, to the locked state in the direction of arrow L. The bracket 368 can also guide the actuator 354 in the direction parallel with the line L through, e.g., one or more openings 370 in the bracket 368. To unlock the connection interface 336, the operator can pull the actuator 354 in a direction opposite to arrow L, causing the spring 366 to compress. The bracket 368 can be fixed to the mower deck 118 to allow for generation of force by the spring 366 upon movement of the actuator 354.

Figures 38, 39, 40, 41:
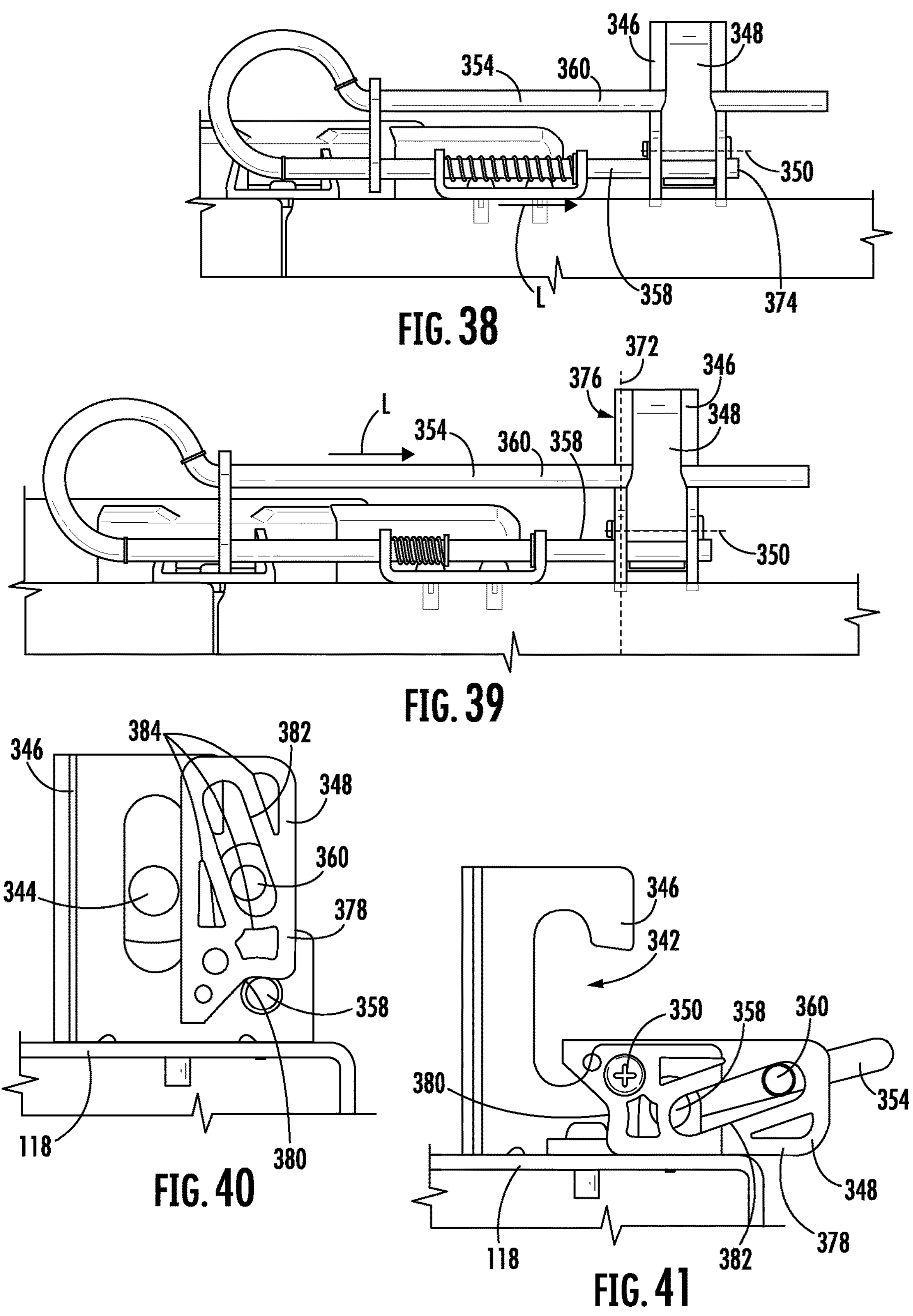
FIG. 38 is a side view of the connection interface in accordance with embodiments of the present disclosure as seen with an actuator of the connection interface in the locked state.
FIG. 39 is a side view of the connection interface in accordance with embodiments of the present disclosure as seen with the actuator of the connection interface in the unlocked state.
FIG. 40 is a cross-sectional side view of the connection interface in accordance with embodiments of the present disclosure as seen with a gate of the connection interface in a closed state.
FIG. 41 is a cross-sectional side view of the connection interface in accordance with embodiments of the present disclosure as seen with the gate of the connection interface in an open state.

Referring to FIGS. 38 and 39, as the actuator 354 moves from the locked state (FIG. 38) to the unlocked state (FIG. 39), e.g., through translation, the first arm 358 clears the gate 348, moving past a threshold 372 thereby allowing the gate 348 to pivot about the pivot axis 350. In an embodiment, translation of the actuator 354 can occur in a direction generally perpendicular to a length of the lawn mower 100 (i.e., the length between the front end 120 and rear end 122). As depicted, moving the actuator 354 to the unlocked state (FIG. 39) can compress the spring 366. As shown in FIGS. 36 and 37, the first arm 358 can extend through the body 346 and block rotation of the gate 348 when the actuator 354 is in the locked state. In an embodiment, the spring 366 can have a length, as measured in the compressed state in a direction parallel with arrow L, which prevents the first arm 358 from pulling completely out of the body 346. That is, the spring 366 can have a compressed length sized to prevent a leading end 374 of the first arm 358 (FIG. 38) from passing a nearest side 376 of the body 346 (FIG. 39). In such a manner, the actuator 354 can remain operatively coupled with the body 346 in both the locked and unlocked states. In some embodiments, a hard stop, retaining ring, or other mechanism could be used in place of or in addition spring 366 to perform this function.

FIGS. 40 and 41 illustrate partial cross-sectional side views of the connection interface 336 in accordance with an embodiment as seen in the locked state (FIG. 40) and the unlocked state (FIG. 41). As depicted, the gate 348 includes a body 378 defining a first retention feature 380 which the first arm 358 interacts with to prevent rotation of the gate 348 when the actuator 354 is in the locked state, and a second retention feature 382 which the second arm 360 interacts with to move the gate 348 between the locked and unlocked states. In the depicted embodiment, the first retention feature 380 includes a notch disposed along an outer (peripheral) edge of the gate 348. In another embodiment, the first retention feature 380 can extend through the gate 348. In an embodiment, the second retention feature 380 can be disposed along an outer (peripheral) edge of the gate 348. In the depicted embodiment, the second retention feature 380 extends through the gate 348.

The gate 348 can further include one or more recesses or openings 384 which extend into or through the body 378 of the gate 348. In certain instances, the recesses or openings 384 can reduce weight of the gate 348, reduce inertial resistance encountered during movement of the gate between the locked and unlocked states, provide compliance and tolerance for deformation of the gate 348, or any combination thereof.

In an embodiment, the first and second arms 358 and 360 of the actuator 354 can have different lengths as compared to one another. For instance, the second arm 360 can be longer than the first arm 358. For example, the length of the second arm 360 can be at least 101% the length of the first arm 358, such as at least 102% the length of the first arm 358, such as at least 103% the length of the first arm 358, such as at least 104% the length of the first arm 358, such as at least 105% the length of the first arm 358, such as at least 110% the length of the first arm 358, such as at least 115% the length of the first arm 358, such as at least 120% the length of the first arm 358, such as at least 125% the length of the first arm 358. In such a manner, the longer second arm 360 can be retained by the second retention feature 380 while the shorter first arm 358 clears the first retention feature 378 when the actuator 354 is moved to the unlocked state.

In an embodiment, the gate 348 can be at least partially formed from a relatively rigid material. By way of non-limiting example, the relatively rigid material can include a metal, an alloy, a rigid plastic, or any combination thereof. The relatively rigid material can generally retain its shape during use. In another embodiment, the gate 348 can be at least partially formed from a relatively compliant material. By way of non-limiting example, the relatively compliant material can include a rubber, a soft plastic, or any combination thereof. The relatively compliant material can allow the gate 348 to flex and bend during use to accommodate tolerances or misalignment, reduce noise-vibration-harshness (NVH), or both. In yet another embodiment, the gate 348 can be formed from a relatively rigid material and a relatively compliant material. By way of non-limiting example, the relatively rigid material can form a core of the gate 348 and the relatively compliant material can at least partially cover the core. In this regard, the gate 348 can exhibit high strength while accommodating tolerances and misalignment and reducing NVH.

Figures 42, 43, 44:
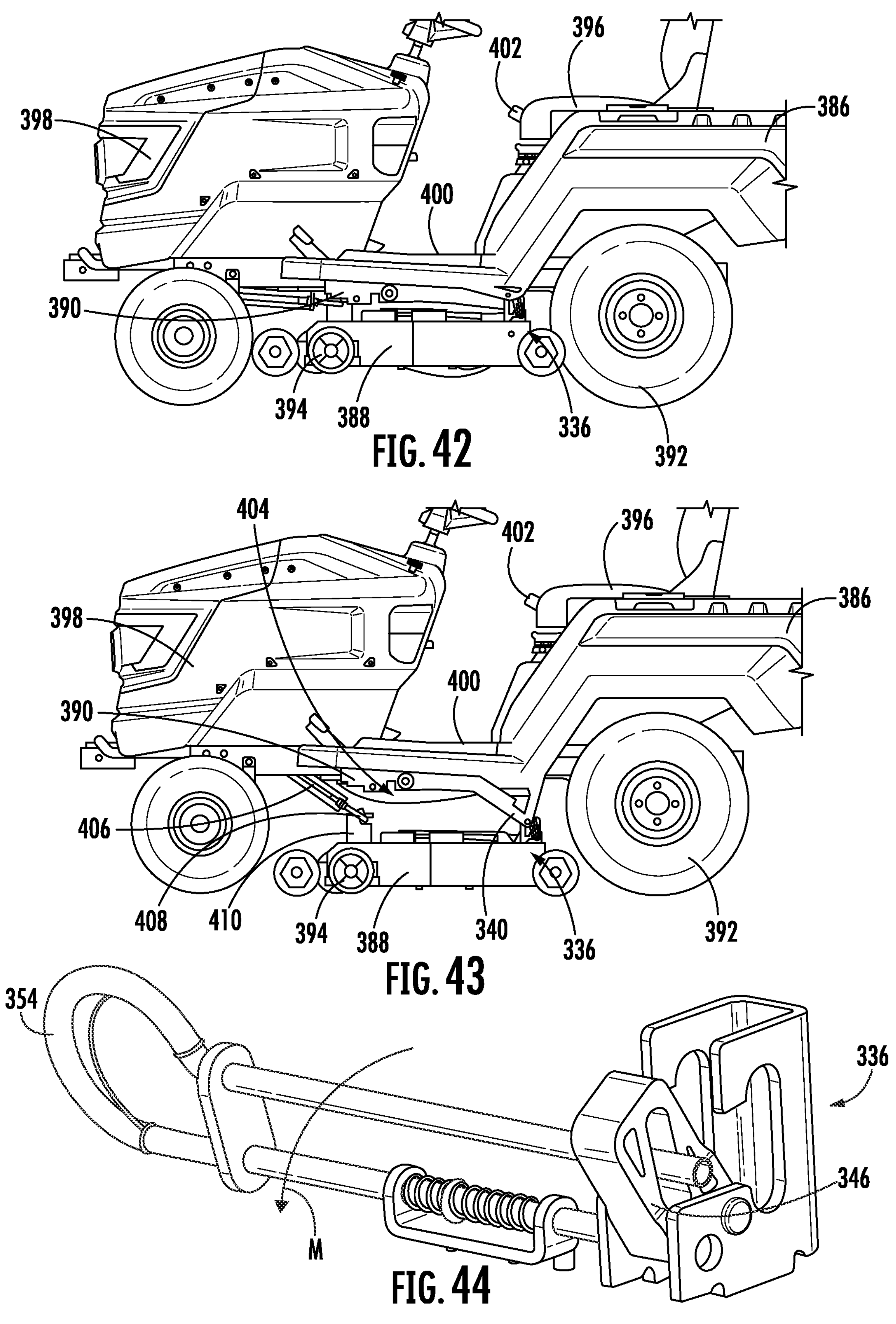
FIG. 42 is a side view of a portion of the lawn mower with a mower deck in a raised, in-use position in accordance with embodiments of the present disclosure.
FIG. 43 is a side view of a portion of the lawn mower with the mower deck in a maintenance position in accordance with embodiments of the present disclosure.
FIG. 44 is a rear perspective view of the connection interface in accordance with embodiments of the present disclosure as seen with the gate moved from the closed to open positions.

As described above, the connection interface 336 illustrated in FIGS. 36 to 41 allows the operator to selectively couple the mower deck 118 to the frame 102 of the lawn mower 100. FIGS. 42 and 43 illustrate views of a lawn mower 386 in accordance with another embodiment. The lawn mower 386 depicted in FIGS. 42 and 43 may be referred to as a tractor lawn mower or a riding lawn mower. The lawn mower 386 includes a mower deck 388 coupled to a frame 390 which is supported by one or more walking implements, such as wheels 392. The mower deck 386 can include any one or more features or characteristics as compared to the mower deck 118. For instance, the mower deck 386 can include gauge wheels 394 (e.g., multidirectional gauge wheels 414 depicted in FIGS. 47 and 48) which can support the mower deck 386 along the underlying ground surface. The lawn mower 386 can further include any one or more features or characteristics as described above with respect to the lawn mower 100. For example, the lawn mower 386 can further include a seat 396, a faring 398, a foot platform 400, and the like.

The mower deck 388 is depicted coupled to the frame 390 through the connection interface 336. FIG. 42 illustrates the lawn mower 386 as seen with the mower deck 388 in an in-use state. In the in-use state, the mower deck 388 is ready to conduct mowing operations. It should be understood, that the height of the mower deck 388 may be adjusted when the lawn mower 386 is in the in-use state.

In certain instances, it may be necessary to detach the mower deck 388 from the frame 390 of the lawn mower 386. For example, removal of the mower deck 388 allows the operator to inspect, clean, repair, and otherwise maintain or retrofit the mower deck 388 and its associated features. The operator can utilize the connection interface 336 to detach the mower deck 388 from the frame 390.

To initiate removal of the mower deck 388, the operator may first lower the mower deck 388 to a prescribed height, e.g., a maintenance position. In an embodiment, the maintenance position can have its own height setting. That is, the operator can move the mower deck 388 to the maintenance position height. The maintenance position height can, for example, be lower than a lowest regular in-use height setting or higher than a lowest regular in-use height setting. In another embodiment, the maintenance position can correspond with the lowest height of the mower deck 388. That is, the operator can move the mower deck 388 to its lowest in-use height to access the maintenance position.

FIG. 43 illustrates a side view of the lawn mower 100 with the mower deck 388 in the maintenance position. In an embodiment, the mower deck 388 can be lowered to the maintenance position using a height adjustment implement 402. By way of non-limiting example, the height adjustment implement 402 can include a lever, a rotatable dial, or the like. As the operator moves the height adjustment implement 402 to a position corresponding with the maintenance position, the mower deck 388 can be lowered via a height adjustment interface 404. In an embodiment, movement of the mower deck 388 using the height adjustment interface 404 can be facilitated through a direct linkage, e.g., where the operator manually raises and lowers the mower deck 388. In another embodiment, movement of the mower deck 388 can be at least partially facilitated by a deck height assist mechanism, such as a deck height motor system including a deck height motor which uses, e.g., electrical energy to raise and lower the mower deck 388, a deck height hydraulic system, a deck height spring system, or the like.

The height adjustment interface 404 can be coupled to the frame 390 of the lawn mower 386 to allow for raising and lowering of the mower deck 388 relative to the frame 390. In the depicted embodiment, the height adjustment interface 404 includes a first portion including a pivotable arm 406 and an engagement mechanism 408. The engagement mechanism 408 can be removably coupled with a complementary engagement mechanism 410 disposed on the mower deck 388. In an embodiment, the complementary engagement mechanism 410 includes an open receiving area configured to receive the engagement mechanism 408. As used herein, the term "open receiving area" refers to a receiving area which does not include a closure mechanism (e.g., gate 348) to lock the receiving area. The engagement mechanism 408 can be coupled to the pivotable arm 406, e.g., through a spring or other adjustable mechanism which allows the effective length of the first portion of the height adjustment interface 404 to compensate for tolerance and misalignment between the frame 390 and the mower deck 388. In an embodiment, the first portion of the height adjustment interface 404 can be passive, i.e., not directly manipulatable. Adjustment of the mower deck 388 can instead be performed through a second portion 412 of the height adjustment interface 404, where the second portion is operatively coupled to the height adjustment implement 402. As the operator adjusts the height adjustment implement 402, the second portion of the height adjustment interface 404 can cause the mower deck 388 to move. The second portion of the height adjustment interface 404 can include the connection interface 336 described above. The connection interface 336 can receive the post 344 to secure the connection interface 336 to a pivotable arm 412 associated with the height adjustment interface 404. It should be understood that the mower deck 388 may be coupled to the frame 390 through more than one first portion of the height adjustment interface 404 and more than one second portion of the height adjustment interface 404. That is, by way of non-limiting example, the lawn mower 386 can include two first portions (e.g., two front linkages) and two second portions (e.g., two rear linkages) which together support the mower deck 388.

Figure 45:
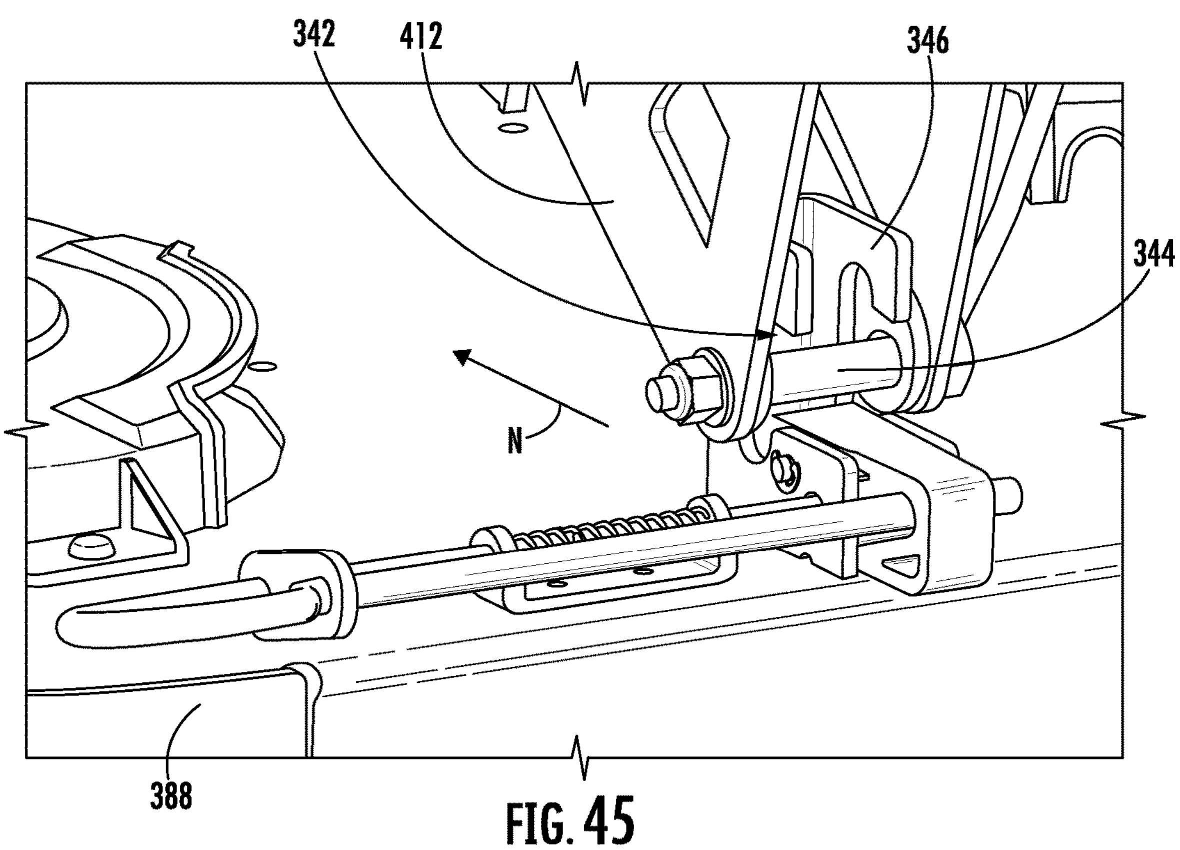
FIG. 45 is a rear perspective view of the connection interface in accordance with embodiments of the present disclosure as the mower deck is moved to release a post associated with the frame from a receiving area associated with the mower deck.

With the mower deck 388 in the maintenance position, the connection interface 336 can be moved to the unlocked state by moving the actuator 354, e.g., in the direction shown by arrow M in FIG. 44. Once in the unlocked state, the mower deck 388 can be moved to release the post 344 from the receiving area 342 of the body 346. As illustrated in FIG. 45, the mower deck 388 can be translated in a direction shown by arrow N (e.g., the forward direction) to release the post 344 from the receiving area 342. Simultaneously, the engagement mechanism 408 can displace from the complementary engagement mechanism 410 to allow for removal of the mower deck 388 (FIG. 43).

Figure 46:
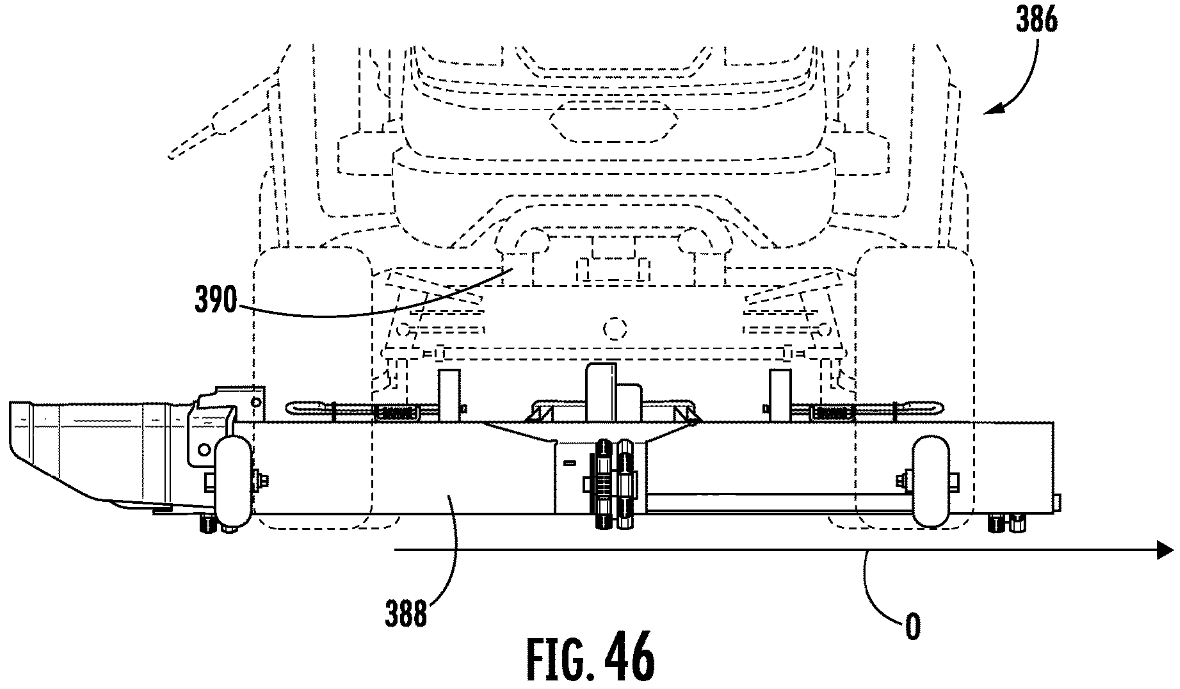
FIG. 46 is a front view of the mower deck being moved laterally from under the lawn mower in accordance with embodiments of the present disclosure.

FIG. 46 depicts a front view of the lawn mower 386 with the mower deck 388 unlocked from the frame 390. Once unlocked, the mower deck 388 can be translated away from the frame 390 (after removing any other connections such as, e.g., electrical (plug) connection(s) between the deck and the rest of the mower). For instance, the mower deck 388 can be translated in a lateral direction as shown e.g., by arrow O. In an embodiment, at least a portion of the second portion of the connection interface 336, e.g., the pivotable arm 412, is lifted from the maintenance position prior to translating the mower deck 388 in the lateral direction. In certain instances, lifting of the second portion of the connection interface 336 can be performed manually by the operator. In other instances, lifting of the second portion of the connection interface 336 can be at least partially performed by the lawn mower 386. For example, the height adjustment interface 404 (FIG. 43) can be powered, e.g., by a height adjustment motor (not illustrated).

In some instances, the gauge wheels 394 can support the mower deck 388 during lateral translation to remove the mower deck 388 from under the frame 390. Movement of the mower deck 388 from under the frame 390 may be further facilitated by the use of multidirectional wheels like the gauge wheels 414 depicted in FIGS. 47 and 48. In other instances, one or more auxiliary wheels can support the mower deck 388 during lateral translation. The one or more auxiliary wheels may be selectively deployable, e.g., retractable into a stored position when the mower deck 388 is not being removed from the frame 390.

With the mower deck 388 removed, the operator can access the mower deck 388, service one or more cutting implements (not illustrated) of the mower deck 388, access the frame 390 or another underlying, or underside accessible, component of the lawn mower 386, or the like. In certain instances, the operator may desire to store the mower deck 388 off the lawn mower 386. For example, the operator may desire to utilize a different mower deck 388 having a different operational capacity or functionality. However, in many cases, the operator will return the mower deck 388 to the lawn mower 386 after servicing is complete.

Returning the mower deck 388 to the lawn mower 386 can be performed using the method described above, performed in reverse. For example, the operator can first translate the mower deck 388 in the lateral direction shown by arrow O in FIG. 46. The operator can further return the height adjustment implement 402 to the maintenance position. Once the mower deck 388 is at the appropriate lateral position and the height adjustment implement 402 is at the maintenance position, the operator can translate the mower deck 388 in a direction opposite to arrow N as seen in FIG. 45. Once the engagement mechanism 408 and complementary engagement mechanism 410 are aligned with one another (FIG. 43) and the post 344 is in the receiving area 342, the operator can move the actuator 354 in a direction opposite to arrow M as seen in FIG. 44 until the gate 346 is in the closed position and the receiving area 342 is locked. The operator can then release the actuator 354 which returns to its locked state by translating in the direction shown by arrow L in FIG. 39. The operator can then use the height adjustment implement 402 to raise the deck from the maintenance position shown in FIG. 43 to the in-use position shown in FIG. 42.

FIGS. 49 to 52 illustrate a connection interface 442 in accordance with another embodiment of the present disclosure. In an embodiment, the connection interface 442 can have any one or more features or elements in common with the connection interface 336 illustrated in FIGS. 36 to 46. In another embodiment, the connection interface 442 can have any one or more features or elements that are different from the connection interface 336 illustrated in FIGS. 36 to 46.

Figure 49:
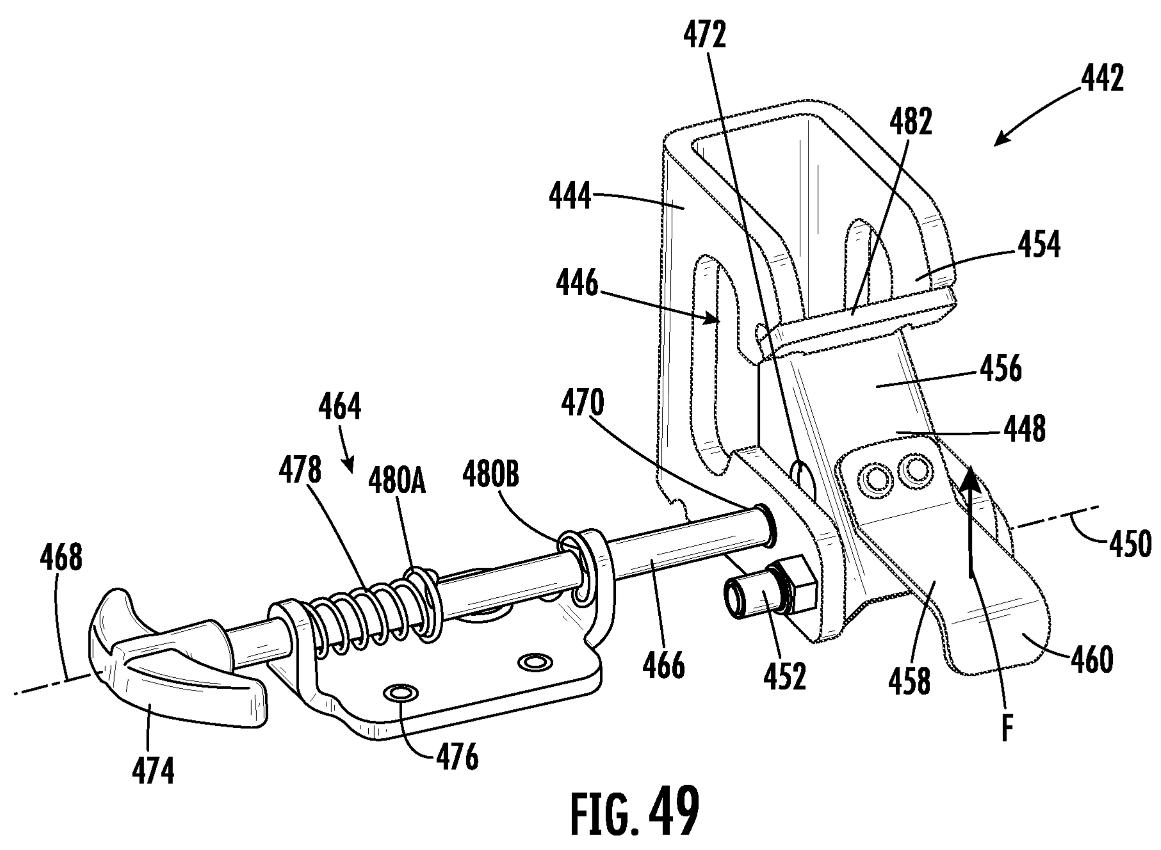
FIG. 49 is a rear perspective view of a connection interface between a mower deck and a frame of a lawn mower in accordance with embodiments of the present disclosure as seen with the connection interface in a closed state.
Figure 50:
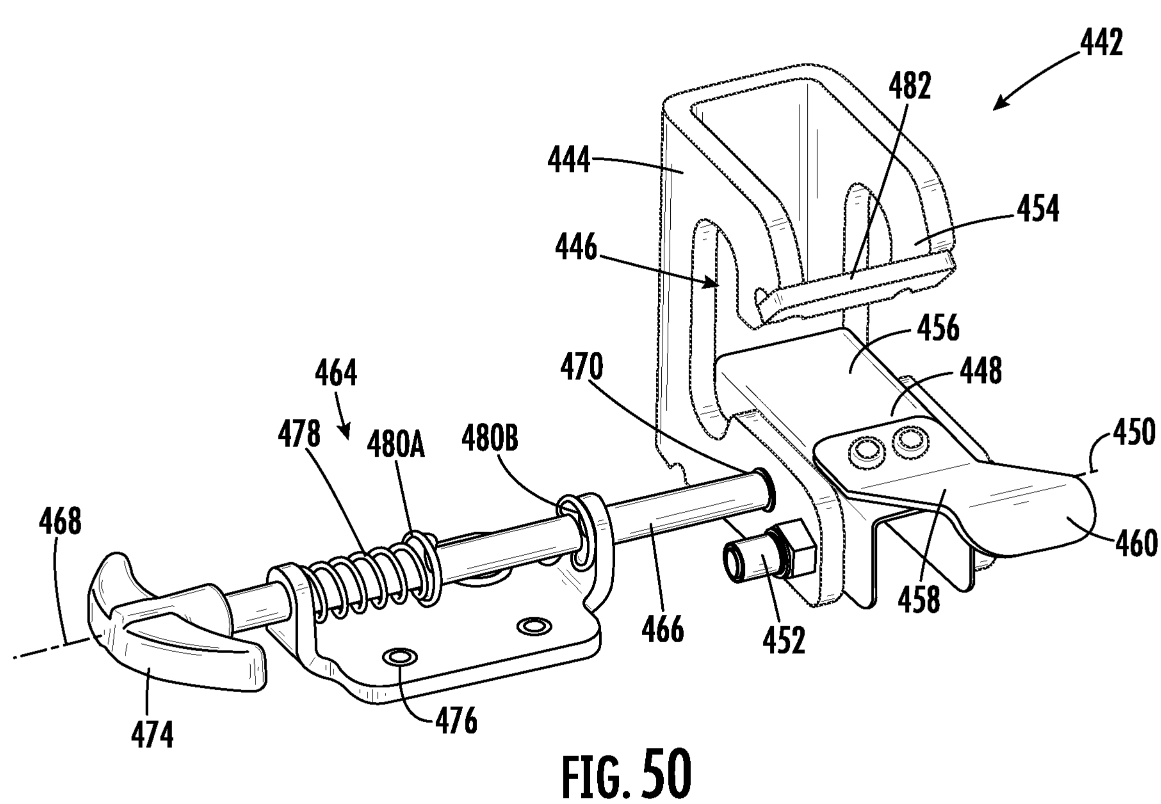
FIG. 50 is a rear perspective view of the connection interface between a mower deck and a frame of a lawn mower in accordance with embodiments of the present disclosure as seen with the connection interface in a locked, open state.

Referring initial to FIGS. 49 and 50, the connection interface 442 can include a body 444 defining a receiving area 446. The body 444 can have any one or more similar features or elements as compared to body 346. The body 444 can be coupled to the mower deck 118. By way of non-limiting example, the body 444 can be coupled to the mower deck 118 by one or more threaded fasteners (e.g., bolts, screws, or the like), one or more non-threaded fasteners (e.g., rivets), a bayonet type connector, an interference fit, an adhesive, a weld, another suitable connection mechanism, or any combination thereof. A gate 448 can be coupled to the body 444 and moveable between two or more positions to open and close the receiving area 446. The gate 448 may be pivotable relative to the body 444 about a pivot axis 450. In an embodiment, the pivot axis 450 can be defined by an axle 452 extending between opposite sides of the body 444.

FIG. 49 depicts the gate 448 in the closed state. FIG. 50 depicts the gate 448 in the open state. In certain instances, the body 444 can include a lip 454 that retains the post 344 (FIG. 40) in the receiving area 446 even with the gate 448 moved to the open state. In such a manner, any unwanted (e.g., accidental) movement of the post 344 within the receiving area 446 during installation (particularly with the gate 448 in the open position) does not result in detachment of the mower deck 118 from the frame 390 (FIG. 42).

The gate 448 can include a body 456 that selectively blocks ingress and egress of the post 344 relative to the receiving area 446. The gate 448 can also include a user engageable element 458 that allows a user to interact with the gate 448 to move the body 456 between the closed and open states. By way of non-limiting example, the user engageable element 458 can be coupled to the body 456 through a threaded or non-threaded fastener, adhesive, another suitable coupling mechanism, or any combination thereof. The user engageable element 458 can extend from the body 456 to a location accessible by the user. In some instances, the user engageable element 458 can include a flanged end 460 that is angularly offset from the rest of the user engageable element 458. In an embodiment, the user engageable element 458 may be referred to as a tongue. The user can move the gate 448 to the open state by biasing the tongue in a direction F, causing rotation of the gate 448 about the axle 452.

Figure 51:
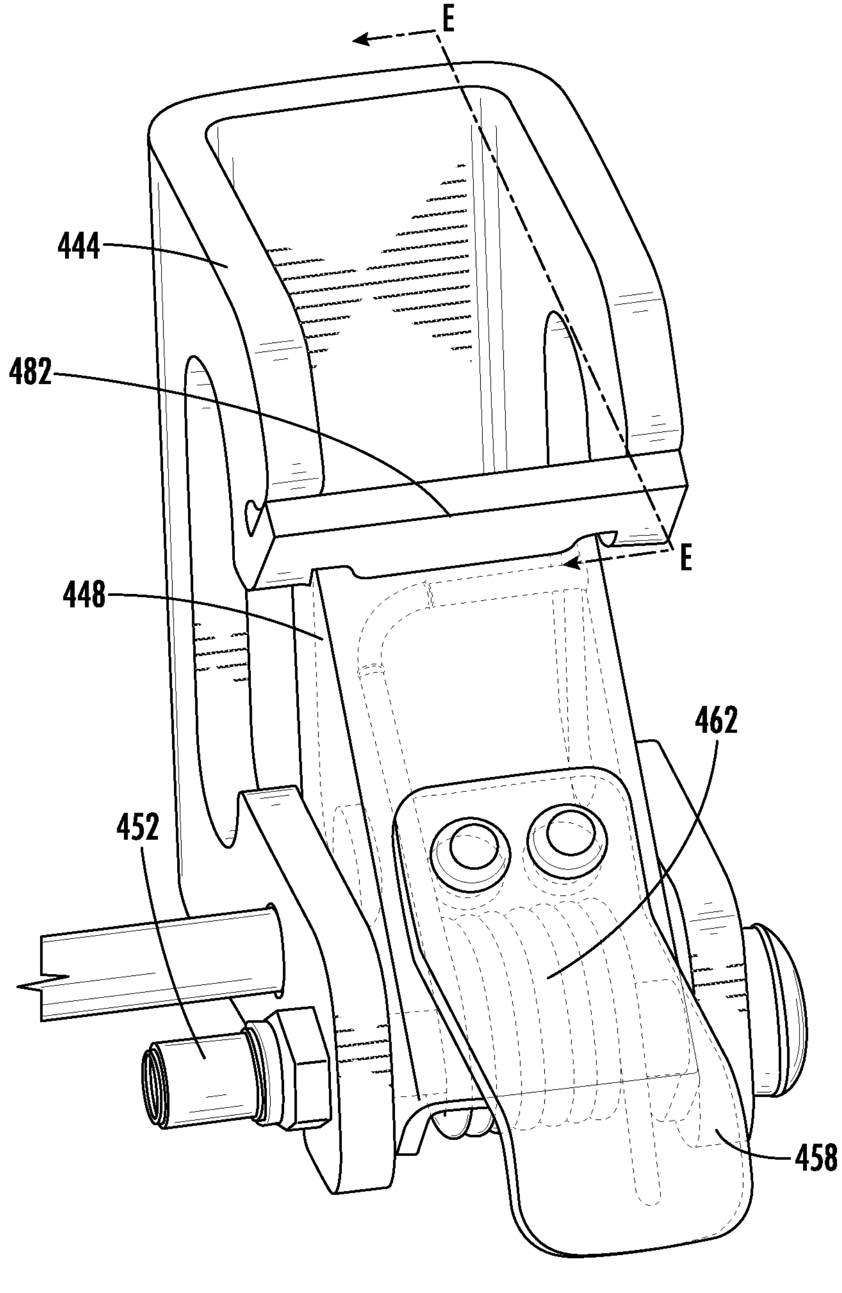
FIG. 51 is a rear perspective view of the connection interface in accordance with embodiments of the present disclosure.
Figure 52:
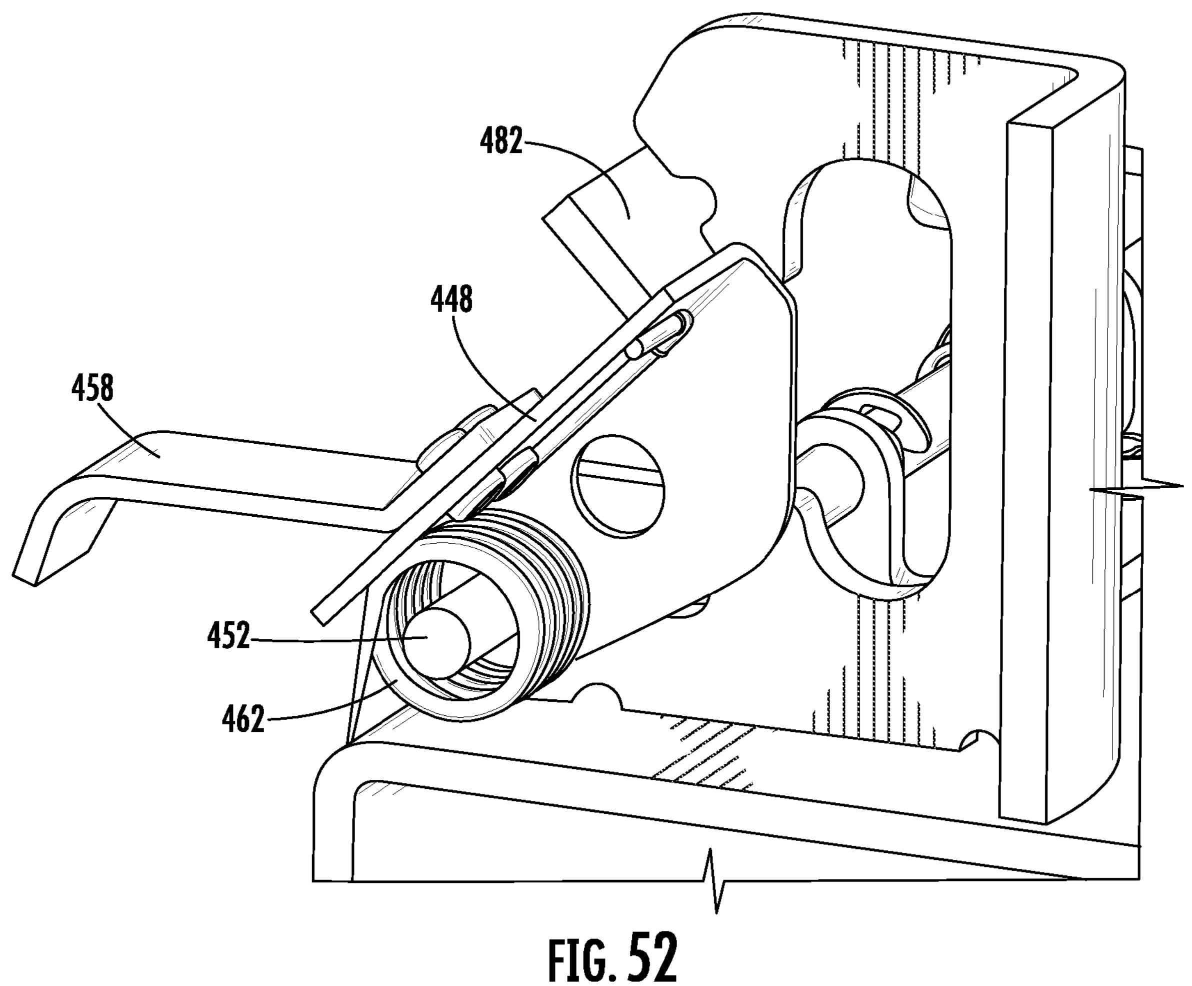
FIG. 52 is a cross-sectional view of the connection interface in accordance with embodiments of the present disclosure as seen along Line E-E in FIG. 51.

In an embodiment, the gate 448 can be biased to the closed state as depicted in FIG. 49 by a biasing element 462, e.g., as illustrated in FIGS. 51 and 52. The biasing element 462 can be a spring, and more particularly a torsion spring. In an embodiment, the biasing element 462 can be disposed at the axle 452, such as extending around the axle 452. In an embodiment, the biasing element 462 is preloaded against the gate 448 such that the gate 448 is rotationally biased even when the gate 448 is in the closed state. In this regard, the biasing element 462 maintains biasing force on the gate 448 at all times. The body 444 may define a stop tab 482 against which the gate 448 rests in the closed state. The stop tab 482 can support the gate 448 such that the gate 448 transmits the preloaded force to the stop tab 482 and maintains the gate 448 in the closed state even when the gate 448 is subjected to forces which might otherwise cause the gate 448 to move to the open state, such as encountered when the lawnmower moves over rough terrain, during maintenance operations, and the like.

Referring again to FIGS. 49 and 50, the gate 448 can be locked in one or more states, such as the closed state, the open state, or one or more intermediate states therebetween. In an embodiment, the gate 448 is lockable in only one state, such as the open state.

A lock 464 can be utilized by the user to selectively lock the gate 448 according to locking capabilities of the gate 448. For example, the lock 464 can allow a user to lock the gate 448 in the open state. By locking the gate 448 in the open state, the user can allow for easy installation of the post 344 into the receiving area 446 to install the mower deck 118 to the frame 390 (FIG. 42).

The lock 464 can generally include a locking feature, such as an arm 466 which interfaces with the gate 448 to selectively retain the gate 448 in one or both of the open or closed states. The arm 466 may translate along an axis 468 to selectively interface with features, such as an opening 470 of the body 444 and an opening 472 of the gate 448. In one position, the arm 466 can lock the gate 448 in a relatively fixed position with respect to the body 444 by extending into or through the hole 472 of the gate 448. This may be referred to as a locked state. In another position, the arm 466 does not extend into the hole 472 to lock the arm 466 relative to the gate 448. This may be referred to as an unlocked state. In the locked state, the gate 448 cannot move relative to the body 444. In the unlocked state, the gate 448 can move relative to the body 444. In an embodiment, the gate 448 defines an effective rotational displacement, as measured by a rotational displacement of the gate 448 between the closed state and the locked, open state, in a range of 15° and 60°, such as in a range of 20° and 55°, such as in a range of 250 and 50°. In an embodiment, the effective rotational displacement of the gate 448 is at least 15°, such as at least 20°, such as at least 25°, such as at least 30°. In a particular embodiment, the effective rotational displacement of the gate 448 is approximately 35°. Effective rotational displacement of the gate 448 as described above may allow for easy installation of the post 344 within the receiving area 446 while reducing an amount of rotational input required by the user to open the gate 448.

In an embodiment, the arm 466 of the lock 464 can be coupled to, or unitary with (e.g., welded to), a user engageable feature, such as a handle 474, which allows a user to actuate the arm 466 to move the lock 464 between the locked and unlocked states. In an embodiment, moving the lock 464 between the locked and unlocked states includes translating the arm 466 along the axis 468. By translating the arm 466 in a first direction along the axis 468, the lock 464 is moved to the locked state. By translating the arm 466 in a second direction along the axis 468, where the second direction is different than the first direction, the lock 464 is moved to the unlocked state. In an embodiment, the handle 474 includes a T-shaped handle disposed at, or adjacent to, a distal end of the arm 466. The T-shaped handle can be coupled to the arm 466 by adhesive, through a threaded interface, a pinned interface, a bayonet connection, or the like. The arm 466 can be coupled to a bracket 476. The bracket 476 maintains the arm 466 coaxially aligned with the axis 468 and the openings 470 and 472 of the body 444 and gate 448, respectively. A biasing element 478, such as a linear biasing element like a linear spring, biases the arm 466 along the axis 468, e.g., towards the gate 488. One or more retaining elements, like retaining rings 480A and 480B, can index the arm 466 and biasing element 478 relative to the bracket 476 to allow appropriate displacement of the arm 466 to allow the user to lock and unlock the lock 464.

In an embodiment, the arm 466 can extend into the opening 470 of the body 444 at all times. However, when the gate 448 is oriented such that the opening 472 of the gate 448 is not aligned with the axis 468, the arm 466 does not extend into the opening 472. Only when the gate 448 is oriented such that the opening 472 is aligned with the axis 468 does the arm 466 enter the opening 472. Such alignment can occur when the gate 448 is in the open state. Movement of the gate 448 to the open state can be affected by pushing on the tongue in the direction F (FIG. 49). Once within the opening 472, the arm 466 prevents the gate 448 from moving to the closed state until the user moves the arm 466, e.g., using the handle 474, to clear the arm 466 from the opening 472 of the gate 448. In an embodiment, the user removes the arm 466 from the opening 472 by pulling the handle 474 to displace the arm 466 along the axis 468. Once the arm 466 is clear of the opening 472, the gate 488 moves under force generated by the biasing element 462 (FIGS. 51 and 52) and returns to the closed state. The user is not required to perform any additional steps to unlock the gate 448 or return the gate 448 to the closed state. The user can release the handle 474 as soon as the arm 466 is clear of the opening 472. Once the user releases the handle 474, the arm 466 is again biased towards the gate 488 by the biasing element 478. However, with the gate 488 in the closed state, and while the gate is moving towards the closed state, the arm 466 does not align with the opening 472 and the gate 488 is not in the locked state. Only after the gate 488 is again moved to the open state, such that the opening 472 is aligned with the axis 468, does the arm 466 interface with the opening 472 to cause locking of the gate 488. It should be noted that this process may be modified in several ways. For example, in some instances, the gate 488 may be locked in the closed state and not the open state. This may be facilitated by moving the location of the opening 472 along the gate 448 such that the opening 472 aligns with the axis 468 when the gate 448 is closed and not open. Alternatively, the gate 488 may be locked in both the closed state and the open state. This may be facilitated by including two openings 472 in the gate 448 where a first of the two openings aligns with the axis 468 with the gate 448 in the open state and a second of the two openings aligns with the axis 468 with the gate 448 in the closed state.

Use of the lock 464 described herein allows the operator to selectively maintain the gate 448 in the locked open state. Once in the locked open state, the operator can ensure that their hands and figures are not located at the gate 448 while installing and removing the mower deck from the frame. Without use of the lock 464, i.e., without locking the gate 448 in the open state, the operator's hands may get pinched by the gate 448 as a result of having to precisely align the connection interface 442 with the post 344. That is, after the post 344 is installed in the receiving area 446, the gate 448 can snap closed, pinching the operator's hand.

Lawn mowers described in accordance with one or more embodiments can utilize electrical power to perform mowing operations. Lawn mowers described herein can efficiently utilize electrical power between the onboard, powered systems to maximize operational lifespan and reduce down time. It should be understood that the various embodiments described herein are exemplary only.

Further aspects of the invention are provided by one or more of the following embodiments:

Embodiment 1. A control system for a lawn mower, the control system comprising: a first drive controller configured to control a first drive motor; a second drive controller configured to control a second drive motor; a first deck controller configured to control a first deck motor associated with a first cutting implement; and a second deck controller configured to control a second deck motor associated with a second cutting implement, wherein: the first drive controller at least partially controls the second drive controller, the first deck controller at least partially controls the second deck controller, or both.

Embodiment 2. The control system of any one or more of the embodiments, further comprising a control implement configured to receive operator inputs and generate control signals, wherein the control signals are received at the first drive controller or the first deck controller, and wherein the first drive controller or the first deck controller communicate instructions to the second drive controller or the second deck controller in view of the control signals.

Embodiment 3. The control system of any one or more of the embodiments, wherein the first drive controller receives the control signals, and wherein the first drive controller further generates motor control signals for controlling the first drive motor.

Embodiment 4. The control system of any one or more of the embodiments, further comprising a main controller in individual communication with each of the controllers.

Embodiment 5. The control system of any one or more of the embodiments, wherein the first drive controller at least partially controls the first deck controller.

Embodiment 6. The control system of any one or more of the embodiments, wherein the first deck controller provides control instructions to the second deck controller in view of one or more control signals received from the first drive controller.

Embodiment 7. The control system of any one or more of the embodiments, wherein the first drive controller, the second drive controller, the first deck controller, and the second deck controller all share a common architecture.

Embodiment 8. The control system of any one or more of the embodiments, wherein the first drive controller, the second drive controller, the first deck controller, and the second deck controller all self-configure to a function of that controller in view of a selected location in the control system.

Embodiment 9. A control system for a lawn mower, the control system comprising: one or more controllers, wherein each of the one or more controllers is swappable between two or more locations in the control system, and wherein each of the one or more controllers self-configures a function of that controller in view of a selected location in the control system.

Embodiment 10. The control system of any one or more of the embodiments, wherein the one or more controllers all share a common architecture.

Embodiment 11. The control system of any one or more of the embodiments, wherein each of the one or more controllers self-configures in view of a jumper interface between that controller and the control system.

Embodiment 12. The control system of any one or more of the embodiments, wherein the two or more locations are selected from a first drive controller, a second drive controller, a first deck controller, a second deck controller, or any combination thereof.

Embodiment 13. The control system of any one or more of the embodiments, wherein the one or more controllers automatically assume a hierarchical arrangement relative to each other in view of their selected locations in the control system.

Embodiment 14. The control system of any one or more of the embodiments, wherein the hierarchical arrangement comprises a primary controller and a secondary controller, and wherein the primary controller informs control aspects of the secondary controller.

Embodiment 15. The control system of any one or more of the embodiments, wherein the one or more controllers includes a first drive controller configured to control a first drive motor of the lawn mower and a first deck controller configured to control a first deck motor associated with a first cutting implement of the lawn mower.

Embodiment 16. A lawn mower comprising: a first drive motor configured to selectively drive a first drive wheel; a second drive motor configured to selectively drive a second drive wheel; at least one control implement to receive operator inputs; and a control system including a first drive controller and a second drive controller, wherein the first drive controller receives signals from the at least one control implement and generates control instructions for movement of the lawn mower in response to the signals, and wherein the first drive controller communicates at least a portion of the control instructions to the second drive controller.

Embodiment 17. The lawn mower of any one or more of the embodiments, wherein the control instructions include information associated with one or more updated operating parameters of the second drive motor.

Embodiment 18. The lawn mower of any one or more of the embodiments, wherein the first drive controller further communicates at least a portion of the control instructions to a first deck controller configured to control a first deck motor associated with a first cutting implement, and wherein the first deck controller adjusts the first deck motor in view of the control instructions.

Embodiment 19. The lawn mower of any one or more of the embodiments, wherein the first drive controller further receives signals from a gyroscope which detects a relative angle formed between the lawn mower and a gravitational direction, and wherein the first drive controller adjusts the control instructions in response to the signals from the gyroscope.

Embodiment 20. The lawn mower of any one or more of the embodiments, wherein each of the plurality of controllers shares a common architecture, and wherein each of the plurality of controllers self-configures a function of that controller in view of a selected location in the control system.

Embodiment 21. A lawn mower comprising: an electrical system including one or more batteries; and an electrical port electrically coupled with the one or more batteries, wherein the electrical port is configured to receive a charging cable and an electrical cable associated with a removable accessory.

Embodiment 22. The lawn mower of any one or more of the embodiments, wherein the lawn mower self-configures between a charging mode and an accessory mode in view of which of the electrical cable or charging cable is presently coupled with the electrical port.

Embodiment 23. The lawn mower of any one or more of the embodiments, wherein the charging cable and the electrical cable have different connector types as compared to one another.

Embodiment 24. The lawn mower of any one or more of the embodiments, wherein the removable accessory receives power from the electrical port.

Embodiment 25. The lawn mower of any one or more of the embodiments, wherein power is received at the removable accessory only when the lawn mower is in an auxiliary mode.

Embodiment 26. The lawn mower of any one or more of the embodiments, wherein the electrical port is retrofit on the lawn mower.

Embodiment 27. The lawn mower of any one or more of the embodiments, further comprising a display to provide an operator with information relating to the electrical port.

Embodiment 28. A lawn mower comprising: an electrical system including one or more batteries; and an electrical port electrically coupled with the one or more batteries, wherein the electrical system is self-configurable between two or more modes, the two or more modes including a charging mode and an auxiliary mode where the electrical port provides power to a removable accessory of the lawn mower.

Embodiment 29. The lawn mower of any one or more of the embodiments, wherein in the charging mode the electrical port is electrically connected to a charging cable, wherein in the auxiliary mode the electrical port is electrically connected to an electrical cable of a detachable accessory, wherein the electrical port is configured to detect the presence of the charging cable or the electrical cable, and wherein the electrical system is configured to self-configure in response to the detected cable.

Embodiment 30. The lawn mower of any one or more of the embodiments, wherein the lawn mower has multi-directional communication with the removable accessory.

Embodiment 31. The lawn mower of any one or more of the embodiments, wherein the charging cable and the electrical cable have different connector types as compared to one another, and wherein self-configuration is determined in view of the connector type received at the electrical port.

Embodiment 32. The lawn mower of any one or more of the embodiments, wherein the electrical port is retrofit on the lawn mower.

Embodiment 33. The lawn mower of any one or more of the embodiments, wherein the removable accessory is selected from a group consisting of a log splitter, a leaf blower, a grass collector, and a woodchipper.

Embodiment 34. A lawn mower comprising: a user interface including a selector moveable between an ON position, an OFF position, and an auxiliary position, wherein, with the selector in the auxiliary position, a deck motor which drives a cutting implement of the lawn mower is inactive, wherein, with the selector in the auxiliary position, a drive motor which drives a wheel of the lawn mower is inactive, and wherein, with the selector in the auxiliary position, an auxiliary function of the lawn mower is active, the auxiliary function including: articulation of a mower deck of the lawn mower, use of a removable accessory electrically coupled with the lawn mower, or both.

Embodiment 35. The lawn mower of any one or more of the embodiments, wherein the removable accessory is electrically coupled to the lawn mower at an electrical port of the lawn mower, and wherein the electrical port is further configured to electrically couple with a charging cable.

Embodiment 36. The lawn mower of any one or more of the embodiments, wherein the electrical port is retrofit on the lawn mower.

Embodiment 37. The lawn mower of any one or more of the embodiments, wherein the electrical port only provides power to the removable accessory when the selector is in the auxiliary position.

Embodiment 38. The lawn mower of any one or more of the embodiments, wherein the electrical port provides power to the removable accessory when the selector is in the auxiliary position or the ON position.

Embodiment 39. The lawn mower of any one or more of the embodiments, wherein the lawn mower comprises a mower deck and a winch configured to take up and reel out a winch cable, and wherein the winch is operable when the selector is in the auxiliary position to articulate the mower deck between an in-use position and a stored position.

Embodiment 40. The lawn mower of any one or more of the embodiments, wherein the removable accessory is selected from a group consisting of a log splitter, a leaf blower, a grass collector, and a wood chipper.

Embodiment 41. A lawn mower comprising: a mower deck housing a cutting implement; a blade motor configured to selectively drive the cutting implement; a height adjustment implement moveable between two or more positions each associated with a different height of the cutting implement; and a quick deck lift user interface moveable between a mowing position and a deck lift position, wherein the quick deck lift user interface defaults to the mowing position, wherein moving the quick deck lift user interface to the deck lift position causes the cutting implement to move to a maximum height, and wherein releasing the quick deck lift user interface causes the cutting implement to return to a height set by the position of the height adjustment implement.

Embodiment 42. The lawn mower of any one or more of the embodiments, wherein the height adjustment implement comprises a rotatable dial, and wherein the quick deck lift user interface is disposed at a central location of the rotatable dial.

Embodiment 43. The lawn mower of any one or more of the embodiments, wherein the rotatable dial is rotatable between a fixed number of rotational positions each corresponding to a different height of the cutting implement.

Embodiment 44. The lawn mower of any one or more of the embodiments, wherein the rotatable dial provides feedback to the operator when the rotatable dial is at each of the rotational positions.

Embodiment 45. The lawn mower of any one or more of the embodiments, wherein the quick deck lift user interface comprises a button, and wherein moving the quick deck lift user interface to the deck lift position comprises depressing the button.

Embodiment 46. The lawn mower of any one or more of the embodiments, wherein the button is spring-biased to the mowing position.

Embodiment 47. The lawn mower of any one or more of the embodiments, wherein the height set by the position of the height adjustment implement is mechanically stored by an analog potentiometer in communication with the height adjustment implement.

Embodiment 48. The lawn mower of any one or more of the embodiments, wherein the mower deck remains at the maximum height until the quick deck lift user interface is released.

Embodiment 49. The lawn mower of any one or more of the embodiments, wherein movement of the mower deck is performed by a common hardware independent of whether the movement is caused by the height adjustment implement or the quick deck lift user interface.

Embodiment 50. The lawn mower of any one or more of the embodiments, wherein a relative position of the height adjustment implement remains unchanged when the quick deck lift user interface is moved between the mowing position and the deck lift position.

Embodiment 51. A method of adjusting a height of a mower deck of a lawn mower, the method comprising: moving a height adjustment implement between a plurality of positions to set a mowing height; upon encountering an obstacle that could be bypassed by a raised mower deck, actuating a quick deck lift user interface to raise the mower deck to a maximum height; maintaining the quick deck lift user interface in an actuated state until the obstacle is cleared by the mower deck; and releasing the quick deck lift user interface to cause the mower deck to return to the set mowing height.

Embodiment 52. The method of any one or more of the embodiments, wherein the height adjustment implement comprises a rotatable dial, and wherein the quick deck lift user interface is disposed at a central location of the rotatable dial.

Embodiment 53. The method of any one or more of the embodiments, wherein the mowing height selected by the rotatable dial is mechanically stored by an analog potentiometer.

Embodiment 54. The method of any one or more of the embodiments, wherein actuating the quick deck lift user interface actuates a deck height motor to lift the mower deck to the maximum height, and wherein rotating the rotatable dial actuates the deck height motor to move the mower deck to a selected mowing height.

Embodiment 55. The method of any one or more of the embodiments, wherein the height adjustment implement and the quick deck lift user interface are part of a single component that, when rotated, adjusts the mower deck height, and, when depressed, raises the mower deck to the maximum height.

Embodiment 56. A method of raising a mower deck of a lawn mower, the method comprising: upon encountering an obstacle that could be bypassed by a raised mower deck, depressing a button to lift the mower deck to a maximum height; and holding the button in a depressed state until the obstacle is cleared by the mower deck to retain the mower deck at the maximum height.

Embodiment 57. The method of any one or more of the embodiments, wherein the button is part of a height adjustment implement, and wherein another portion of the height adjustment implement is configured to set a height of the mower deck between a plurality of mowing heights.

Embodiment 58. The method of any one or more of the embodiments, wherein the set mower deck height is stored by a mechanical device, and wherein the method further comprises releasing the button to return to the stored mowing height.

Embodiment 59. The method of any one or more of the embodiments, wherein the lawn mower is configured to change another characteristic of the lawn mower when the button is depressed, the characteristic being selected from a travel speed of the lawn mower, a speed of a cutting implement, or both.

Embodiment 60. The method of any one or more of the embodiments, wherein the button is spring-biased to a mowing position.

Embodiment 61. A method of articulating a mower deck of a lawn mower, the method comprising: reconfiguring a winch cable from a first state associated with changing height of a mower deck during mowing operations to a second state associated with articulating the mower deck between an in-use position and a storage/service position, the winch cable operated by a winch to selectively raise and lower the mower deck during mowing operations; and with the winch cable in the second state, activating the winch to articulate the mower deck from the in-use position to the storage/service position.

Embodiment 62. The method of any one or more of the embodiments, wherein reconfiguring the winch cable from the first state to the second state is performed by: detaching the winch cable from the mower deck; and coupling the winch cable to a tether of the lawn mower.

Embodiment 63. The method of any one or more of the embodiments, further comprising lowering the mower deck to a lowest deck height prior to reconfiguring the winch cable from the first state to the second state, and wherein multidirectional wheels of the mower deck contact the ground when the mower deck is at the lowest deck height.

Embodiment 64. The method of any one or more of the embodiments, further comprising moving a foot platform of the lawn mower to a stored/service position prior to activating the winch.

Embodiment 65. The method of any one or more of the embodiments, further comprising releasing a deck latch prior to activating the winch, wherein the deck latch maintains the mower deck in a relatively static relationship with respect to a frame of the lawn mower.

Embodiment 66. The method of any one or more of the embodiments, wherein reconfiguring the winch cable is performed by unclipping a terminal end of the winch cable from an attachment point of the mower deck, and clipping the terminal end of the winch cable to a tether coupled to a frame of the lawn mower.

Embodiment 67. The method of any one or more of the embodiments, wherein activating the winch to articulate the mower deck is performed using a switch accessible by a user when not sitting in a seat of the lawn mower.

Embodiment 68. The method of any one or more of the embodiments, wherein articulation of the mower deck to the storage/service position is performed with the lawn mower in an auxiliary mode, and wherein articulating the mower deck is prevented when an operator is on a seat of the lawn mower.

Embodiment 69. The method of any one or more of the embodiments, further comprising releasing the winch cable from a frame engagement element of the lawn mower and coupling the winch cable to the mower deck after the mower deck is returned to the in-use position.

Embodiment 70. The method of any one or more of the embodiments, wherein, in the first state, activation of the winch changes a cutting height of the mower deck in a vertical direction.

Embodiment 71. The method of any one or more of the embodiments, wherein reconfiguring the winch cable from the first state to the second state is performed after introducing slack into the winch cable.

Embodiment 72. A lawn mower comprising: a mower deck housing a cutting implement; and a device reconfigurable from a first state associated with changing height of the mower deck during mowing operations to a second state associated with articulating the mower deck between an in-use position and a storage/service position.

Embodiment 73. The lawn mower of any one or more of the embodiments, wherein the device comprises a winch configured to take up and reel out a winch cable, and wherein reconfiguration of the device from the first state to the second state comprises detaching the winch cable from the mower deck and coupling the winch cable to a tether of the lawn mower.

Embodiment 74. The lawn mower of any one or more of the embodiments, wherein a same user interface is utilized to operate the device in both the first state and the second state.

Embodiment 75. A lawn mower comprising: a mower deck housing a cutting implement; a winch operatively coupled to the mower deck through a winch cable, the winch being configured to selectively raise and lower the mower deck during mowing operations and to selectively articulate the mower deck to a storage/service position; and one or more sensors, wherein the one or more sensors are configured to: detect when the mower deck is unlocked relative to a frame of the lawn mower such that selective articulation is possible, detect one or more articulated positions of the mower deck, or both.

Embodiment 76. The lawn mower of any one or more of the embodiments, further comprising a deck latch to selectively lock and unlock the mower deck relative to the frame of the lawn mower.

Embodiment 77. The lawn mower of any one or more of the embodiments, wherein the mower deck is coupled to a frame of the lawn mower through a mower deck frame, and wherein the mower deck is selectively lockable relative to the mower deck frame.

Embodiment 78. The lawn mower of any one or more of the embodiments, wherein the mower deck is height-adjustable relative to the mower deck frame when the mower deck is unlocked from the mower deck frame.

Embodiment 79. The lawn mower of any one or more of the embodiments, wherein the winch cable is coupled between the mower deck and a tether of the lawn mower to articulate the mower deck, and wherein the tether is selectively hidden in at least one viewing direction by a foot platform of the lawn mower when the foot platform is in an in-use position.

Embodiment 80. The lawn mower of any one or more of the embodiments, further comprising a user interface including a display, wherein the display is configured to provide instructions to an operator for articulating the mower deck.

Embodiment 81. A lawn mower comprising: a frame; a seat for an operator; and a storage bed disposed behind the seat and moveable relative to the frame between two or more positions including an in-use position and a dump position, wherein the storage bed is configured to receive, carry and dump various materials.

Embodiment 82. The lawn mower of any one or more of the embodiments, wherein the storage bed is pivotally moveable between the in-use position and the dump position about a horizontal pivot axis extending parallel with a rotational axis of one or more wheels of the lawn mower.

Embodiment 83. The lawn mower of any one or more of the embodiments, wherein the lawn mower comprises a battery receiving area, and wherein the storage bed is disposed above the battery receiving area.

Embodiment 84. The lawn mower of any one or more of the embodiments, further comprising a latch to selectively lock the storage bed in the in-use position, the dump position, or both.

Embodiment 85. The lawn mower of any one or more of the embodiments, wherein the latch is selectively locked and unlocked through one or more release mechanisms, and wherein each of the one or more release mechanisms is biased to a locked state.

Embodiment 86. The lawn mower of any one or more of the embodiments, wherein the storage bed comprises a gate configured to selectively open a sidewall of the storage bed when dumping the various materials disposed within the storage bed.

Embodiment 87. The lawn mower of any one or more of the embodiments, wherein the storage bed is coupled to the frame through an assisted lift mechanism configured to assist in raising the storage bed to a dump position.

Embodiment 88. The lawn mower of any one or more of the embodiments, wherein the assisted lift mechanism is coupled to the storage bed through a quick disconnect feature.

Embodiment 89. The lawn mower of any one or more of the embodiments, wherein the lawn mower comprises a battery receiving area, wherein access to the battery receiving area is permitted only when the storage bed is in a battery access position, and wherein the battery access position is accessible by disconnecting the quick disconnect feature.

Embodiment 90. A method of emptying one or more objects from a storage bed of a lawn mower, the method comprising: unlocking a release latch of a storage bed; and pivoting the storage bed from an in-use position to a dump position.

Embodiment 91. The method of any one or more of the embodiments, wherein pivoting of the storage bed to the dump position is assisted by an assisted lift mechanism.

Embodiment 92. The method of any one or more of the embodiments, wherein unlocking the release latch unlocks a rotary latch coupled to the release latch through a latch cable.

Embodiment 93. The method of any one or more of the embodiments, wherein the storage bed is disposed behind a seat of the lawn mower, and wherein the storage bed is coupled to a frame of the lawn mower about a horizontal pivot axis extending parallel with a rotational axis of one or more wheels of the lawn mower.

Embodiment 94. The method of any one or more of the embodiments, wherein the lawn mower comprises a battery receiving area, wherein access to the battery receiving area is permitted only when the storage bed is in a battery access position, and wherein the battery access position is accessible by disconnecting a quick disconnect feature.

Embodiment 95. The method of any one or more of the embodiments, wherein the release latch is disposed on a handle of the storage bed, and wherein pivoting the storage bed to the dump position is performed at least partially by the operator maneuvering the handle in a desired direction.

Embodiment 96. The method of any one or more of the embodiments, further comprising opening a gate of the storage bed prior to pivoting the storage bed to the dump position.

Embodiment 97. A method of removing one or more batteries from a battery receiving area of a lawn mower, the method comprising: moving a storage bed of the lawn mower from an in-use position to a dump position, wherein the storage bed is configured to receive and carry various materials in the in-use position and dump the various materials in the dump position; disconnecting a quick disconnect feature which limits movement of the storage bed; and after disconnecting the quick disconnect feature, further moving the storage bed from the dump position to a battery access position whereby the battery receiving area is accessible and the one or more batteries can be removed from the battery receiving area.

Embodiment 98. The method of any one or more of the embodiments, wherein the storage bed is coupled to a frame of the lawn mower through a support element, and wherein the quick disconnect feature and an assisted lift mechanism are both part of the support element.

Embodiment 99. The method of any one or more of the embodiments, wherein the quick disconnect feature is not accessible prior to moving the storage bed from the in-use position towards the dump position.

Embodiment 100. The method of any one or more of the embodiments, further comprising: unlocking a release latch of a storage bed prior to moving the storage bed; and opening a gate of the storage bed prior to moving the storage bed.

Embodiment 101. A lawn mower comprising: a frame; a mower deck including one or more cutting implements; and a connection interface coupling the mower deck to the frame, wherein the connection interface comprises: a first portion coupled to one of the mower deck or frame and including a body defining a receiving area and a gate moveable between a locked state and an unlocked state; a second portion coupled to the other one of the mower deck or frame and including a post receivable in the receiving area of the first portion; and an actuator configured to selectively move the gate between the locked state and the unlocked state and lock the gate in the locked state.

Embodiment 102. The lawn mower of any one or more of the embodiments, wherein the actuator moves the gate between the locked state and the unlocked state through a first motion type, and wherein the actuator locks the gate in the locked state through a second motion type different from the first motion type.

Embodiment 103. The lawn mower of any one or more of the embodiments, wherein the first motion type comprises rotation about a pivot axis, and wherein the second motion type comprises translation in a direction generally parallel with the pivot axis.

Embodiment 104. The lawn mower of any one or more of the embodiments, wherein the actuator is urged to the locked state by a spring.

Embodiment 105. The lawn mower of any one or more of the embodiments, wherein the actuator comprises a first arm and a second arm joined together through an operator access location, and wherein a length of the first arm is different than a length of the second arm.

Embodiment 106. The lawn mower of any one or more of the embodiments, wherein at least one of the first and second arms remains operatively coupled with the body of the first portion of the connection interface in both the locked state and the unlocked state.

Embodiment 107. The lawn mower of any one or more of the embodiments, wherein movement of the actuator between the locked state and the unlocked state comprises translation in a direction generally perpendicular to a length of the lawn mower.

Embodiment 108. A connection interface configured to couple a mower deck to a lawn mower, the connection interface comprising: a first portion coupled to one of the mower deck or frame and including a body defining a receiving area and a gate moveable between a locked state and an unlocked state; a second portion coupled to the other one of the mower deck or frame and including a post receivable in the receiving area of the first portion; and an actuator configured to selectively move the gate between the locked state and the unlocked state and lock the gate in the locked state.

Embodiment 109. The connection interface of any one or more of the embodiments, wherein the gate moves about a first pivot axis, and wherein the actuator moves about a second pivot axis different than the first pivot axis.

Embodiment 110. The connection interface of any one or more of the embodiments, wherein the actuator comprises a first member and a second member, wherein the first member forms a pivot axis for the actuator, and wherein the second member interfaces with the gate to move the gate between the locked state and the unlocked state.

Embodiment 111. The connection interface of any one or more of the embodiments, wherein the gate comprises a retention feature, and wherein the first member interacts with the retention feature to lock the gate in the locked state.

Embodiment 112. The connection interface of any one or more of the embodiments, further comprising a spring coupled to the same one of the mower deck or frame as the first portion, wherein the spring biases the actuator to the locked state.

Embodiment 113. The connection interface of any one or more of the embodiments, wherein the receiving area has a first shape, and wherein the post has a second shape different than the first shape such that the post can move within the receiving area.

Embodiment 114. A method of decoupling a mower deck from a lawn mower, the method comprising: translating an actuator of a connection interface coupling the mower deck to the lawnmower; rotating the actuator about a pivot axis oriented generally parallel with a direction of the translation, wherein rotating the actuator opens a receiving area of the connection interface; and moving one or both of the mower deck or lawn mower in a direction generally perpendicular to translation.

Embodiment 115. The method of any one or more of the embodiments, further comprising translating the mower deck in the direction of the translation after moving one or both of the mower deck or lawn mower in the direction generally perpendicular to the direction of translation.

Embodiment 116. The method of any one or more of the embodiments, wherein the mower deck comprises a multi-directional gauge wheel, and wherein the steps of moving and translating the mower deck are performed with the mower deck being supported at least partially by the multidirectional gauge wheel.

Embodiment 117. The method of any one or more of the embodiments, further comprising lowering the mower deck to a maintenance position before translating the actuator.

Embodiment 118. The method of any one or more of the embodiments, wherein rotating the actuator about the pivot axis causes a gate of the connection interface to move from a locked state to an unlocked state, wherein the gate and actuator comprise separate components, and wherein the gate closes the receiving area when the gate is in the locked state.

Embodiment 119. The method of any one or more of the embodiments, wherein the gate moves about a first pivot axis, and wherein the actuator moves about a second pivot axis different than the first pivot axis.

Embodiment 120. The method of any one or more of the embodiments, further comprising releasing the actuator after rotating the actuator, wherein the actuator remains in the unlocked state after releasing the actuator.

Embodiment 121. A connection interface configured to couple a mower deck to a lawn mower, the connection interface comprising: a first portion coupled to one of the mower deck or frame and including a body defining a receiving area and a gate moveable between an open state and a closed state to selectively close the receiving area; a second portion coupled to the other one of the mower deck or frame and including a post receivable in the receiving area of the first portion; and a lock to selectively maintain the gate in the open state.

Embodiment 122. The connection interface of any one or more of the embodiments, wherein the gate is biased to the closed state by a torsion spring.

Embodiment 123. The connection interface of any one or more of the embodiments, wherein the gate rests against a stop feature in the closed state, and wherein the torsion spring biases the gate against the stop feature.

Embodiment 124. The connection interface of any one or more of the embodiments, wherein the gate comprises a tongue upon which a user imparts force to the gate to rotate the gate to the open state.

Embodiment 125. The connection interface of any one or more of the embodiments, wherein the body defines a first opening, wherein the gate defines a second opening, and wherein the lock defines an arm that extends through both the first and second openings when the gate is in a locked state.

Embodiment 126. The connection interface of any one or more of the embodiments, wherein the arm extends through the first opening at all times.

Embodiment 127. The connection interface of any one or more of the embodiments, wherein the arm is spring biased towards the gate and automatically interfaces with the second opening when the gate is oriented such that the second opening is disposed in alignment with an axis of the arm.

Embodiment 128. The connection interface of any one or more of the embodiments, wherein the arm is coupled to a handle, and wherein a user pulls the handle to move the arm away from the gate and unlock the gate.

Embodiment 129. The connection interface of any one or more of the embodiments, wherein the arm is spring biased in a direction towards the gate.

Embodiment 130. The connection interface of any one or more of the embodiments, wherein the arm is retained on the mower deck by a bracket, and wherein the bracket maintains the arm on the axis.

Embodiment 131. The connection interface of any one or more of the embodiments, wherein the gate has an effective rotational displacement, as measured by a rotational displacement of the gate between the closed state and a locked, open state, in a range of 15° and 60°, such as in a range of 200 and 55°, such as in a range of 250 and 50°.

Embodiment 132. A lawnmower comprising: a frame; a mower deck; and a connection interface that selectively couples the mower deck to the frame, wherein the connection interface comprises: a first portion coupled to one of the mower deck or frame and including a body defining a receiving area and a gate moveable between an open state and a closed state to selectively close the receiving area; and a second portion coupled to the other one of the mower deck or frame and including a post receivable in the receiving area of the first portion, wherein the gate is selectively lockable in at least one of the open and closed states.

Embodiment 133. The lawnmower of any one or more of the embodiments, wherein the body defines a first opening, wherein the gate defines a second opening, wherein the lock defines an arm that extends through both the first and second openings when the gate is in a locked state, wherein the arm extends through the first opening at all times, and wherein the arm is spring biased towards the gate and automatically interfaces with the second opening when the gate is oriented such that the second opening is disposed in alignment with an axis of the arm.

Embodiment 134. The lawnmower of any one or more of the embodiments, wherein the arm is coupled to a handle, and wherein a user pulls the handle to move the arm away from the gate and unlock the gate.

Embodiment 135. The lawnmower of any one or more of the embodiments, wherein the gate is selectively lockable in only the open state, and wherein the gate is biased to the closed state by a spring.

Embodiment 136. The lawnmower of any one or more of the embodiments, wherein the gate comprises a tongue upon which a user imparts force to the gate to rotate the gate to the open state.

Embodiment 137. A lawnmower comprising: a frame; a mower deck; and a connection interface that selectively couples the mower deck to the frame, wherein the connection interface is selectively lockable in an open state to permit installation of the mower deck to the frame, and wherein the connection interface is spring biased to a closed state to couple the mower deck and the frame together.

Embodiment 138. The lawnmower of any one or more of the embodiments, wherein the connection interface is selectively lockable by a lock, and wherein the lock comprises a linearly translatable arm that selectively interfaces with a gate of the connection interface to lock the gate in the open state.

Embodiment 139. The lawnmower of any one or more of the embodiments, wherein the arm is coupled to a handle, and wherein a user pulls the handle to move the arm away from the gate and unlock the gate.

Embodiment 140. The lawnmower of any one or more of the embodiments, wherein the gate is biased to the closed state by a spring, and wherein the gate comprises a tongue upon which a user imparts force to the gate to rotate the gate to the open state.

Embodiment 141. The lawnmower of any one or more of the embodiments, wherein the mower deck is installable to the frame when the connection interface is in a locked open state.

This description uses examples to disclose the invention, including the best mode, and enables any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A connection interface configured to couple a mower deck to a lawn mower, the connection interface comprising:

a first portion coupled to one of the mower deck or frame and including a body defining a receiving area and a gate moveable between an open state and a closed state to selectively close the receiving area;

a second portion coupled to the other one of the mower deck or frame and including a post receivable in the receiving area of the first portion; and a lock to selectively maintain the gate in the open state such that the gate is prevented from rotating to the closed state.

2. The connection interface of claim 1, wherein the gate is biased to the closed state by a spring.

3. The connection interface of claim 2, wherein the gate rests against a stop feature in the closed state, and wherein the spring biases the gate against the stop feature.

4. The connection interface of claim 1, wherein the gate comprises a tongue upon which a user imparts force to the gate to rotate the gate to the open state.

5. The connection interface of claim 1, wherein the body defines a first opening, wherein the gate defines a second opening, and wherein the lock defines an arm that extends through both the first and second openings when the gate is in a locked state.

6. The connection interface of claim 5, wherein the arm extends through the first opening at all times.

7. The connection interface of claim 6, wherein the arm is spring biased towards the gate and automatically interfaces with the second opening when the gate is oriented such that the second opening is disposed in alignment with an axis of the arm.

8. The connection interface of claim 7, wherein the arm is retained on the mower deck by a bracket, and wherein the bracket maintains the arm on the axis.

9. The connection interface of claim 5, wherein the arm is coupled to a handle, and wherein a user pulls the handle to move the arm away from the gate and unlock the gate.

10. The connection interface of claim 1, wherein the gate has an effective rotational displacement, as measured by a rotational displacement of the gate between the closed state and a locked, open state, in a range of 25° and 50°.

11. A lawnmower comprising:

a frame;

a mower deck; and a connection interface that selectively couples the mower deck to the frame, wherein the connection interface comprises:

a first portion coupled to one of the mower deck or frame and including a body defining a receiving area and a gate moveable between an open state and a closed state to selectively close the receiving area;

a second portion coupled to the other one of the mower deck or frame and including a post receivable in the receiving area of the first portion; and a lock that maintains the gate in the open state such that the gate is prevented from rotating to the closed state.

12. The lawnmower of claim 11, wherein the body defines a first opening, wherein the gate defines a second opening, wherein the lock defines an arm that extends through both the first and second openings when the gate is in a locked state, wherein the arm extends through the first opening at all times, and wherein the arm is spring biased towards the gate and automatically interfaces with the second opening when the gate is oriented such that the second opening is disposed in alignment with an axis of the arm.

13. The lawnmower of claim 12, wherein the arm is coupled to a handle, and wherein a user pulls the handle to move the arm away from the gate and unlock the gate.

14. The lawnmower of claim 11, wherein the gate is selectively lockable in only the open state, and wherein the gate is biased to the closed state by a spring.

15. The lawnmower of claim 11, wherein the gate comprises a tongue upon which a user imparts force to the gate to rotate the gate to the open state.

16. A lawnmower comprising:

a frame;

a mower deck;

a connection interface that selectively couples the mower deck to the frame, wherein the connection interface is spring biased to a closed state to lock the mower deck and the frame together; and a lock that selectively interfaces with a gate of the connection interface to lock the gate in an open state such that the gate is prevented from rotating.

17. The lawnmower of claim 16, wherein the lock comprises a linearly translatable arm.

18. The lawnmower of claim 17, wherein the arm is coupled to a handle, and wherein a user pulls the handle to move the arm away from the gate and unlock the gate.

19. The lawnmower of claim 17, wherein the gate is biased to the closed state by a spring, and wherein the gate comprises a tongue upon which a user imparts force to the gate to rotate the gate to the open state.

20. The lawnmower of claim 16, wherein the mower deck is installable to the frame when the connection interface is in a locked open state.

* * * * *